(12) United States Patent
Lovold

(10) Patent No.: US 12,409,882 B2
(45) Date of Patent: Sep. 9, 2025

(54) ALL-TERRAIN VEHICLE

(71) Applicant: Polaris Industries Inc., Medina, MN (US)

(72) Inventor: Ryan K. Lovold, North Branch, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/442,611

(22) Filed: Feb. 15, 2024

(65) Prior Publication Data

US 2024/0308571 A1    Sep. 19, 2024

Related U.S. Application Data

(63) Continuation of application No. 17/062,105, filed on Oct. 2, 2020, now Pat. No. 11,932,321, which is a
(Continued)

(51) Int. Cl.
*B62D 5/04*         (2006.01)
*B60G 3/20*         (2006.01)
(Continued)

(52) U.S. Cl.
CPC ............ *B62D 5/0403* (2013.01); *B60G 3/20* (2013.01); *B62D 3/126* (2013.01); *B62D 5/04* (2013.01); *B62D 21/183* (2013.01); *B62D 39/00* (2013.01); *B62D 65/02* (2013.01); *B62K 5/01* (2013.01); *B62K 21/00* (2013.01); *B62K 25/04* (2013.01);
(Continued)

(58) Field of Classification Search
CPC .... B62D 5/0403; B62D 3/126; B62D 21/183; B62K 21/00; B62K 2005/001; B60G 2300/124
See application file for complete search history.

(56) References Cited

U.S. PATENT DOCUMENTS 610,132 A    8/1898   Goodridge
2,309,432 A  1/1943   Alden
(Continued)

FOREIGN PATENT DOCUMENTS

AU    2013317853 A1    4/2015
AU    2015266694 A1    1/2017
(Continued)

OTHER PUBLICATIONS

Annex to Form PCT/ISA/206 Communication Relating to the Results of the Partial International Search issued by the European Patent Office, mailed Mar. 2, 2010, for International Patent Application No. PCT/US2009/066093; 6 pages.
(Continued)

*Primary Examiner* — Valentin Neacsu
*Assistant Examiner* — Michael R Stabley
(74) *Attorney, Agent, or Firm* — Faegre Drinker Biddle & Reath LLP

(57) ABSTRACT

An ATV is shown having a steering system comprised of a power steering unit having drive and driven pitman arms coupled to a drag link. The drive pitman arm is laterally offset from a vehicle centerline and is driven by the power steering unit. An alternate power steering system includes a pack and pinion subassembly coupled to a power steering motor, which then couples to steering arms of the ATV.

19 Claims, 40 Drawing Sheets

Related U.S. Application Data continuation of application No. 15/895,495, filed on Feb. 13, 2018, now Pat. No. 10,793,181.

(51) Int. Cl.
  *B62D 3/12* (2006.01)
  *B62D 21/18* (2006.01)
  *B62D 39/00* (2006.01)
  *B62D 65/02* (2006.01)
  *B62K 5/01* (2013.01)
  *B62K 21/00* (2006.01)
  *B62K 25/04* (2006.01)
  *F01N 13/00* (2010.01)
  *B62K 5/00* (2013.01)

(52) U.S. Cl.
  CPC ........ *F01N 13/00* (2013.01); *B60G 2200/144* (2013.01); *B60G 2206/011* (2013.01); *B60G 2300/07* (2013.01); *B60G 2300/124* (2013.01); *B62K 2005/001* (2013.01)

(56) References Cited

U.S. PATENT DOCUMENTS

| | | |
|---|---|---|
| 2,553,795 A | 5/1951 | Staude |
| 2,672,103 A | 3/1954 | Hohmes |
| 2,834,608 A | 5/1958 | Wixson |
| 3,259,211 A | 7/1966 | Ryskamp |
| 3,336,074 A | 8/1967 | Barnes et al. |
| RE26,775 E | 1/1970 | Smieja |
| 3,563,564 A * | 2/1971 | Bartkowiak ........ F16C 11/0604 403/126 |
| 3,688,856 A | 9/1972 | Boehm et al. |
| 3,712,398 A | 1/1973 | Althaus |
| 3,712,416 A | 1/1973 | Swanson et al. |
| 3,814,201 A | 6/1974 | O Brien |
| 3,833,253 A | 9/1974 | Butler |
| 3,840,082 A | 10/1974 | Olson |
| 3,856,323 A | 12/1974 | Arning et al. |
| 3,858,902 A | 1/1975 | Howells et al. |
| 3,917,310 A | 11/1975 | Mitsuishi |
| 3,933,213 A | 1/1976 | Trowbridge |
| 3,966,014 A | 6/1976 | Gowing |
| 3,969,895 A | 7/1976 | Krizman |
| RE28,922 E | 8/1976 | Lloyd, III |
| 3,977,493 A | 8/1976 | Richardson |
| 4,027,892 A | 6/1977 | Parks |
| 4,045,075 A | 8/1977 | Pulver |
| 4,079,807 A | 3/1978 | Hornagold et al. |
| 4,089,542 A | 5/1978 | Westerman |
| 4,098,414 A | 7/1978 | Abiera |
| 4,222,453 A | 9/1980 | Fixsen et al. |
| 4,254,746 A | 3/1981 | Chiba et al. |
| 4,314,618 A | 2/1982 | Tamura |
| 4,339,156 A | 7/1982 | Livesay |
| 4,340,124 A | 7/1982 | Leonard |
| 4,407,386 A | 10/1983 | Yasui et al. |
| 4,442,913 A | 4/1984 | Grinde |
| 4,561,323 A | 12/1985 | Stromberg |
| 4,577,716 A | 3/1986 | Norton |
| 4,626,024 A | 12/1986 | Swann |
| 4,627,512 A | 12/1986 | Clohessy |
| 4,653,773 A * | 3/1987 | Graft ........ B62D 5/061 280/93.5 |
| 4,657,271 A | 4/1987 | Salmon |
| 4,679,450 A | 7/1987 | Hayakawa et al. |
| 4,686,433 A | 8/1987 | Shimizu |
| 4,695,089 A | 9/1987 | Fukutomi et al. |
| 4,700,982 A | 10/1987 | Kuraoka et al. |
| 4,782,912 A | 11/1988 | Wandless |
| 4,821,825 A | 4/1989 | Somerton-Rayner |
| 4,858,722 A | 8/1989 | Abbe et al. |
| 4,917,207 A | 4/1990 | Yasui et al. |
| 4,934,737 A | 6/1990 | Nakatsuka |
| 4,987,965 A | 1/1991 | Bourret |
| 5,010,970 A | 4/1991 | Yamamoto |
| 5,020,616 A | 6/1991 | Yagi et al. |
| 5,021,721 A | 6/1991 | Oshita et al. |
| 5,027,915 A | 7/1991 | Suzuki et al. |
| 5,036,939 A | 8/1991 | Johnson et al. |
| 5,042,835 A | 8/1991 | Burns |
| 5,052,528 A * | 10/1991 | Sullivan ................ B60G 7/04 267/221 |
| 5,057,062 A | 10/1991 | Yamasaki et al. |
| 5,060,745 A | 10/1991 | Yasui et al. |
| 5,078,225 A | 1/1992 | Ohmura et al. |
| 5,078,229 A | 1/1992 | Kikuchi et al. |
| 5,107,951 A | 4/1992 | Kawamura |
| 5,205,371 A | 4/1993 | Karnopp |
| 5,251,713 A | 10/1993 | Enokimoto |
| 5,253,730 A | 10/1993 | Hayashi et al. |
| 5,327,989 A | 7/1994 | Furuhashi et al. |
| 5,370,198 A | 12/1994 | Karpik |
| 5,393,194 A | 2/1995 | Smith |
| 5,429,290 A | 7/1995 | Greene, Jr. |
| 5,588,660 A * | 12/1996 | Paddison ................ B62D 7/18 280/93.512 |
| 5,692,579 A | 12/1997 | Peppel et al. |
| 5,692,759 A | 12/1997 | Flynn |
| 5,697,332 A | 12/1997 | Asai et al. |
| 5,704,866 A | 1/1998 | Pritchard et al. |
| 5,708,238 A | 1/1998 | Asao et al. |
| 5,727,643 A | 3/1998 | Kawano et al. |
| 5,753,300 A | 5/1998 | Wessels et al. |
| 5,779,272 A | 7/1998 | Panek et al. |
| 5,842,732 A | 12/1998 | Daggett et al. |
| 5,860,486 A | 1/1999 | Boivin et al. |
| 5,863,277 A | 1/1999 | Melbourne |
| 5,881,834 A | 3/1999 | Karpik |
| 5,887,671 A | 3/1999 | Yuki et al. |
| 5,904,216 A | 5/1999 | Furusawa |
| 5,944,134 A | 8/1999 | Peppel et al. |
| 5,947,217 A | 9/1999 | Snare et al. |
| 5,950,750 A | 9/1999 | Dong et al. |
| 5,954,364 A | 9/1999 | Nechushtan |
| 5,971,434 A | 10/1999 | Neufeld et al. |
| 6,029,750 A | 2/2000 | Carrier |
| 6,070,689 A | 6/2000 | Tanaka et al. |
| 6,092,877 A | 7/2000 | Rasidescu et al. |
| 6,126,227 A | 10/2000 | Bitelli |
| 6,149,540 A | 11/2000 | Johnson et al. |
| 6,161,853 A | 12/2000 | Jung |
| 6,161,908 A | 12/2000 | Takayama et al. |
| 6,199,894 B1 | 3/2001 | Anderson |
| 6,206,124 B1 | 3/2001 | Mallette et al. |
| 6,227,323 B1 | 5/2001 | Ashida |
| 6,283,241 B1 | 9/2001 | Kubota |
| 6,293,605 B2 | 9/2001 | Neubrand |
| 6,321,864 B1 | 11/2001 | Forbes |
| 6,343,578 B1 | 2/2002 | Kerkau et al. |
| 6,378,645 B1 | 4/2002 | Uegane et al. |
| 6,379,411 B1 | 4/2002 | Turner et al. |
| 6,390,219 B1 | 5/2002 | Vaisanen |
| 6,398,240 B1 * | 6/2002 | Taylor ................ B60T 1/065 280/93.511 |
| 6,412,797 B1 | 7/2002 | Park |
| 6,416,108 B1 | 7/2002 | Elswick |
| 6,431,569 B2 | 8/2002 | Handa |
| 6,461,208 B2 | 10/2002 | Suzuki et al. |
| 6,467,561 B1 | 10/2002 | Boivin et al. |
| 6,467,787 B1 | 10/2002 | Marsh |
| 6,478,098 B2 | 11/2002 | Boivin et al. |
| 6,520,284 B2 | 2/2003 | Spannbauer et al. |
| 6,551,385 B2 | 4/2003 | Turner et al. |
| 6,554,665 B1 | 4/2003 | Kaneko |
| RE38,124 E | 5/2003 | Mallette et al. |
| 6,557,530 B1 | 5/2003 | Benson et al. |
| 6,557,922 B1 | 5/2003 | Hommel |
| 6,568,030 B1 | 5/2003 | Watanabe et al. |
| 6,595,309 B1 | 7/2003 | Savage et al. |
| 6,622,968 B1 | 9/2003 | St et al. |
| 6,626,258 B1 | 9/2003 | Forbes |
| 6,631,778 B2 | 10/2003 | Mallette |

(56) References Cited

U.S. PATENT DOCUMENTS

| | | |
|---|---|---|
| 6,695,083 B2 | 2/2004 | Nakamura et al. |
| 6,695,566 B2 | 2/2004 | Rodriguez Navio |
| 6,715,460 B2 | 4/2004 | Ashida et al. |
| 6,715,575 B2 | 4/2004 | Karpik |
| 6,725,958 B2 | 4/2004 | Ashida et al. |
| 6,725,962 B1 | 4/2004 | Fukuda |
| 6,745,862 B2 | 6/2004 | Morii et al. |
| 6,752,235 B1 | 6/2004 | Bell et al. |
| 6,755,271 B1 | 6/2004 | Berg |
| 6,767,022 B1 | 7/2004 | Chevalier |
| 6,786,526 B1 | 9/2004 | Blalock |
| 6,796,395 B1 | 9/2004 | Berg et al. |
| 6,799,779 B2 | 10/2004 | Shibayama |
| 6,799,781 B2 | 10/2004 | Rasidescu et al. |
| 6,823,834 B2 | 11/2004 | Benson et al. |
| 6,851,691 B2 | 2/2005 | Rasidescu et al. |
| 6,916,142 B2 | 7/2005 | Hansen et al. |
| 6,923,507 B1 | 8/2005 | Billberg et al. |
| 6,926,108 B1 | 8/2005 | Polakowski et al. |
| 6,942,050 B1 | 9/2005 | Honkala et al. |
| 6,966,399 B2 | 11/2005 | Tanigaki et al. |
| 6,978,857 B2 | 12/2005 | Korenjak |
| 7,040,437 B1 | 5/2006 | Fredrickson et al. |
| 7,047,924 B1 | 5/2006 | Waters et al. |
| 7,055,454 B1 | 6/2006 | Whiting et al. |
| 7,063,057 B1 | 6/2006 | Waters et al. |
| 7,070,012 B2 | 7/2006 | Fecteau |
| 7,077,233 B2 | 7/2006 | Hasegawa |
| 7,096,988 B2 | 8/2006 | Moriyama |
| 7,124,853 B1 | 10/2006 | Kole, Jr. |
| 7,125,134 B1 | 10/2006 | Hedlund et al. |
| 7,165,702 B1 | 1/2007 | Billberg |
| 7,182,165 B1 | 2/2007 | Keinath et al. |
| 7,182,169 B2 | 2/2007 | Suzuki |
| 7,185,732 B2 | 3/2007 | Saito et al. |
| 7,210,547 B2 | 5/2007 | Nojima |
| 7,216,733 B2 | 5/2007 | Iwami et al. |
| 7,222,882 B2 | 5/2007 | Boucher |
| 7,237,789 B1 | 7/2007 | Herman |
| 7,237,802 B2 | 7/2007 | Rose et al. |
| 7,237,803 B2 | 7/2007 | Nguyen |
| 7,239,032 B1 | 7/2007 | Wilson et al. |
| 7,240,472 B2 | 7/2007 | Evers |
| 7,240,960 B2 | 7/2007 | Fallis et al. |
| 7,249,652 B2 | 7/2007 | Wolf |
| 7,331,896 B1 | 2/2008 | Kroppe |
| 7,370,724 B2 | 5/2008 | Saito et al. |
| 7,374,012 B2 | 5/2008 | Inui et al. |
| 7,380,622 B2 | 6/2008 | Shimizu |
| 7,380,805 B1 | 6/2008 | Turner |
| 7,395,890 B2 | 7/2008 | Visscher |
| 7,410,182 B1 | 8/2008 | Giese et al. |
| 7,431,024 B2 | 10/2008 | Buchwitz et al. |
| 7,434,656 B2 | 10/2008 | Yasuda et al. |
| 7,444,236 B2 | 10/2008 | Wiles |
| 7,455,141 B2 | 11/2008 | Hildebrand |
| 7,458,593 B2 | 12/2008 | Saito et al. |
| 7,481,293 B2 | 1/2009 | Ogawa et al. |
| 7,485,984 B2 | 2/2009 | Fulks et al. |
| 7,497,299 B2 | 3/2009 | Kobayashi |
| 7,497,471 B2 | 3/2009 | Kobayashi |
| 7,500,709 B2 | 3/2009 | Heselhaus |
| 7,523,799 B2 | 4/2009 | Yoshihara |
| 7,540,511 B2 | 6/2009 | Saito et al. |
| 7,559,596 B2 | 7/2009 | Garska et al. |
| 7,562,736 B2 | 7/2009 | Eguchi et al. |
| 7,565,944 B2 | 7/2009 | Sakamoto et al. |
| 7,565,945 B2 | 7/2009 | Okada et al. |
| 7,568,732 B2 | 8/2009 | Schlup, Jr. |
| 7,578,523 B2 | 8/2009 | Kosuge et al. |
| 7,600,603 B2 | 10/2009 | Okada et al. |
| 7,604,084 B2 | 10/2009 | Okada et al. |
| 7,610,132 B2 | 10/2009 | Yanai et al. |
| 7,632,327 B2 | 12/2009 | Yoo |
| 7,665,792 B1 | 2/2010 | Flynn |
| 7,677,599 B2 | 3/2010 | Kuerten et al. |
| 7,677,634 B2 | 3/2010 | Flynn |
| 7,708,103 B2 | 5/2010 | Okuyama et al. |
| 7,717,495 B2 | 5/2010 | Leonard et al. |
| 7,753,162 B2 | 7/2010 | Shiozawa et al. |
| 7,761,217 B2 | 7/2010 | Waters et al. |
| 7,762,567 B2 | 7/2010 | Marur |
| 7,775,318 B2 | 8/2010 | Okada et al. |
| 7,782,000 B2 | 8/2010 | Suzuki |
| 7,795,602 B2 | 9/2010 | Leonard et al. |
| 7,819,220 B2 | 10/2010 | Sunsdahl et al. |
| 7,854,290 B1 | 12/2010 | McKoskey |
| 7,871,106 B2 | 1/2011 | Leonard et al. |
| RE42,086 E | 2/2011 | Saito et al. |
| 7,882,817 B2 | 2/2011 | Yamazaki |
| 7,896,422 B2 | 3/2011 | Willard et al. |
| 7,900,743 B2 | 3/2011 | Kaku et al. |
| 7,922,201 B2 | 4/2011 | Kuerten et al. |
| 7,946,380 B2 | 5/2011 | Yamamoto et al. |
| 7,950,486 B2 | 5/2011 | Van et al. |
| 7,967,365 B2 | 6/2011 | Gerhardt et al. |
| 7,971,904 B2 | 7/2011 | David |
| 7,992,671 B2 | 8/2011 | Okada et al. |
| 8,029,021 B2 | 10/2011 | Leonard et al. |
| 8,104,524 B2 | 1/2012 | Manesh et al. |
| 8,122,993 B2 | 2/2012 | Ripley et al. |
| 8,176,957 B2 | 5/2012 | Manesh et al. |
| 8,191,952 B2 | 6/2012 | Mokhtari et al. |
| 8,205,910 B2 | 6/2012 | Leonard et al. |
| 8,240,748 B2 | 8/2012 | Chapman |
| 8,328,235 B2 | 12/2012 | Schneider et al. |
| 8,353,534 B2 | 1/2013 | Arnold et al. |
| 8,376,078 B2 | 2/2013 | Hiddema |
| 8,382,130 B2 | 2/2013 | Nakamura |
| 8,408,354 B2 | 4/2013 | Nozaki et al. |
| 8,454,041 B2 | 6/2013 | Fujii et al. |
| 8,517,135 B2 | 8/2013 | Schapf et al. |
| 8,517,140 B2 | 8/2013 | West et al. |
| 8,544,582 B2 | 10/2013 | Kaku et al. |
| 8,544,961 B2 * | 10/2013 | Bubulka ............... B60B 35/003 301/124.1 |
| 8,596,709 B2 | 12/2013 | Ugolini |
| 8,602,159 B2 | 12/2013 | Harris et al. |
| 8,613,335 B2 | 12/2013 | Deckard et al. |
| 8,640,814 B2 | 2/2014 | Deckard et al. |
| 8,651,800 B2 | 2/2014 | Li |
| 8,662,216 B2 | 3/2014 | Roucka |
| 8,662,224 B2 | 3/2014 | Shiokawa et al. |
| 8,746,719 B2 | 6/2014 | Safranski et al. |
| 8,827,028 B2 | 9/2014 | Sunsdahl et al. |
| 8,833,502 B2 | 9/2014 | Sellars |
| 8,893,835 B2 | 11/2014 | Nam et al. |
| 8,944,465 B2 | 2/2015 | Shinbori |
| 8,967,666 B2 | 3/2015 | Iardella et al. |
| 8,978,819 B2 | 3/2015 | Fujimoto et al. |
| 8,979,124 B2 | 3/2015 | Shinbori et al. |
| 9,004,224 B2 | 4/2015 | Uzawa |
| 9,096,289 B2 | 8/2015 | Hedlund et al. |
| 9,150,182 B1 | 10/2015 | Schlangen et al. |
| 9,248,861 B2 | 2/2016 | Koren et al. |
| 9,248,886 B1 | 2/2016 | Giese |
| 9,358,836 B2 | 6/2016 | David et al. |
| 9,381,803 B2 | 7/2016 | Galsworthy et al. |
| 9,440,671 B2 | 9/2016 | Schlangen et al. |
| 9,506,407 B2 | 11/2016 | Blake |
| 9,540,072 B2 | 1/2017 | Hedlund et al. |
| 9,592,782 B2 | 3/2017 | Raska et al. |
| 9,623,912 B2 | 4/2017 | Schlangen |
| 9,776,481 B2 | 10/2017 | Deckard et al. |
| 9,845,004 B2 | 12/2017 | Hedlund et al. |
| 9,873,316 B2 | 1/2018 | Lovold et al. |
| 9,876,316 B2 | 1/2018 | Sugiura et al. |
| 9,895,946 B2 | 2/2018 | Schlangen et al. |
| 9,988,083 B1 | 6/2018 | Smith |
| 10,077,087 B2 | 9/2018 | Lubben |
| 10,300,786 B2 | 5/2019 | Nugteren et al. |
| 10,358,187 B2 | 7/2019 | Vistad et al. |
| 10,744,833 B2 * | 8/2020 | Gell ............... B60G 3/20 |
| 10,746,082 B2 | 8/2020 | Fang et al. |

(56) References Cited

U.S. PATENT DOCUMENTS

| | | |
|---|---|---|
| 10,793,181 B2 | 10/2020 | Bennett et al. |
| 10,981,448 B2 | 4/2021 | Safranski et al. |
| 2002/0093168 A1 | 7/2002 | Hibbert |
| 2002/0107101 A1 | 8/2002 | Bowen et al. |
| 2002/0147072 A1 | 10/2002 | Goodell et al. |
| 2002/0178968 A1 | 12/2002 | Christensen |
| 2002/0179356 A1 | 12/2002 | Morii et al. |
| 2003/0001409 A1 | 1/2003 | Semple et al. |
| 2003/0006081 A1 | 1/2003 | Burke et al. |
| 2003/0089166 A1 | 5/2003 | Mizuno et al. |
| 2003/0172907 A1 | 9/2003 | Nytomt et al. |
| 2003/0211913 A1 | 11/2003 | Spitale |
| 2004/0026948 A1 | 2/2004 | Novajovsky |
| 2004/0079561 A1 | 4/2004 | Ozawa et al. |
| 2004/0089492 A1 | 5/2004 | Eide |
| 2004/0099470 A1 | 5/2004 | Tanigaki et al. |
| 2004/0108159 A1 | 6/2004 | Rondeau et al. |
| 2004/0153782 A1 | 8/2004 | Fukui et al. |
| 2004/0159483 A1 | 8/2004 | Imamura et al. |
| 2004/0187826 A1 | 9/2004 | Kino et al. |
| 2004/0195797 A1 | 10/2004 | Nash et al. |
| 2004/0216945 A1 | 11/2004 | Inui |
| 2004/0221669 A1 | 11/2004 | Shimizu et al. |
| 2004/0226384 A1 | 11/2004 | Shimizu et al. |
| 2004/0242090 A1 | 12/2004 | Gibbs |
| 2004/0262064 A1 | 12/2004 | Lefort |
| 2005/0012421 A1 | 1/2005 | Fukuda et al. |
| 2005/0016784 A1 | 1/2005 | Fecteau |
| 2005/0040000 A1 | 2/2005 | Kelley et al. |
| 2005/0045414 A1 | 3/2005 | Takagi et al. |
| 2005/0067220 A1 | 3/2005 | Keller et al. |
| 2005/0072613 A1 | 4/2005 | Maltais et al. |
| 2005/0073140 A1 | 4/2005 | Boucher |
| 2005/0073177 A1 | 4/2005 | Bendel et al. |
| 2005/0161283 A1 | 7/2005 | Emler |
| 2005/0173180 A1 | 8/2005 | Hypes et al. |
| 2005/0173940 A1 | 8/2005 | Smith et al. |
| 2005/0199432 A1 | 9/2005 | Abe et al. |
| 2005/0199433 A1 | 9/2005 | Abe et al. |
| 2005/0205320 A1 | 9/2005 | Girouard et al. |
| 2005/0225067 A1 | 10/2005 | Nguyen |
| 2005/0231145 A1 | 10/2005 | Mukai et al. |
| 2005/0235767 A1 | 10/2005 | Shimizu et al. |
| 2005/0235768 A1 | 10/2005 | Shimizu et al. |
| 2005/0242677 A1 | 11/2005 | Akutsu et al. |
| 2005/0248116 A1 | 11/2005 | Fanson |
| 2005/0252592 A1 | 11/2005 | Albright et al. |
| 2005/0257989 A1 | 11/2005 | Iwami et al. |
| 2005/0257990 A1 | 11/2005 | Shimizu |
| 2005/0267660 A1 | 12/2005 | Fujiwara et al. |
| 2005/0279552 A1 | 12/2005 | Schuehmacher et al. |
| 2006/0022619 A1 | 2/2006 | Koike et al. |
| 2006/0042862 A1 | 3/2006 | Saito et al. |
| 2006/0043754 A1 | 3/2006 | Smith |
| 2006/0055139 A1 | 3/2006 | Furumi et al. |
| 2006/0065472 A1 | 3/2006 | Ogawa et al. |
| 2006/0075840 A1 | 4/2006 | Saito et al. |
| 2006/0076180 A1 | 4/2006 | Saito et al. |
| 2006/0085966 A1 | 4/2006 | Kerner et al. |
| 2006/0108174 A1 | 5/2006 | Saito et al. |
| 2006/0162990 A1 | 7/2006 | Saito et al. |
| 2006/0169510 A1 | 8/2006 | Visscher |
| 2006/0169514 A1 | 8/2006 | Lim et al. |
| 2006/0169525 A1 | 8/2006 | Saito et al. |
| 2006/0175124 A1 | 8/2006 | Saito et al. |
| 2006/0180370 A1 | 8/2006 | Polakowski et al. |
| 2006/0180385 A1 | 8/2006 | Yanai et al. |
| 2006/0185741 A1 | 8/2006 | McKee |
| 2006/0185919 A1 | 8/2006 | Hibbert et al. |
| 2006/0185927 A1 | 8/2006 | Sakamoto et al. |
| 2006/0191734 A1 | 8/2006 | Kobayashi |
| 2006/0191735 A1 | 8/2006 | Kobayashi |
| 2006/0191737 A1 | 8/2006 | Kobayashi |
| 2006/0191739 A1 | 8/2006 | Koga |
| 2006/0196721 A1 | 9/2006 | Saito et al. |
| 2006/0196722 A1 | 9/2006 | Makabe et al. |
| 2006/0201270 A1 | 9/2006 | Kobayashi |
| 2006/0207823 A1 | 9/2006 | Okada et al. |
| 2006/0207824 A1 | 9/2006 | Saito et al. |
| 2006/0207825 A1 | 9/2006 | Okada et al. |
| 2006/0208564 A1 | 9/2006 | Yuda et al. |
| 2006/0212200 A1 | 9/2006 | Yanai et al. |
| 2006/0219452 A1 | 10/2006 | Okada et al. |
| 2006/0219469 A1 | 10/2006 | Okada et al. |
| 2006/0219470 A1 | 10/2006 | Imagawa et al. |
| 2006/0273566 A1 | 12/2006 | Hepner et al. |
| 2006/0288800 A1 | 12/2006 | Mukai et al. |
| 2007/0017480 A1 | 1/2007 | Kondo |
| 2007/0028877 A1 | 2/2007 | McDonald et al. |
| 2007/0068726 A1 | 3/2007 | Shimizu |
| 2007/0074588 A1 | 4/2007 | Harata et al. |
| 2007/0074589 A1 | 4/2007 | Harata et al. |
| 2007/0074927 A1 | 4/2007 | Okada et al. |
| 2007/0074928 A1 | 4/2007 | Okada et al. |
| 2007/0087890 A1 | 4/2007 | Hamrin et al. |
| 2007/0090621 A1 | 4/2007 | Vigen |
| 2007/0095601 A1 | 5/2007 | Okada et al. |
| 2007/0096449 A1 | 5/2007 | Okada et al. |
| 2007/0175686 A1 | 8/2007 | Yoshihara |
| 2007/0175696 A1 | 8/2007 | Saito et al. |
| 2007/0199753 A1 | 8/2007 | Giese et al. |
| 2007/0225105 A1 | 9/2007 | Bowen |
| 2007/0227810 A1 | 10/2007 | Sakurai et al. |
| 2007/0242398 A1 | 10/2007 | Ogawa |
| 2007/0246283 A1 | 10/2007 | Giese et al. |
| 2007/0290493 A1 | 12/2007 | David |
| 2008/0023240 A1 | 1/2008 | Sunsdahl et al. |
| 2008/0023249 A1 | 1/2008 | Sunsdahl et al. |
| 2008/0053743 A1 | 3/2008 | Tomita |
| 2008/0141957 A1 | 6/2008 | Dea et al. |
| 2008/0199253 A1 | 8/2008 | Okada et al. |
| 2008/0257630 A1 | 10/2008 | Takeshima et al. |
| 2008/0284124 A1 | 11/2008 | Brady et al. |
| 2009/0078491 A1 | 3/2009 | Tsutsumikoshi et al. |
| 2009/0078492 A1 | 3/2009 | Tsutsumikoshi et al. |
| 2009/0152035 A1 | 6/2009 | Okada et al. |
| 2009/0152036 A1 | 6/2009 | Okada et al. |
| 2009/0217908 A1 | 9/2009 | Watanabe et al. |
| 2009/0294197 A1 | 12/2009 | Polakowski et al. |
| 2009/0301830 A1 | 12/2009 | Kinsman et al. |
| 2009/0308682 A1 | 12/2009 | Ripley et al. |
| 2010/0012412 A1 | 1/2010 | Deckard et al. |
| 2010/0060026 A1 | 3/2010 | Bowers |
| 2010/0071982 A1 | 3/2010 | Giese et al. |
| 2010/0089355 A1 | 4/2010 | Fredrickson et al. |
| 2010/0090430 A1 | 4/2010 | Weston |
| 2010/0108427 A1 | 5/2010 | Richer |
| 2010/0133036 A1 | 6/2010 | Okada et al. |
| 2010/0170231 A1 | 7/2010 | Yamaguchi |
| 2010/0269771 A1 | 10/2010 | Wermuth et al. |
| 2011/0088968 A1 | 4/2011 | Kempf et al. |
| 2011/0100340 A1 | 5/2011 | Mukkala et al. |
| 2011/0139529 A1 | 6/2011 | Eichenberger et al. |
| 2011/0240395 A1 | 10/2011 | Hurd et al. |
| 2011/0298189 A1 | 12/2011 | Schneider et al. |
| 2012/0143465 A1 | 6/2012 | Kim |
| 2012/0160593 A1 | 6/2012 | Nozaki et al. |
| 2012/0205902 A1 | 8/2012 | Beavis et al. |
| 2012/0223500 A1 | 9/2012 | Kinsman et al. |
| 2012/0261210 A1 | 10/2012 | Kondou |
| 2013/0048409 A1 | 2/2013 | Fujii |
| 2013/0125535 A1 | 5/2013 | Schultz |
| 2013/0175779 A1 | 7/2013 | Kvien et al. |
| 2013/0180798 A1 | 7/2013 | Matsushima et al. |
| 2013/0233265 A1 | 9/2013 | Zurface et al. |
| 2013/0240272 A1 | 9/2013 | Gass et al. |
| 2013/0256050 A1 | 10/2013 | Novotny et al. |
| 2014/0124279 A1 | 5/2014 | Schlangen et al. |
| 2014/0210234 A1 | 7/2014 | Ricketts et al. |
| 2014/0262583 A1 | 9/2014 | Url |
| 2014/0353956 A1 | 12/2014 | Bjerketvedt et al. |
| 2015/0165886 A1 | 6/2015 | Bennett et al. |
| 2015/0197128 A1 | 7/2015 | Miller et al. |
| 2015/0210115 A1 | 7/2015 | David et al. |

(56) References Cited

U.S. PATENT DOCUMENTS

| | | |
|---|---|---|
| 2015/0210319 A1 | 7/2015 | Tiramani |
| 2015/0354149 A1 | 12/2015 | Dahm et al. |
| 2016/0347137 A1 | 12/2016 | Despres-Nadeau et al. |
| 2016/0347350 A1 | 12/2016 | Heon et al. |
| 2017/0101142 A1 | 4/2017 | Hedlund et al. |
| 2017/0137059 A1 | 5/2017 | Ohba et al. |
| 2017/0210192 A1 | 7/2017 | Reybrouck et al. |
| 2017/0274935 A1 | 9/2017 | Deckard et al. |
| 2018/0154717 A1 | 6/2018 | Neu et al. |
| 2018/0170134 A1 | 6/2018 | Schlangen et al. |
| 2018/0170136 A1* | 6/2018 | Gell .................. B60G 3/20 |
| 2019/0055875 A1 | 2/2019 | Fang et al. |
| 2019/0248405 A1 | 8/2019 | Bennett et al. |
| 2021/0016823 A1 | 1/2021 | Otto et al. |
| 2021/0354542 A1 | 11/2021 | Schleif et al. |

FOREIGN PATENT DOCUMENTS

| | | | |
|---|---|---|---|
| AU | 2017204255 | A1 | 7/2017 |
| CA | 1150752 | A | 7/1983 |
| CA | 2265693 | A1 | 3/1998 |
| CA | 2561337 | | 9/1999 |
| CH | 317335 | A | 11/1956 |
| CN | 101511664 | A | 8/2009 |
| CN | 102056788 | A | 5/2011 |
| CN | 103419869 | A | 12/2013 |
| CN | 104661903 | A | 5/2015 |
| CN | 107089108 | A | 8/2017 |
| CN | 108357598 | A | 8/2018 |
| CN | 109803872 | A | 5/2019 |
| DE | 0116605 | | 2/1900 |
| DE | 0351667 | C | 4/1922 |
| DE | 1755101 | | 4/1971 |
| DE | 3033707 | | 4/1982 |
| DE | 4122690 | A1 | 1/1992 |
| DE | 102010017784 | A1 | 1/2012 |
| EP | 0238077 | A2 | 9/1987 |
| EP | 0287038 | A2 | 10/1988 |
| EP | 0709247 | A2 | 5/1996 |
| EP | 0794096 | A2 | 9/1997 |
| EP | 1215107 | A1 | 6/2002 |
| EP | 1557345 | A2 | 7/2005 |
| EP | 1564123 | A2 | 8/2005 |
| EP | 1769998 | A1 | 4/2007 |
| EP | 3328717 | A1 | 6/2018 |
| FR | 2678886 | A1 | 1/1993 |
| JP | 62-218209 | A | 9/1987 |
| JP | 01-113527 | A | 5/1989 |
| JP | 11-334447 | A | 12/1999 |
| JP | 2000-177434 | A | 6/2000 |
| JP | 2001-065344 | A | 3/2001 |
| JP | 2003-011843 | A | 1/2003 |
| JP | 3385382 | B2 | 3/2003 |
| JP | 2003-343373 | A | 12/2003 |
| JP | 2005-193788 | A | 7/2005 |
| JP | 2006-232058 | A | 9/2006 |
| JP | 2006-232061 | A | 9/2006 |
| JP | 2006-256579 | A | 9/2006 |
| JP | 2006-256580 | A | 9/2006 |
| JP | 2006-281839 | A | 10/2006 |
| JP | 2007-038709 | A | 2/2007 |
| JP | 2007-106319 | A | 4/2007 |
| JP | 2018-523603 | A | 8/2018 |
| WO | 95/01503 | A1 | 1/1995 |
| WO | 97/46407 | A1 | 12/1997 |
| WO | 98/12095 | A2 | 3/1998 |
| WO | 01/05613 | A1 | 1/2001 |
| WO | 02/87957 | A1 | 11/2002 |
| WO | 2007/100751 | A2 | 9/2007 |
| WO | 2009/062823 | A1 | 5/2009 |
| WO | 2009/096998 | A1 | 8/2009 |
| WO | 2009/114414 | A1 | 9/2009 |
| WO | 2009/151995 | A1 | 12/2009 |
| WO | 2011/093847 | A1 | 8/2011 |
| WO | 2011/099959 | A1 | 8/2011 |
| WO | 2013/119958 | A2 | 8/2013 |
| WO | 2014/047488 | A1 | 3/2014 |
| WO | 2015/071904 | A1 | 5/2015 |
| WO | 2015/105974 | A2 | 7/2015 |
| WO | 2015/105976 | A1 | 7/2015 |
| WO | 2015/184354 | A1 | 12/2015 |
| WO | 2017/023726 | A1 | 2/2017 |

OTHER PUBLICATIONS

Brochure, Fully Equipped LTATV Sales, available at http://chrishainesoffroad.com/vehicles/pdf, last accessed Jul. 15, 2014, copyright 2010-2011; 2 pages.
Brochure, Strike Razer, Advanced Mobile Systerus for Rapid Response; 5 pages.
Communication Pursuant to Article 94(3) EPC issued by the European Patent Office, dated Nov. 14, 2018, for European Patent Application No. 15700942.4; 4 pages.
Communication Pursuant to Article 94(3) of the European Patent Convention, dated Feb. 6, 2018, for European Patent Application No. 15700942.4; 4 pages.
Decision on Appeal, Inter Partes Reexamination Control U.S. Appl. No. 95/002,010 of U.S. Pat. No. 7,854,285, Appeal 2015-004514, Sep. 28, 2015; 32 pages.
Decision on Appeal, Inter Partes Reexamination Control U.S. Appl. No. 95/002,011 of U.S. Pat. No. 8,151,923, Appeal 2015-004515, Sep. 28, 2015; 36 pages.
Examination Report No. 1 issued by the Australian Government IP Australia, dated Jul. 24, 2017, for Australian Patent Application No. 2015266694; 4 pages.
Examination Report No. 1 issued by the Australian Government IP Australia, dated Jun. 28, 2018, for Australian Patent Application No. 2017204255; 3 pages.
Examination Report No. 1 issued by the Australian Government IP Australia, dated Nov. 19, 2018, for Australian Patent Application No. 2016303426; 3 pages.
Examination Report No. 1 issued by the Australian Government IP Australia, dated Sep. 29, 2016, for Australian Patent Application No. 2013317853; 5 pages.
International Preliminary Report on Patentability issued by the European Patent Office, dated Dec. 13, 2010, for International Patent Application No. PCT/US2009/045900; 7 pages.
International Preliminary Report on Patentability issued by the European Patent Office, dated Jul. 12, 2016, for International Patent Application No. PCT/US2015/010621; 12 pages.
International Preliminary Report on Patentability issued by the European Patent Office, dated Jun. 10, 2008, for International Patent Application No. PCT/US2007/004895; 22 pages.
International Preliminary Report on Patentability issued by the European Patent Office, dated Jun. 17, 2016, for International Patent Application No. PCT/US2015/010623; 20 pages.
International Preliminary Report on Patentability issued by the European Patent Office, dated Mar. 30, 2011, for International Patent Application No. PCT/US2009/066110; 12 pages.
International Preliminary Report on Patentability issued by the European Patent Office, mailed Jun. 4, 2014, for International Patent Application No. PCT/US2013/025354; 18 pages.
International Preliminary Report on Patentability issued by the International Bureau of WIPO, dated Jul. 19, 2011, for International Patent Application No. PCT/US2009/066093; 9 pages.
International Preliminary Report on Patentability received for PCT Patent Application No. PCT/US2019/017438, mailed on Jun. 18, 2020, 17 pages.
International Search Report and Written Opinion issued by the European Patent Office, dated Aug. 8, 2015, for International Patent Application No. PCT/US2015/033327; 8 pages.
International Search Report and Written Opinion issued by the European Patent Office, dated Jan. 16, 2014, for International Patent Application No. PCT/US2013/061002; 13 pages.
International Search Report and Written Opinion issued by the European Patent Office, dated Nov. 6, 2007, for International Patent Application No. PCT/US2007/004895; 20 pages.
International Search Report and Written Opinion issued by the

(56) References Cited

OTHER PUBLICATIONS

European Patent Office, dated Sep. 18, 2014, for International Patent Application No. PCT/US2013/025354; 13 pages.
International Search Report and Written Opinion issued by the European Patent Office, mailed Aug. 12, 2014, for International Patent Application No. PCT/US2015/010621; 17 pages.
International Search Report and Written Opinion issued by the European Patent Office, mailed Jul. 2, 2010, for International Patent Application No. PCT/US2009/066093; 14 pages.
International Search Report and Written Opinion issued by the European Patent Office, mailed Mar. 24, 2015, for International Patent Application No. PCT/US2015/010623; 11 pages.
International Search Report and Written Opinion received for PCT Patent Application No. PCT/US2019/017438, mailed on Jul. 11, 2019, 22 pages.
International Search Report issued by the European Patent Office, dated Aug. 4, 2009, for International Patent Application No. PCT/US2009/045900; 3 pages.
International Search Report issued by the European Patent Office, dated Mar. 18, 2010, for International Patent Application No. PCT/US2009/066110; 5 pages.
Invitation to Pay Additional Fees received for PCT Patent Application No. PCT/US2019/017438, mailed on May 17, 2019, 19 pages.
Strike Razor: Light Tactical Vehicle, Advanced Mobile Systerus, copyright 2011; 2 pages.
SuperATVMedia: "Kawasaki Teryx 4 6" Lift Kit-SuperATV", Dec. 3, 2015, https://www.youtube.com/watch?r=a6ewNg5De_g; 3 pages.
Unknown: "6" Lift Kit—Kawasaki Teryx4", Nov. 13, 2015, Madison, Indiana Retrieved from the Internet: URL: https:/www.pureoffroad.com/assets/images/superatv/IN-LK-K-TRX4-6. pdf.
Unknown: "Kawasaki Teryx 6" Lift Kit", Jan. 23, 2016, Retrieved from the Internet: URL: https://www.superatv.com/kawasaki-teryx-6-lift-kit.
Webpage, RP Advanced Mobile Systems: Military SxS Tactical Defense Vehicles, available at http://web.archive.org/web/20120324210549/http://www.rpadvancedmobilesystems.com/, available as early as Mar. 24, 2012, last accessed Jul. 15, 2014; 4 pages.
Written Opinion issued by the European Patent Office, dated Aug. 27, 2008, for International Patent Application No. PCT/US2008/003485; 7 pages.
Written Opinion issued by the European Patent Office, dated Oct. 2, 2008, for International Patent Application No. PCT/US2008/003483; 10 pages.
Written Opinion issued by the European Patent Office, dated Sep. 1, 2008, for International Patent Application No. PCT/US2008/003480; 12 pages.
Written Opinion of the International Searching Authority, dated Aug. 4, 2009, for International Patent Application No. PCT/US2009/045900; 6 pages.

* cited by examiner

ALL-TERRAIN VEHICLE

CROSS-REFERENCE TO RELATED APPLICATIONS

The present application is a continuation of U.S. patent application Ser. No. 17/062,105, filed Oct. 2, 2020, which is a continuation of U.S. patent application Ser. No. 15/895,495, filed Feb. 13, 2018, the entire disclosures of which are incorporated herein by reference.

BACKGROUND OF THE DISCLOSURE

The present disclosure generally relates to an ALL TERRAIN VEHICLE (ATV) and, more particularly, to an ATV having improved ergonomics and performance.

Generally, ATVs are used to carry one or two passengers and a small amount of cargo over a variety of terrains. Due to increasing recreational interest in ATVs, specialty ATVs, such as those used for trail riding, racing, and cargo hauling have entered the market place. Most ATVs include an engine including between one and three cylinders. Most ATVs include a straddle or saddle type seat positioned above the engine.

In one example of the invention, a method of making multiple widths of all-wheel drive vehicles is described which includes the steps of providing a frame having a front portion and a rear portion; providing a power train and coupling the power train to the frame, the power train comprising a primary motive unit, a transmission, a front final drive, a rear final drive and couplings between the transmission and the front and rear final drives; providing a plurality of front and rear suspension components of different lengths; providing a plurality of front and rear half shafts of different lengths; selecting sets of front and rear suspension components and front and rear half shafts to define a measured distance from a longitudinal centerline of the vehicle; and providing front and rear wheels, where a distance measured from outside the front and rear wheels is different for the different sets.

In another illustrative embodiment, an all-terrain vehicle (ATV) comprises a frame; ground engaging members supporting the frame, including front and rear ground engaging members; front right and left suspensions; front wheel steering mechanisms including right and left knuckles pivotally coupled to the respective front right and left suspension; a power steering unit coupled to the frame, the power steering unit including an output shaft which is laterally offset from a vertical centerline of the vehicle; right and left steering arms coupled to respective right and left knuckles, and a linkage coupling the output shaft to the steering arms, where the right and left steering arms are substantially the same length.

In another illustrative embodiment, an all-terrain vehicle (ATV) comprises a frame; ground engaging members supporting the frame, including front and rear ground engaging members; front right and left suspensions; front wheel steering mechanisms including right and left knuckles pivotally coupled to the respective front right and left suspension; a first stop member positioned on each of the front right and left suspension; and a second stop member positioned on each of the right and left knuckles; wherein the first and second stop members cooperate to provide extreme rotational positions.

In another embodiment includes an all-terrain vehicle (ATV) comprising a frame; ground engaging members supporting the frame, including front and rear ground engaging members; front right and left suspensions; a power steering unit coupled to the frame; a steering post providing torsional input to the power steering unit; a steering system support bracket coupled to the frame for supporting the power steering unit; and a steering stop coupled between the steering shaft and the steering system support bracket, to provide extreme rotational positions of the steering shaft.

Finally, in another embodiment, an all-terrain vehicle (ATV) comprises a frame; ground engaging members supporting the frame, including front and rear ground engaging members; front right and left suspensions; a power steering unit coupled to the frame, the power steering unit comprising a power steering motor having an output shaft and a rack and pinion subassembly coupled to the power steering unit, the rack and pinion subassembly having a housing and a pinion gear driving coupled by the output shaft, and a rack drivingly coupled to the pinion gear; a steering post providing torsional input to the power steering unit; and steering arms coupled to the rack; wherein torsional input to the power steering unit causes rotation of the output shaft and pinion, and linear movement of the rack and steering arms.

The invention will now be described by way of reference to the drawing figures, where:

Corresponding reference characters indicate corresponding parts throughout the several views. Unless stated otherwise the drawings are proportional.

DETAILED DESCRIPTION OF THE DRAWINGS

Figure 1:
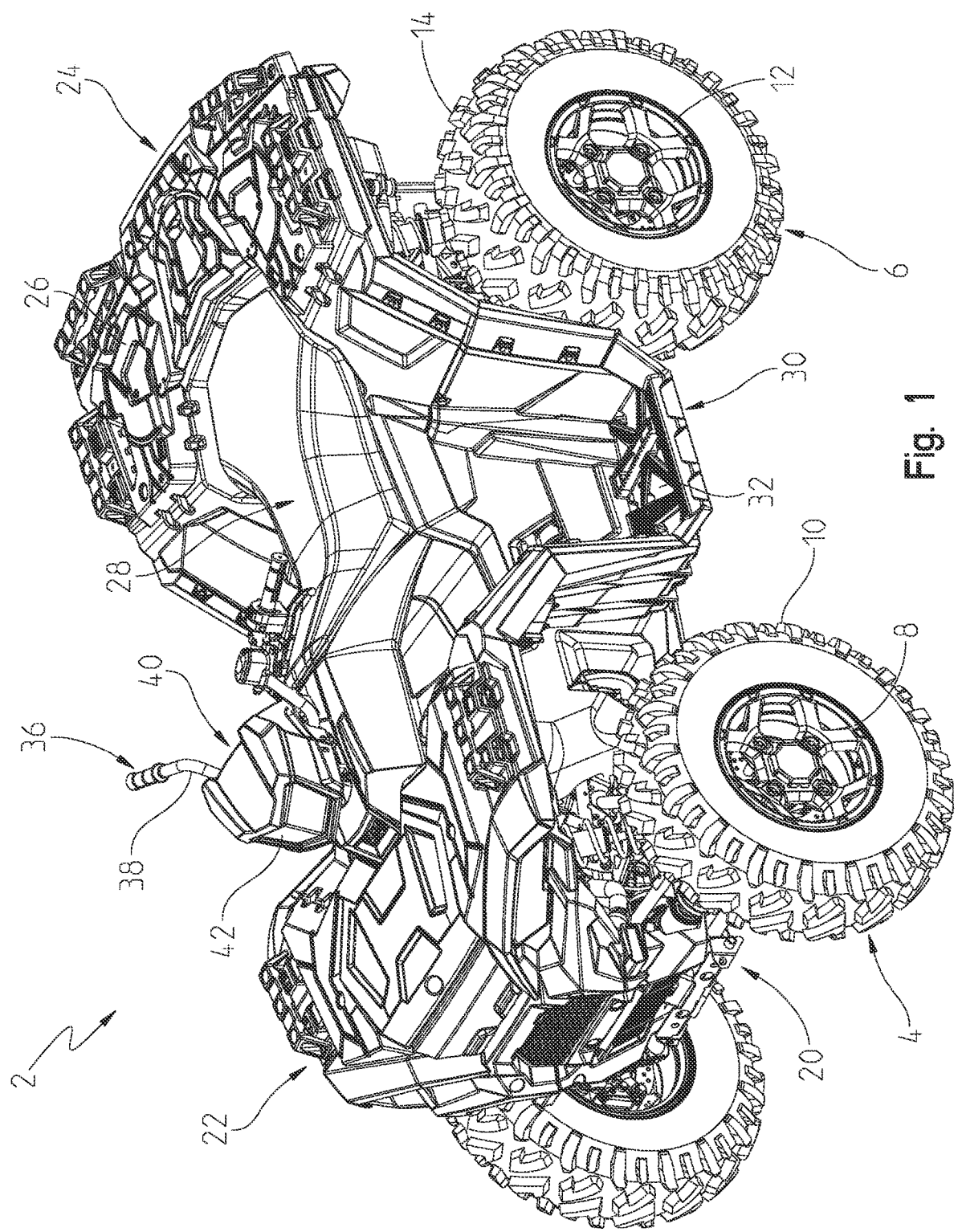
FIG. 1 is a front left perspective view of the ATV of the present disclosure.
Figure 2:
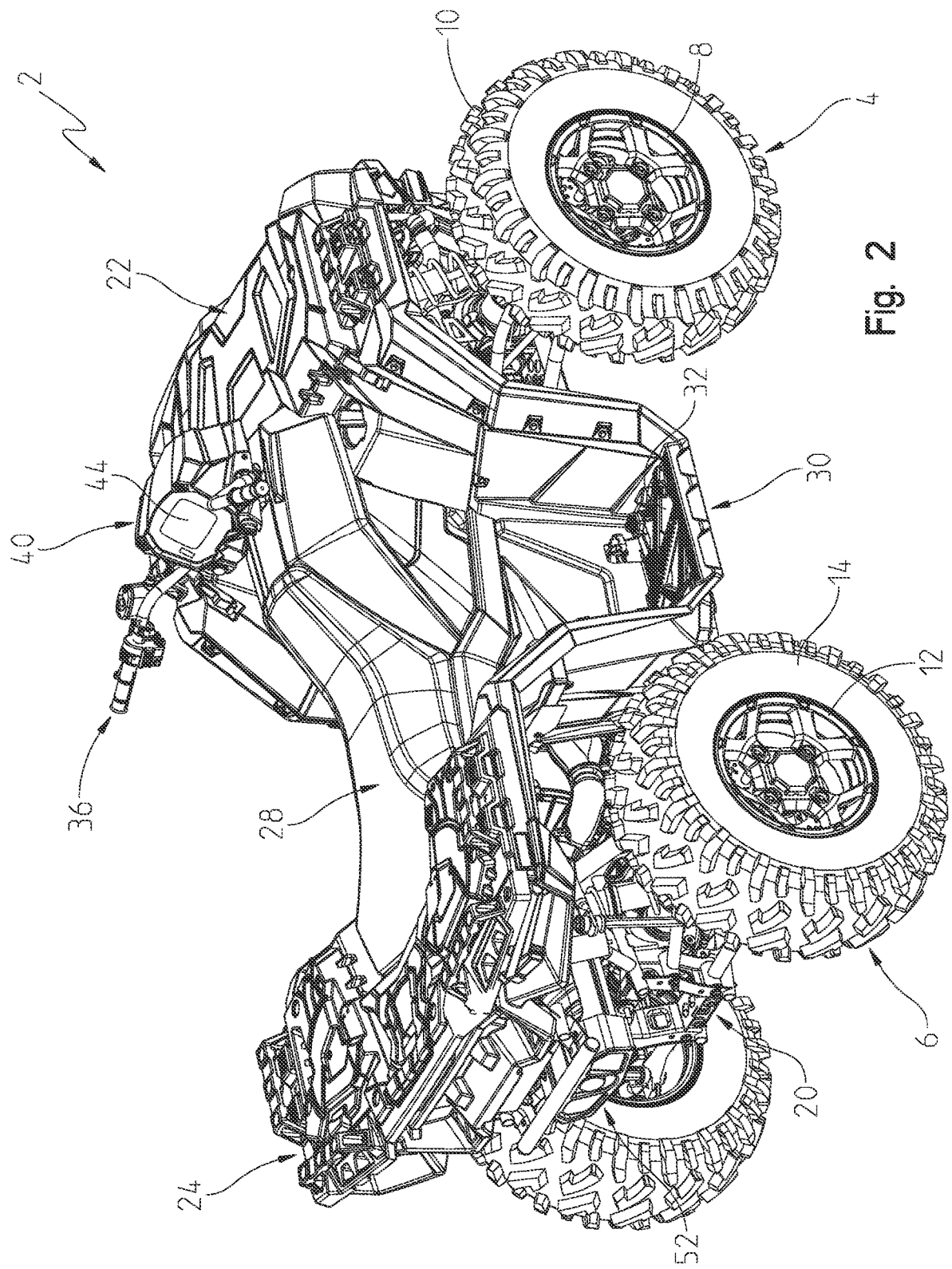
FIG. 2 is a right rear perspective view of the ATV of FIG. 1.
Figure 3:
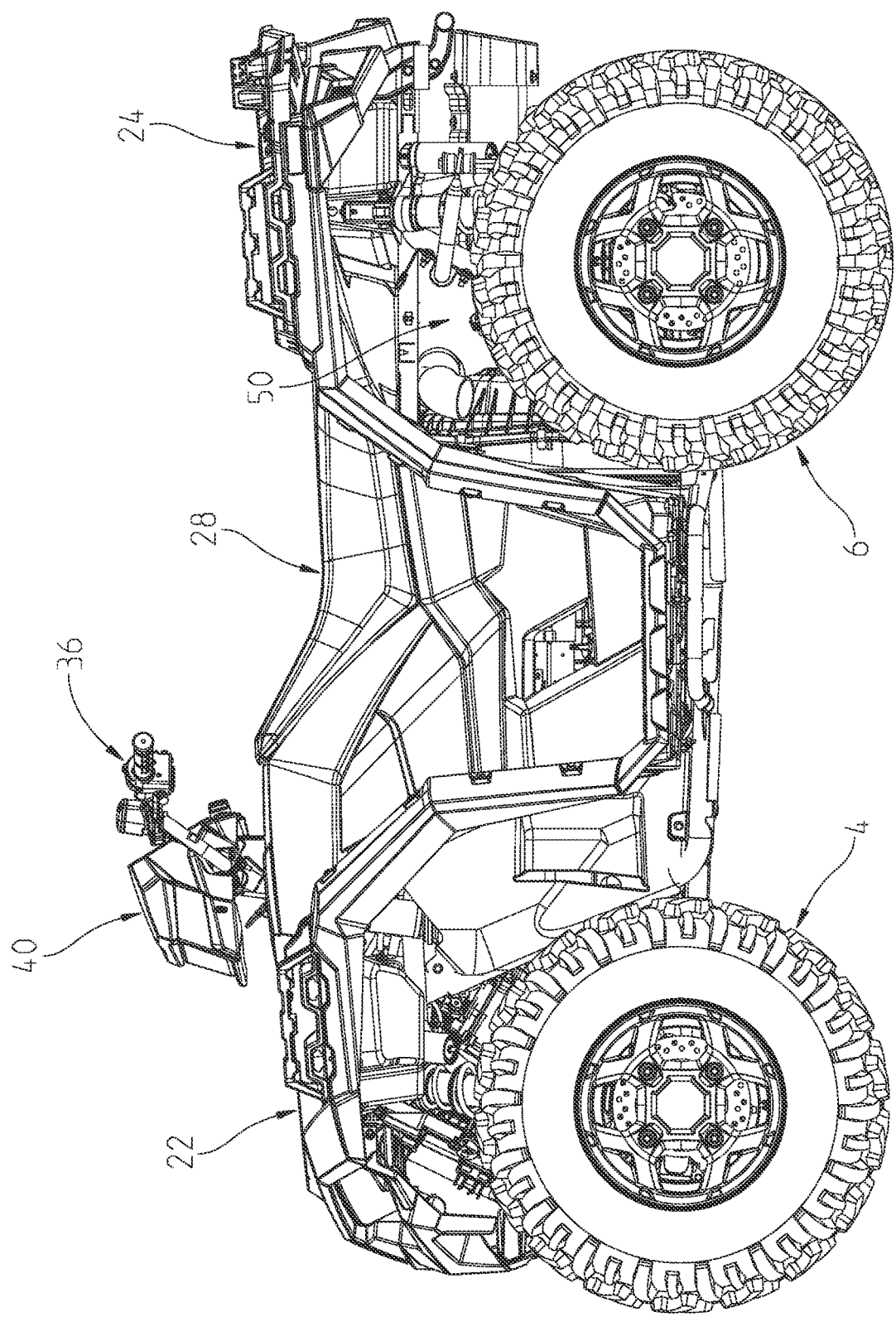
FIG. 3 is a left side view of the ATV.
Figure 4:
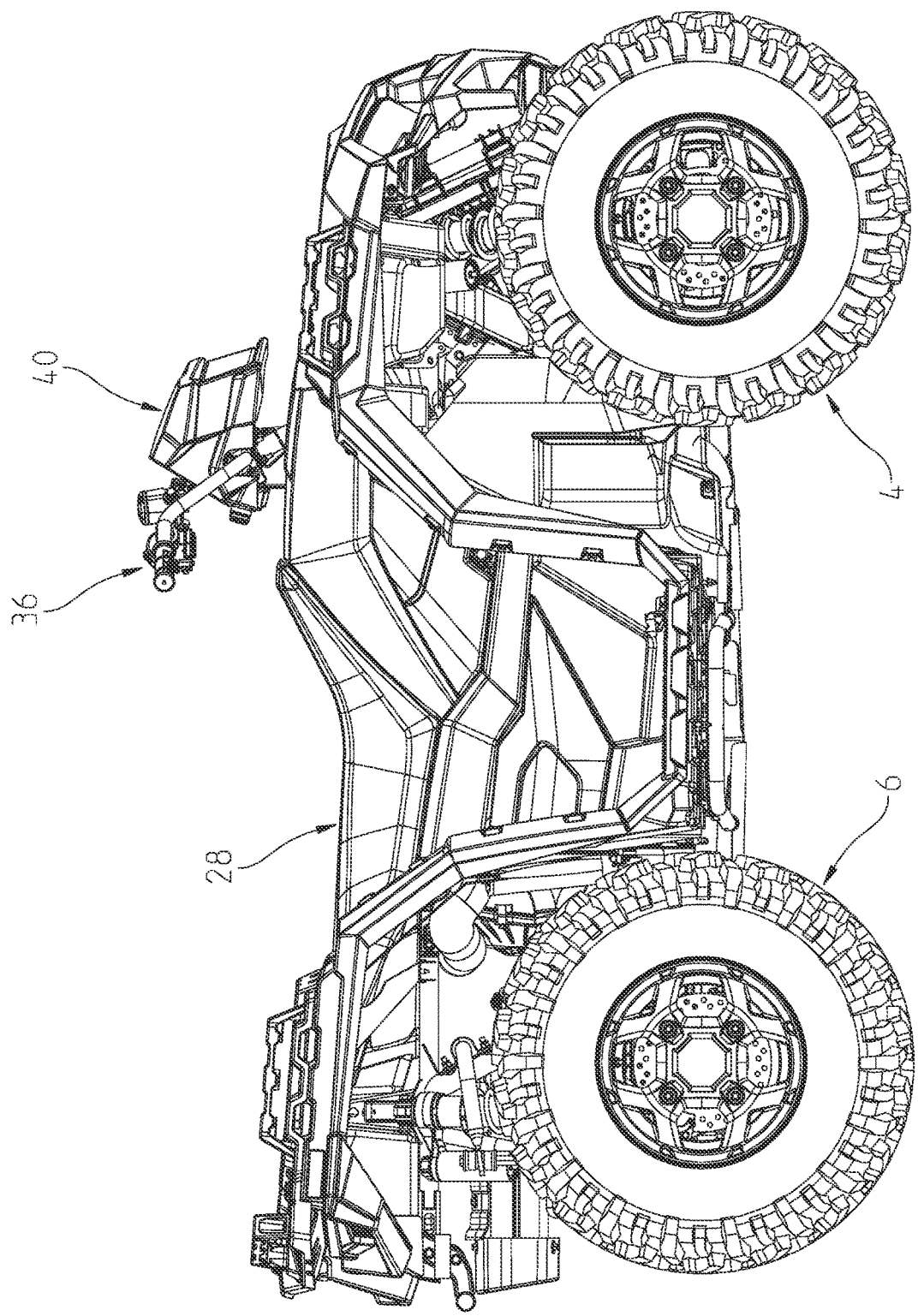
FIG. 4 is a right side view of the ATV.
Figure 5:
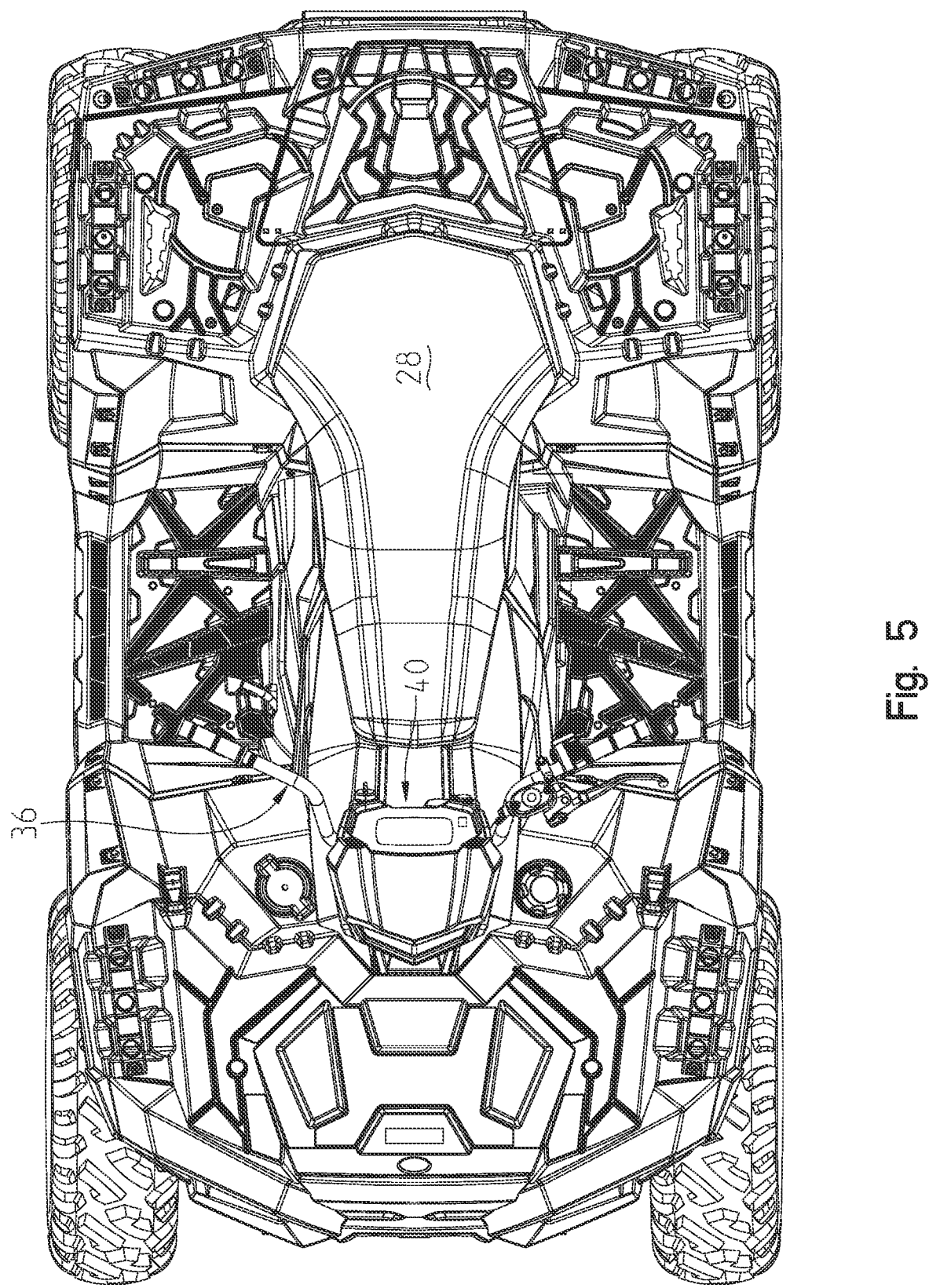
FIG. 5 is a top view of the ATV.
Figure 6:
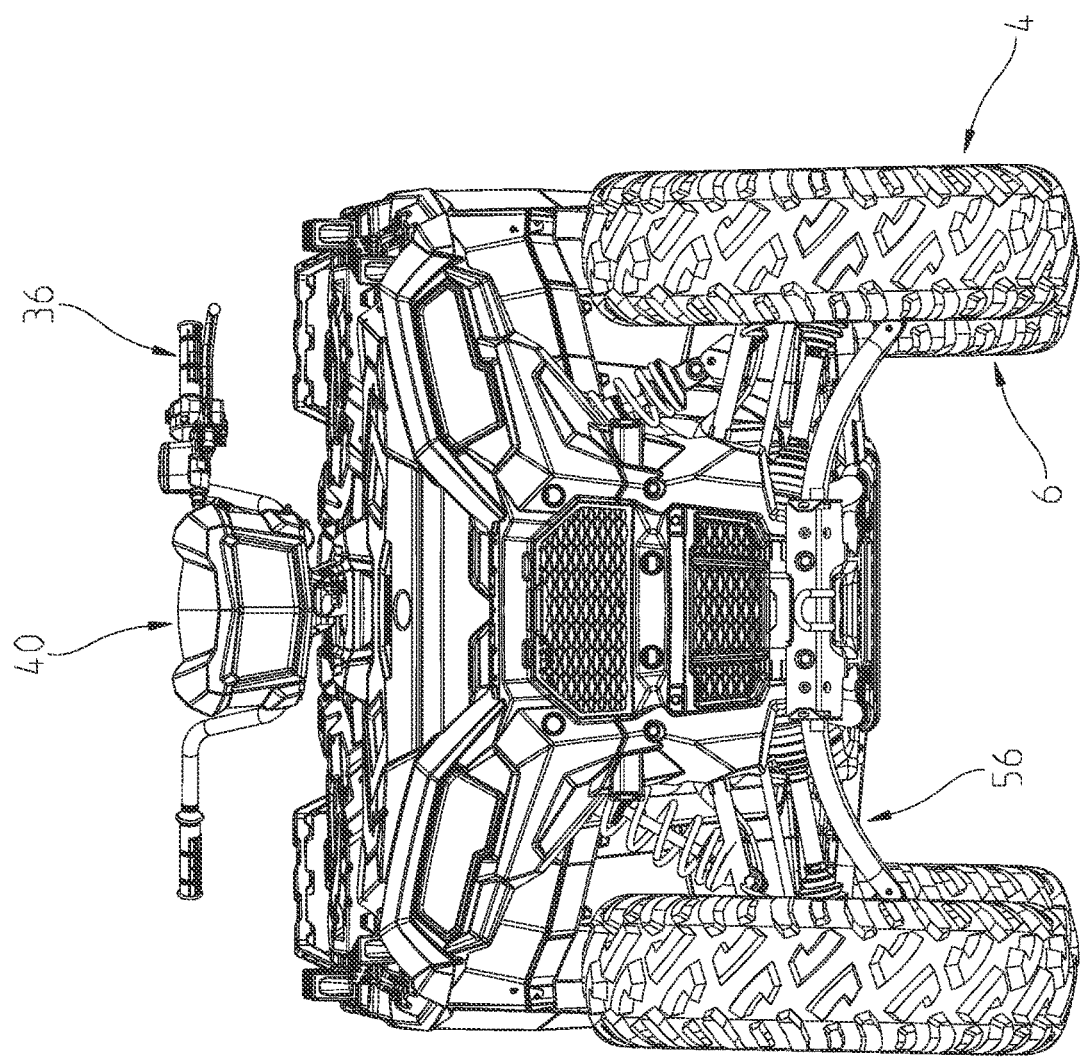
FIG. 6 is a front view of the ATV.
Figure 7:
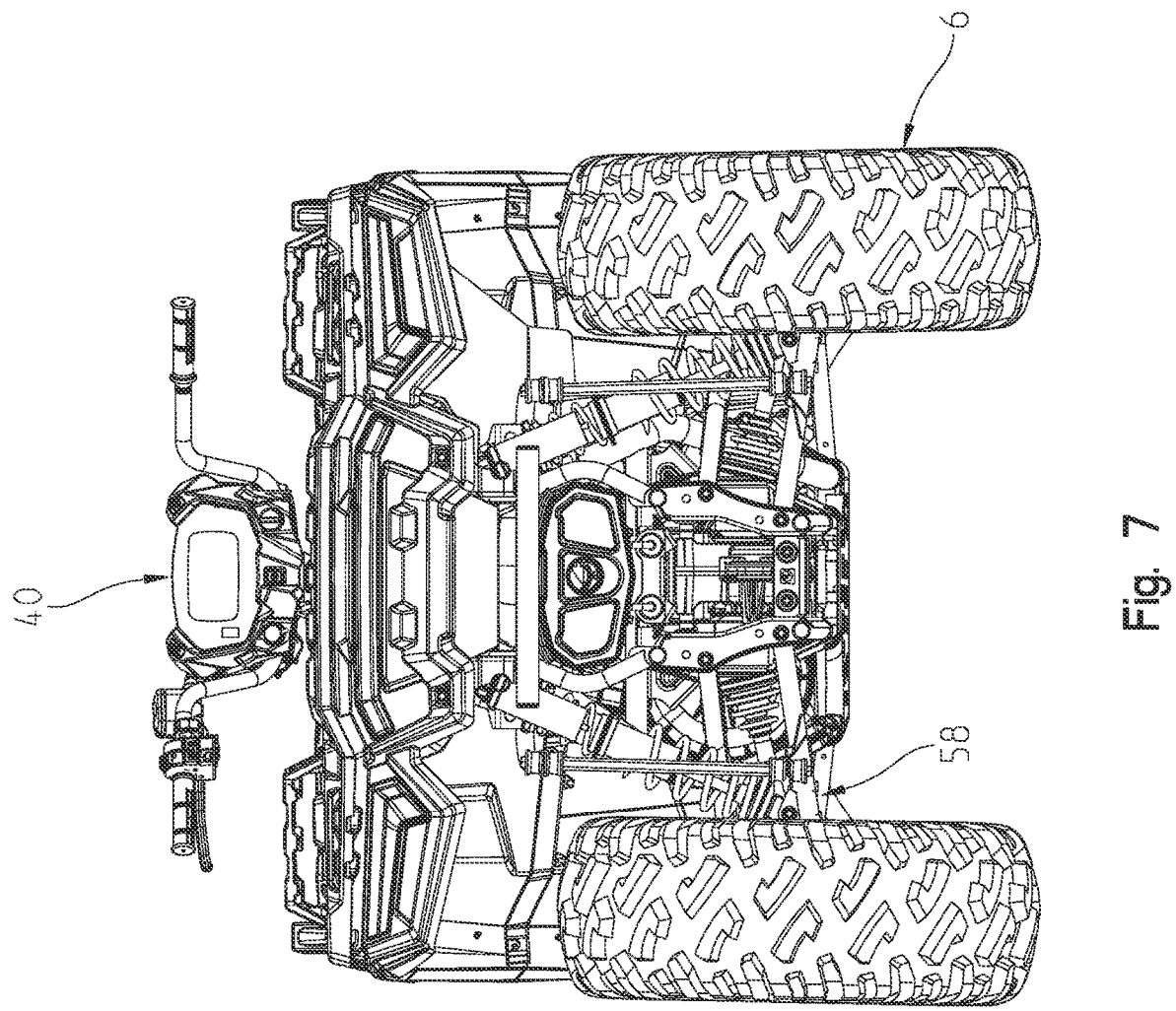
FIG. 7 is a rear view of the ATV.

With reference first to FIGS. 1-7, the ATV of the present disclosure will be described in greater detail. As shown, ATV is shown generally at 2 and comprises front wheels 4 and rear wheels 6. Front wheels 4 include rims 8 and tires 10, whereas rear wheels 6 include rims 12 and tires 14. Wheels 4 and 6 support a frame 20 which in turn supports a front body portion 22, a rear body portion 24 including a rack 26, a seat 28 and a mid-body portion 30 including a foot well 32. ATV 2 includes a steering system 36 including handlebars 38 for steering ATV 2, as described herein. A pod 40 is coupled to handlebars 38 and includes a headlight 42 (FIG. 1) and a control display 44 (FIG. 2). ATV 2 further comprises a powertrain 50 (FIG. 3) including an exhaust system 52 (FIG. 2). Finally, ATV 2 includes a front suspension system 56 (FIG. 6) and a rear suspension 58 (FIG. 7).

As will be disclosed herein, ATV 2 can be provided in two widths, that is a 48" width and a 55" width. In accordance with the present disclosure, the frame 20, body components 22, 24 and 30, and powertrain 50 are identical for the two vehicle widths. Rather, the front and rear suspensions 56, 58 interchange to provide the wider vehicle, as disclosed herein.

Figure 8:
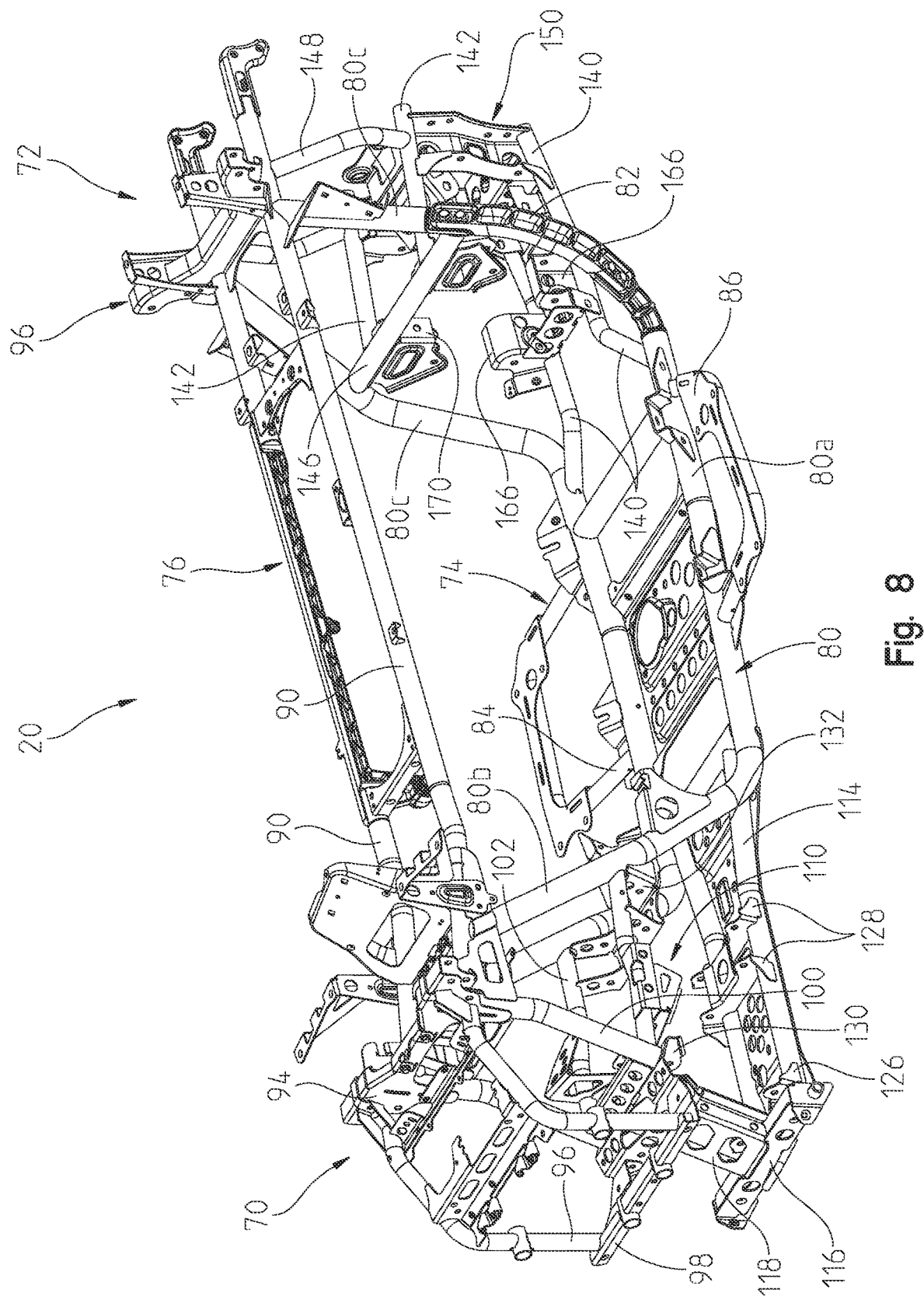
FIG. 8 is a front left perspective view of the frame for the ATV of FIGS. 1-7.
Figure 9:
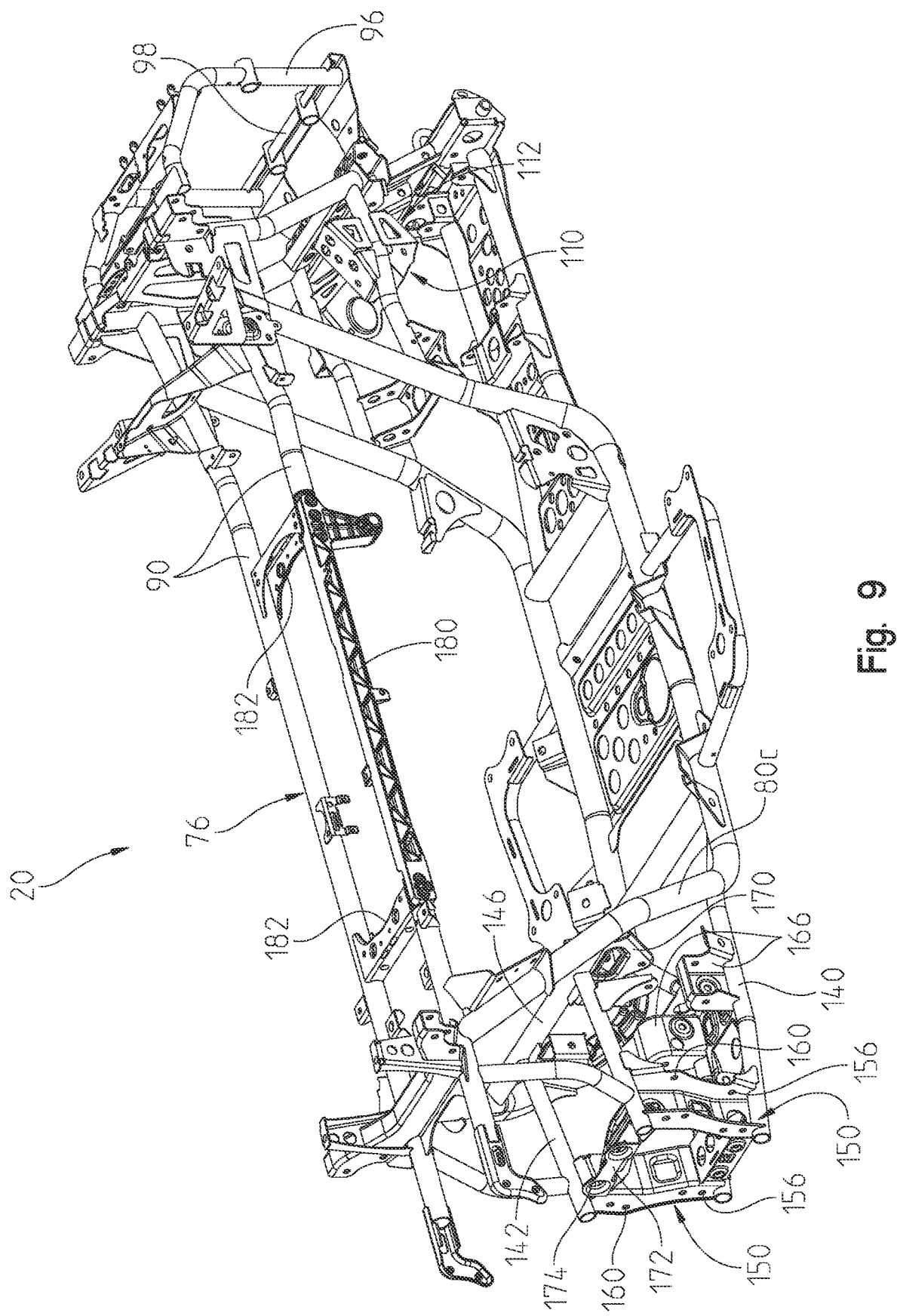
FIG. 9 is a right rear perspective view of the frame of FIG. 8.

With reference now to FIGS. 8 and 9, frame 20 will be described in greater detail. As shown, frame 20 includes a front frame portion 70, a rear frame portion 72, a foot support portion 74 and a seat support portion 76. Frame 20 is generally defined by longitudinally extending tubes 80 having horizontal sections 80a, which turn upwardly and forwardly at portions 80b and turn upwardly and rearwardly at portions 80c. A removable forging 82 is provided on the driver's side of the vehicle, such that removal provides an access opening for installing or servicing components of the ATV. Foot support portion 74 is defined by a U-shaped tube 84 coupled to the two portions 80a and including mounting brackets 86. Seat support portion 76 is defined by longitudinally extending tubes 90 which couple at the top ends of frame tube portions 80b and 80c. Front ends of tubes 90 terminate in a cross brace 94, while tubes 90 support a rear cross brace 96.

Front frame portion 70 includes front tubes 96 extending upwardly from a cross brace 98 to couple to a front side of cross brace 94. Upright tubes 100 extend upwardly from cross brace 98 and couple with tubes 96. Tubes 102 extend longitudinally between tube portions 80b and tubes 100, and support a steering system support bracket 110, as described further herein. Bracket 110 includes a lower bracket portion 112 fixed to tubes 102, for example, by welding. Frame 20 further includes lower tubes 114 which couple between tubes 80 and a front brace 116, where brace 116 includes an upright portion 118 which couples to cross brace 98. Four attachment brackets are provided for mounting of the front suspension 56, namely, a front lower bracket 126, a lower rear bracket 128, an upper front bracket 130 and an upper rear bracket 132. These same brackets 126, 128, 130 and 132 are replicated on the right hand side in a mirror image configuration.

Rear frame portion 72 includes lower tubes 140 coupled to tubes 80a which extend rearwardly, while longitudinal tubes 142 extend rearwardly from a cross tube 146. Vertical tubes 148 extend upwardly between tubes 142 and 90. Braces 150 extend upwardly between tubes 140 and 142 and provide a first attachment point 156 (FIG. 9) for a rear lower coupling for the rear suspension 58 and an upper coupling point 160 for the rear suspension 58. A front lower bracket 166 is coupled to each of the tubes 140 for a front lower coupling point of rear suspension 58, while an upper bracket 170 provides coupling for a front upper coupling point for rear suspension 58. A muffler support 172 is positioned at a rear of the frame 20 and straddles frame members 142, and includes apertures 174.

Finally and with respect to seat support portion 76, a forging 180 is provided, interrupting a length of the passenger side tube 90 which couples to cross braces 182 and which is removable for the assembly and/or servicing of the vehicle components, such as powertrain components.

Figure 10:
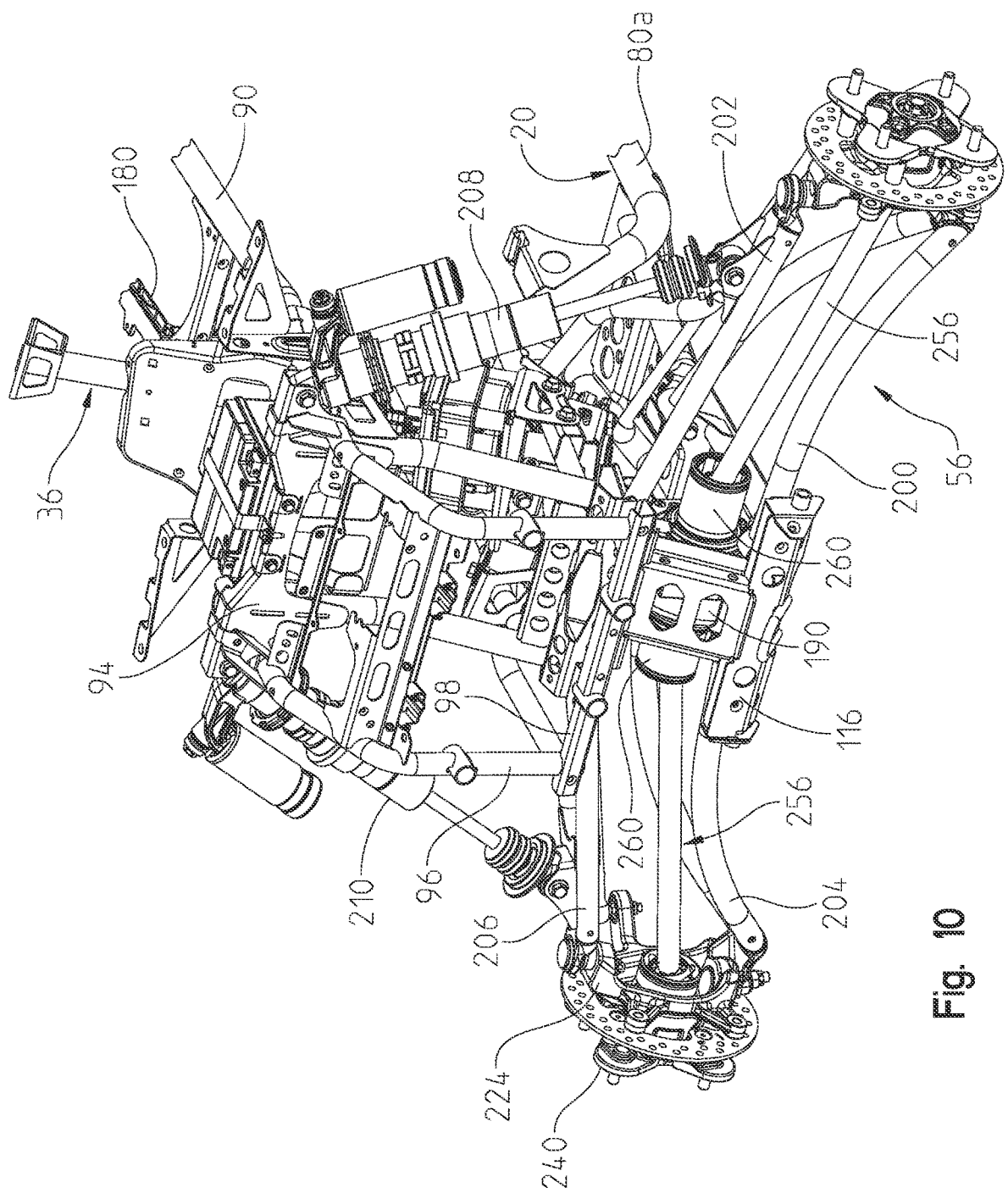
FIG. 10 is a front left perspective view of a 55" wide version of the ATV showing the front suspension and steering system.

With reference now to FIGS. 10-16, the front suspension 56 of the 55" vehicle will be described. With reference first to FIG. 10, a front end of the vehicle is shown without the wheels and the front body 22 which exposes the front suspension 56 and frame 20. A front drive 190 is also shown to drive the front wheels 4 from the powertrain. As is known, at the front end of the vehicle, the steering system 36, the front suspension 56 and the front drive 190 all cooperate together.

As shown in FIG. 10, front suspension 56 includes a lower left A-arm 200, upper left A-arm 202, lower right A-arm 204 and upper right A-arm 206. Shock absorbers 208 and 210 couple between upper A-arms 202, 206 and upper brace 94, respectively. Inner ends of lower left A-arm 200 couple to coupling points 126, 128 (FIG. 8), while inner ends of upper left A-arm 202 couple to coupling points 130, 132 (FIG. 8). Right A-arms 204, 206 are likewise coupled to like coupling points of the frame 20 on the right-hand side. As shown best in FIG. 12, upper A-arms 202 and 206 have an upwardly directed bend at 220 which is profiled to provide clearance for steering arm 222. As will be discussed further herein, steering arm 222 is coupled at an inner end to a motor of the steering system 36, and is coupled at its outer end to knuckle 224. Knuckle 224 is coupled to A-arms 204, 206 by way of pins 230, 232. Knuckle 224 includes an extension 234 which couples to threaded posts 236 of steering arm 222. Wheel hubs 240 are provided having studs 242 for mounting wheels 4.

Figure 13:
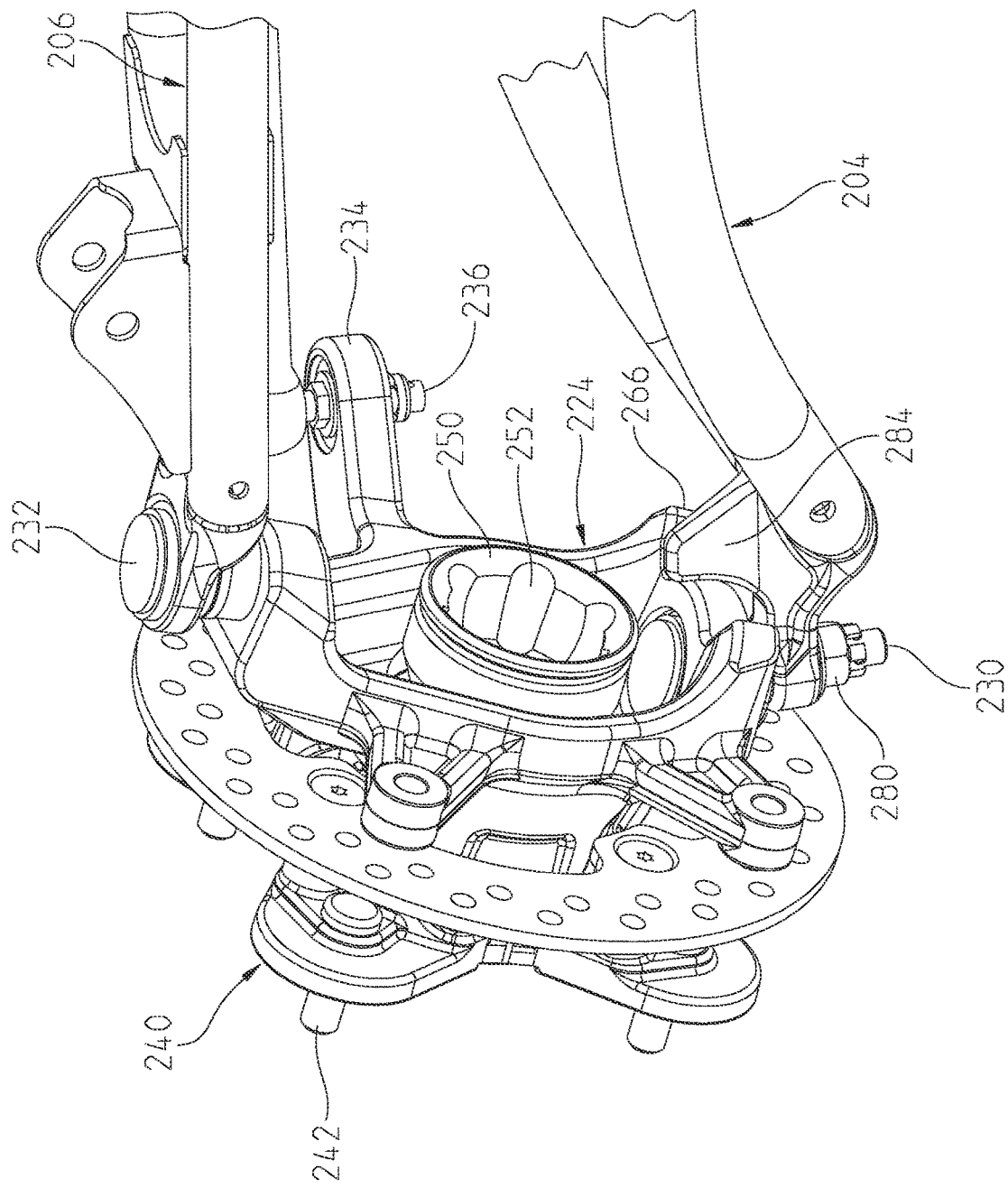
FIG. 13 is a front left perspective view of the wheel hub shown in FIG. 12.
Figure 14:
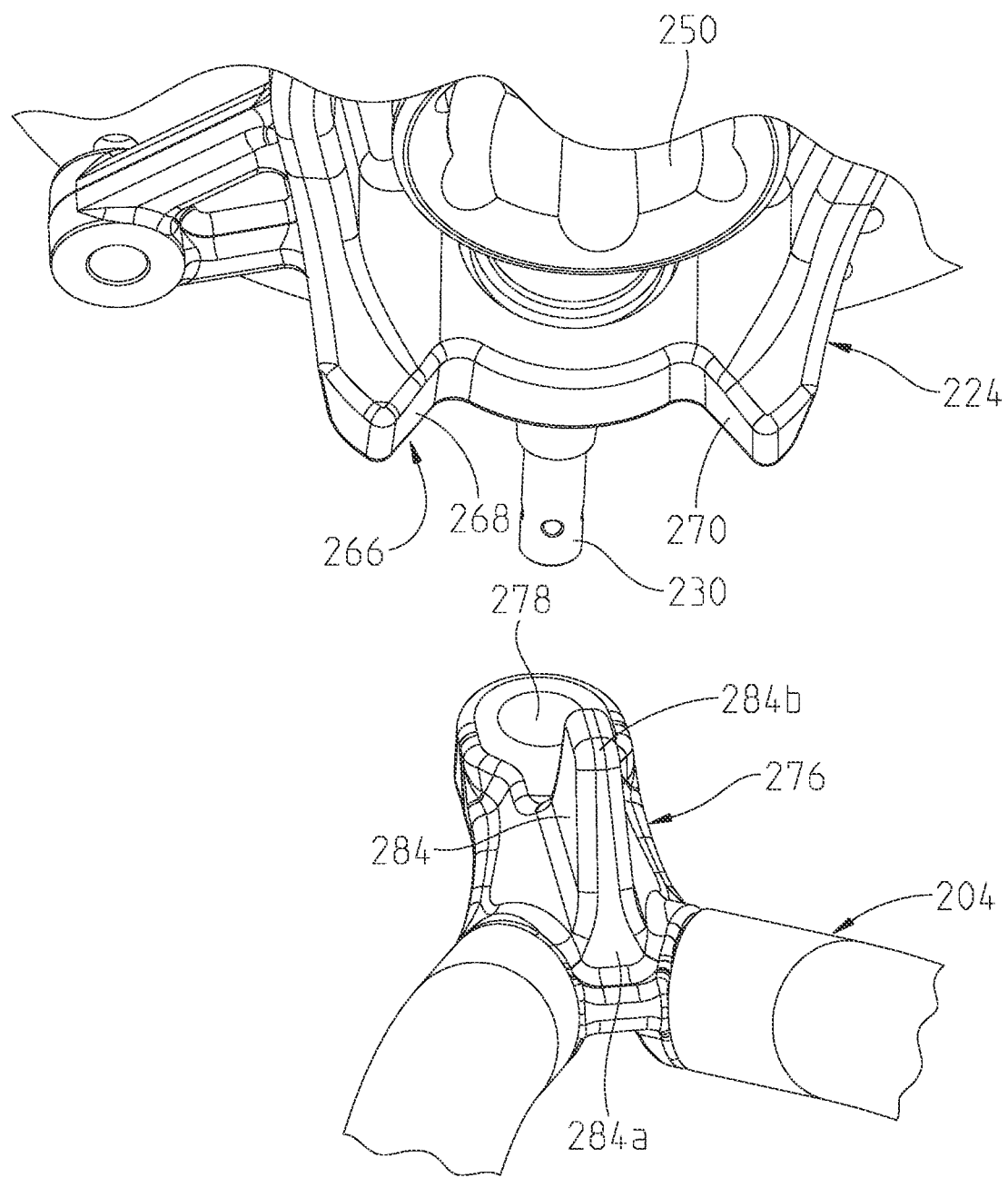
FIG. 14 is an exploded view of the wheel hub coupling to the lower A-arm of FIG. 13.

As shown best in FIG. 13, hub 240 includes a constant velocity joint 250 having an inner profiled geometry 252 which is suitable for driving by way of a half shaft (or constant velocity (CV) shaft) 256 (FIG. 10), as is known in the art. Inner ends of half shafts 256 likewise include drive portions to be driven by constant velocity couplings 260 (FIG. 10) from the drive unit 190. As shown best in FIGS. 13 and 14, knuckle 224 includes an integrated stop member 266 in the form of an arcuate slot having extreme contact surfaces 268 and 270 (FIG. 14). Meanwhile, lower right A-arm 204 includes a coupling 276 having an opening at 278 which is received over pin 230 to receive a castellated nut 280 (FIG. 13) to couple lower A-arm 204 to knuckle 224. As shown, coupling 276 includes an integrated stop member 284 defining an upstanding post having a shark fin geometry, whereby hub 224 can rotate about an axis defined by pins 230, 232 to the extreme positions where surface 268 or 270 contacts stop member 284.

The forging also makes contact at a 45° angle instead which increased the strength significantly. This design is lighter and gives greater control to the stop. The shark fin 284 is wider at the base 284a, as compared to the top 284b, (see FIG. 14) which allows a progressive steering stop and limits the steering angle as the wheel travels downward to protect the half shafts 256 (FIG. 10) at suspension full extension.

Figure 15:
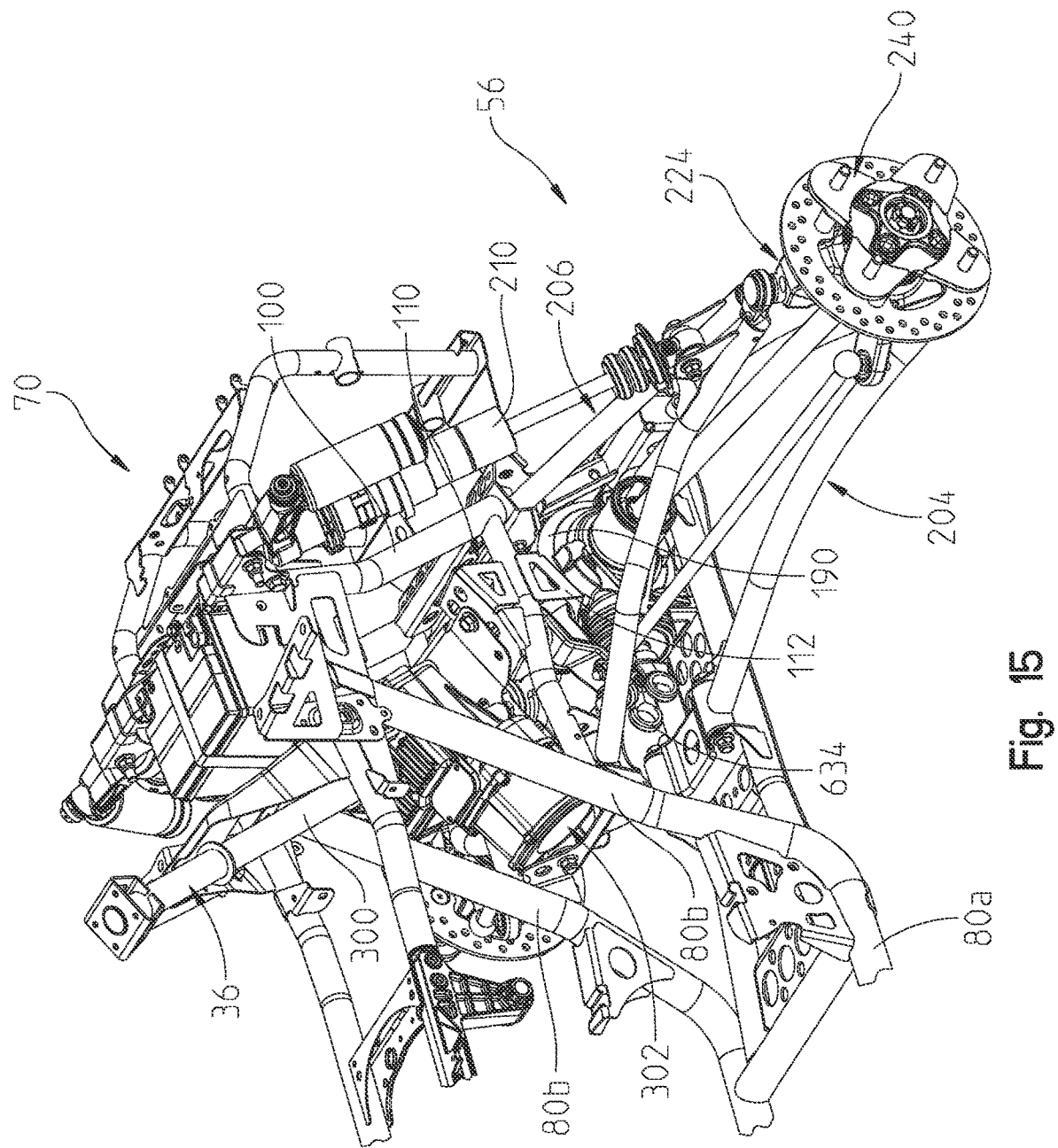
FIG. 15 is a right rear perspective view of the ATV shown in FIG. 10.
Figure 16:
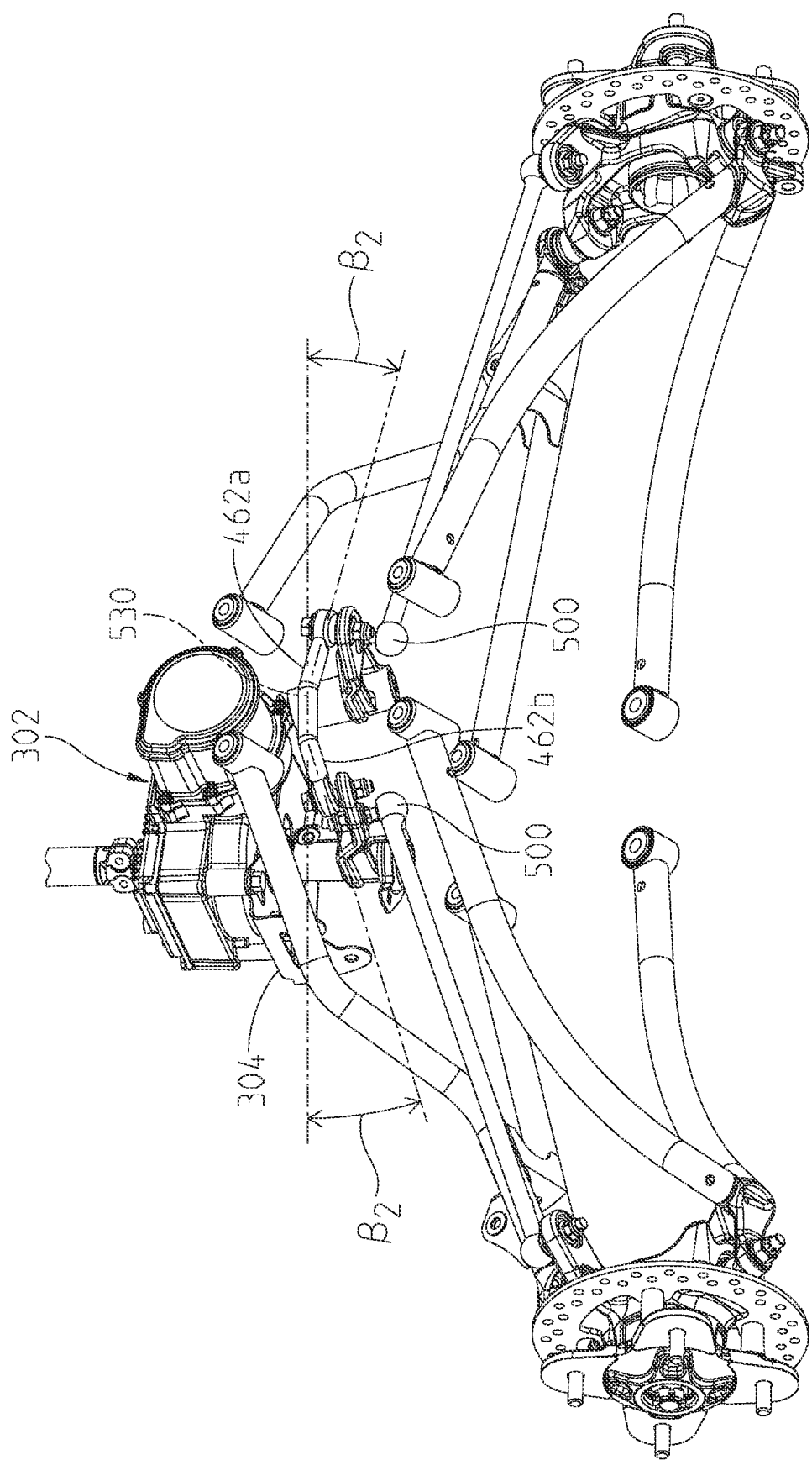
FIG. 16 is an underside perspective view of the suspension and steering system.
Figure 17:
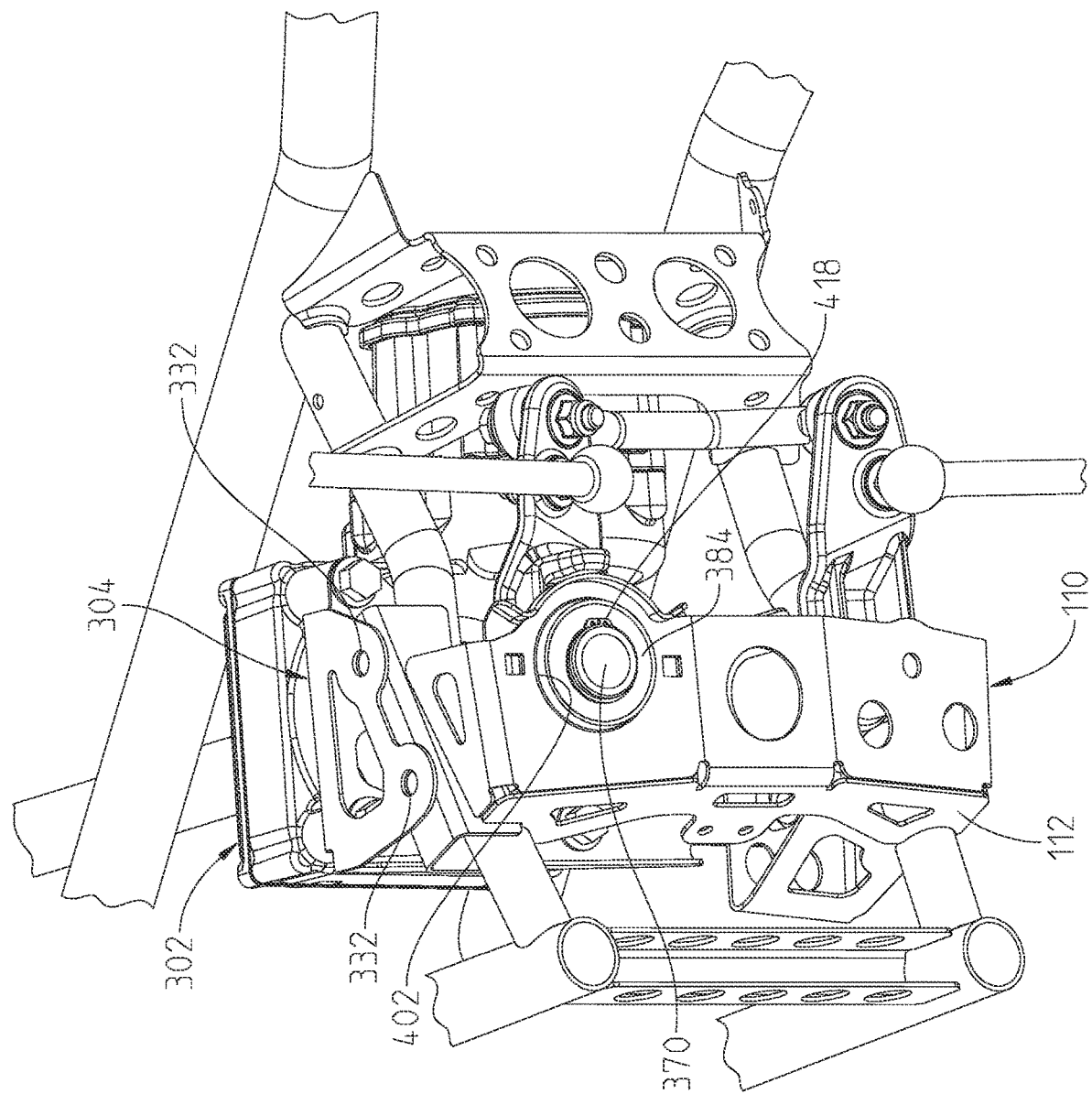
FIG. 17 is an underside perspective view showing the electric power steering unit mounting and the steering arm linkage.
Figure 18:
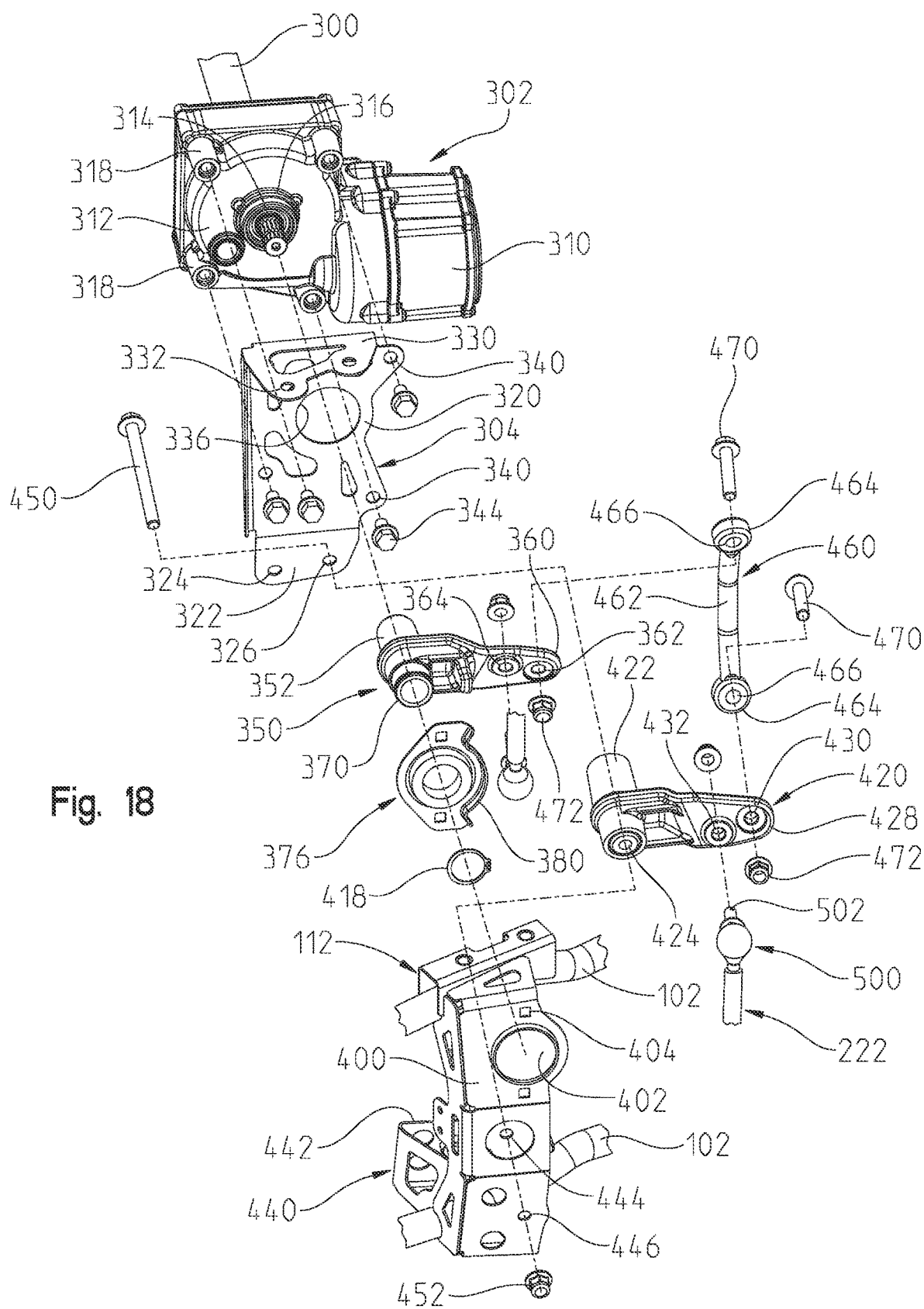
FIG. 18 is an exploded view of the electric power steering unit mounting and steering linkage of FIG. 17.

With reference now to FIGS. 15-21, steering system 36 will be described in greater detail. With reference first to FIG. 15, steering system 36 includes a steering post 300 extending downwardly from handlebars 38 (FIG. 1) to a power steering motor 302. As shown best in FIG. 17, steering system support bracket 110 further comprises an upper bracket portion 304. Steering motor 302 is coupled to bracket portion 304 (FIG. 16), which in turn couples to lower bracket portion bracket 112 (FIG. 15). With reference now to FIGS. 17 and 18, the mounting of steering motor 302 will be described in greater detail. As shown best in FIG. 18, power steering motor 302 includes a motor portion 310 and an output portion 312 having a splined drive shaft 314 extending through a bearing cap 316. Four threaded bosses 318 are provided for coupling to bracket 304. As shown, bracket 304 includes an upper plate 320 having a bracket tab 322 extending from one end thereof having apertures 324 and 326. At the opposite end, a bracket sidewall is provided at 330 having apertures at 332 (FIG. 17). Plate portion 320 includes an enlarged aperture at 336 (FIG. 19) which fits over bearing cap 316, as best shown in FIG. 17. Plate portion 320 further includes apertures 340 (FIG. 19) which align with the threaded bosses 318 to receive fasteners 344 therethrough coupling bracket 304 to a lower side of steering motor 302, as shown best in FIG. 18.

Figure 19:
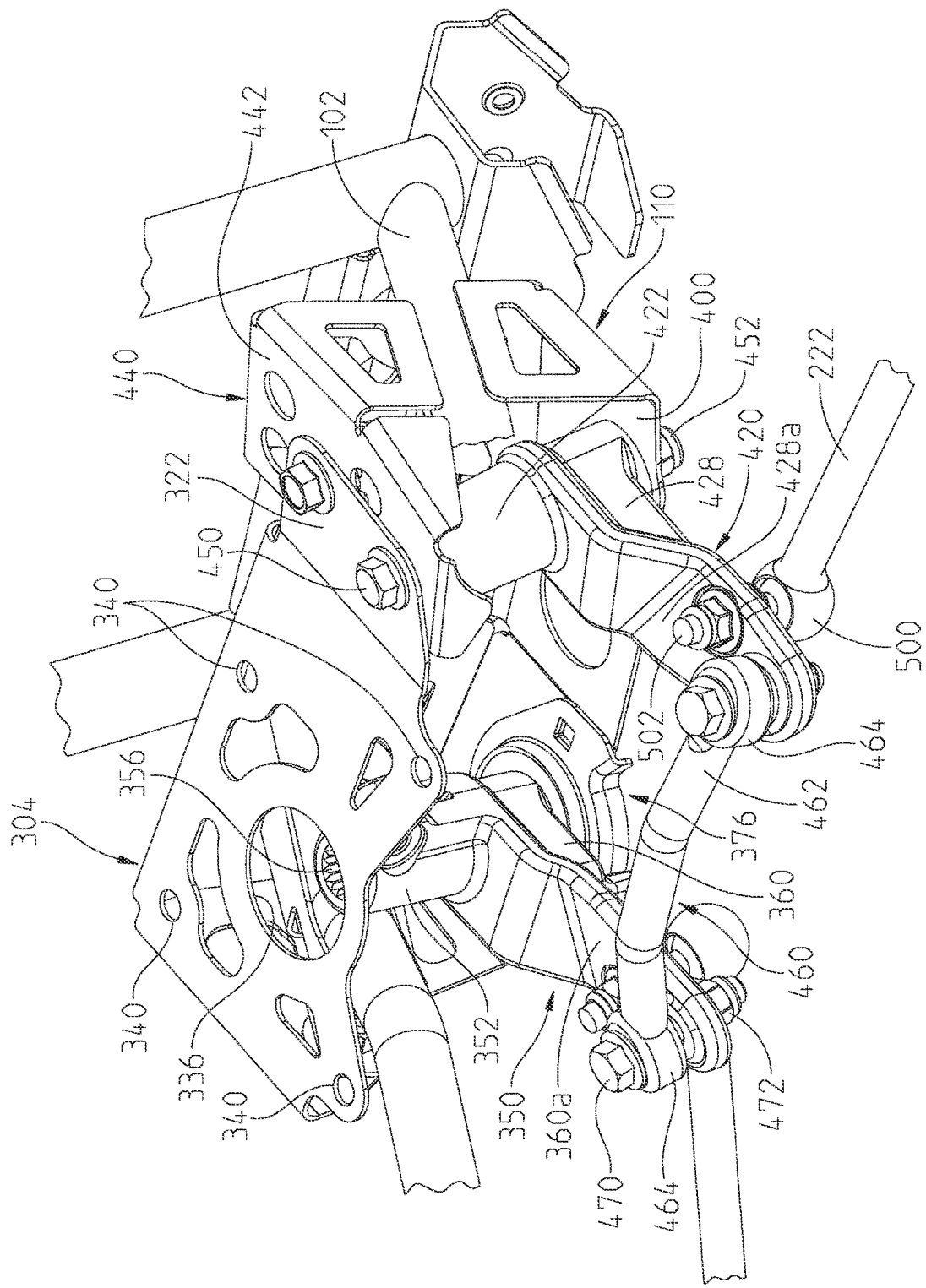
FIG. 19 shows a rear right perspective view of the steering linkage of FIG. 18.

As should be appreciated, when bracket 304 is coupled to the bottom of steering motor 302, splined shaft 314 protrudes through aperture 336. A drive pitman arm 350 is provided having a coupling 352 having an inner spline 356 (FIG. 19). Pitman arm 350 includes an arm portion 360 having an aperture 362 adjacent a free end of the arm 360 and an aperture 362 intermediate aperture 362 and shaft portion 370. Shaft portion 370 is received in a bearing assembly 376 having a plate portion 378 (FIG. 21) including a rotatable stop portion 380 having stop surfaces 380a and 380b with a bearing 384 extending therethrough. Bearing assembly 376 can be coupled to lower bracket 110 as described herein. Lower bracket 112 includes a plate portion 400 (FIG. 18) having an aperture at 402 to receive bearing portion 384. Plate portion 400 includes square apertures 404 which align with square apertures 406 on bearing assembly 376 which, as can be appreciated, receive carriage bolts therethrough to couple the bearing assembly 376 to the plate portion 400.

Figure 21:
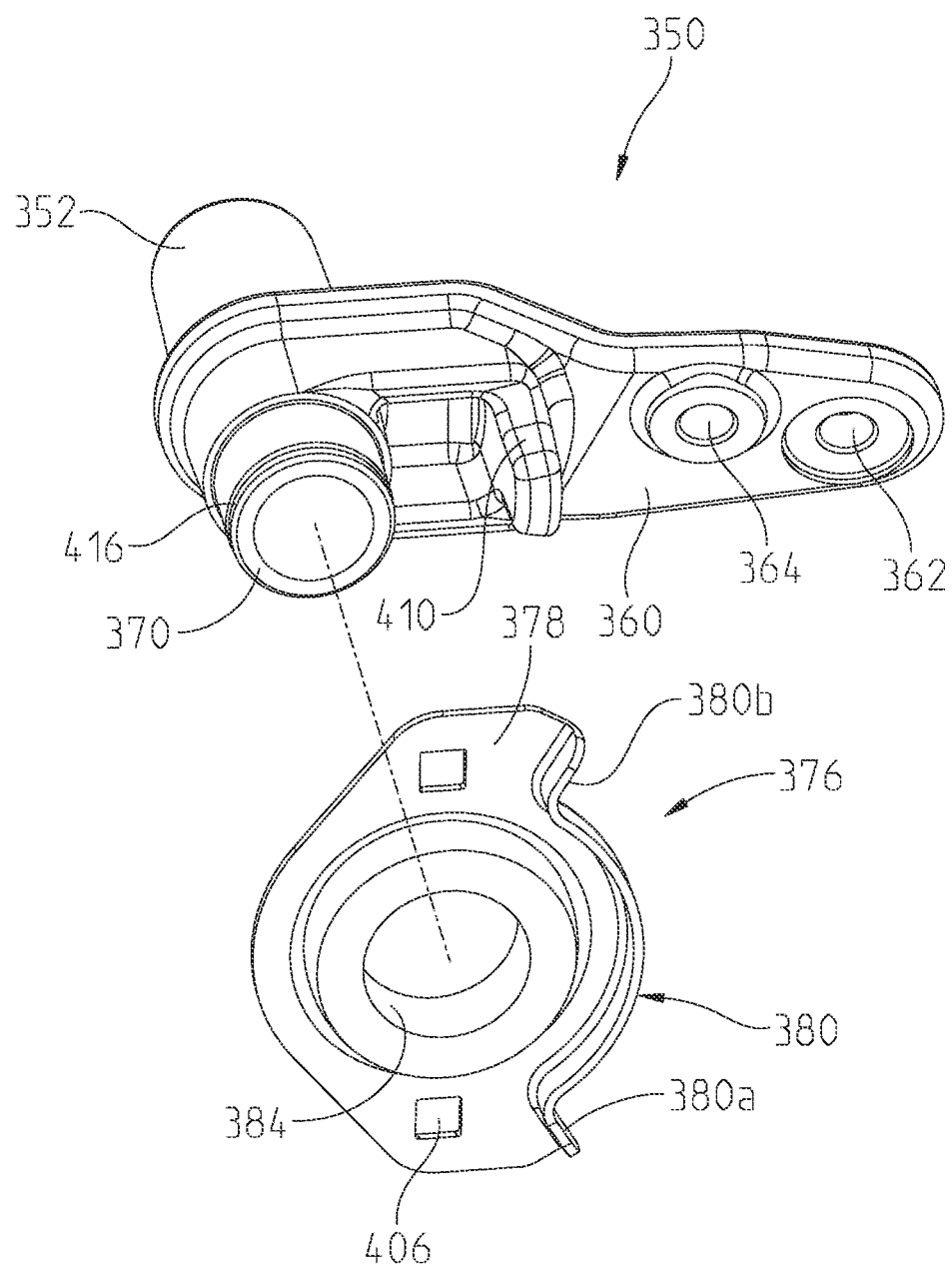
FIG. 21 is a lower perspective view showing the driven pitman arm together with the steering stop.

As shown best in FIG. 21, drive pitman arm 350 includes a stop member 410 which rotates between the extreme portions of surfaces 380a and 380b under the influence of splined shaft 314. Finally, drive pitman arm 350 includes a groove 416 (FIG. 21) to receive a snap ring 418 (FIG. 18), therein which retains the shaft portion 370 in the bearing 384, and the pitman arm 350 to the splined shaft 314. The steering stop 380, 410 on the post protect the CV shafts 256 primarily, the post stop protects the wheels 4 from contacting the bodywork during neutral suspension position. The plate 380 is interchangeable and allows adjustment of the stop position which is important at the neutral position when larger tires are desired.

Figure 20:
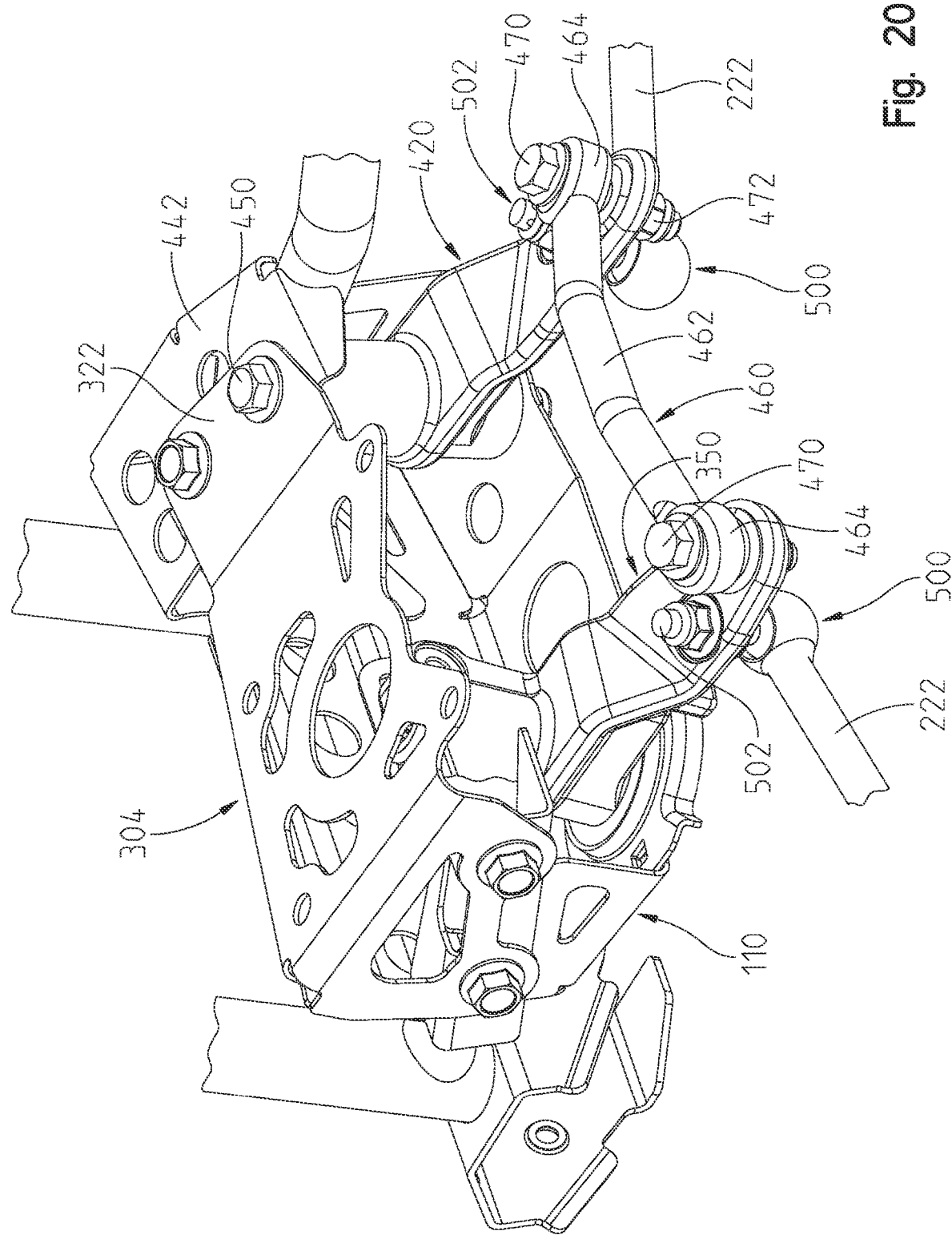
FIG. 20 is a rear left perspective view of the linkage of FIG. 19.

As shown best in FIG. 18, a driven pitman arm is shown at 420 which is similarly constructed as pitman arm 350, however it does not have a splined shaft as it is driven by pitman arm 350. Rather, pitman arm 420 includes a cylindrical bearing portion 422 having a through opening at 424. Pitman arm 420 also includes an arm portion 428 having apertures 430 and 432. As shown best in FIG. 18, bracket 112 includes a portion 440 (FIGS. 18-19), which is coupled to tubes 102 having upper plate portion 442 having an aperture 444 aligned with aperture 446 of lower plate portion 400. Thus, as shown in FIGS. 19, 20, driven pitman arm 420 can be coupled between bracket portions 112, 304 by way of a fastener 450 extending through aperture 326 of tab portion 322 extending downwardly through aperture 424 of driven pitman arm 420 and through apertures 444, 446 of bracket portion 112. A complementary fastener 452 may be coupled to fastener 450 to retain driven pitman arm 420 in place.

With reference still to FIGS. 18 and 19, drive and driven pitman arms 350, 420 are coupled together by way of a drag link 460, where drag link 460 includes a bar portion 462 having couplings 464 at each end. Each coupling 464 includes an aperture 466 which align with apertures 362 and 430 to receive fasteners 470 therethrough. Fasteners 470 couple with fasteners 472 to retain drag link 460 in a coupling relationship with the drive pitman arm 350 and driven pitman arm 420, as shown best in FIG. 19.

Finally, with respect to FIG. 18, steering arms 222 each include a ball joint 500 having a threaded end 502, where each of the threaded ends 502 is received in one of the apertures 364 or 432. Thus, as should be appreciated, input from the splined shaft 314 to drive pitman arm 350 causes a like rotation of the driven pitman arm 420 by way of drag link 460, which in turn causes transverse movement of the steering arms 222 in a push-pull relationship with the pitman arms 350, 420 depending upon the direction of rotation.

Figure 11:
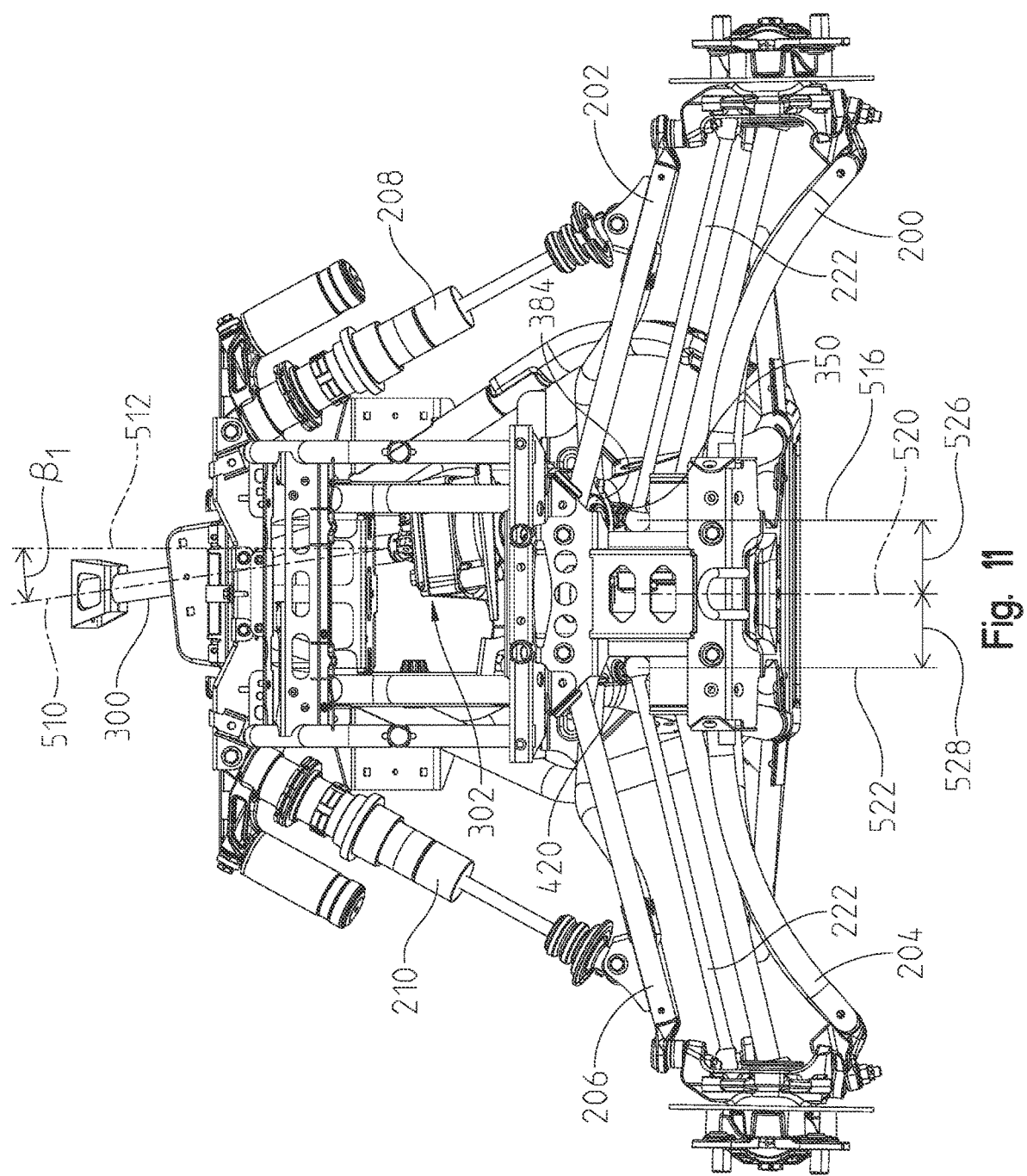
FIG. 11 is a front view of the ATV front suspension and steering system of FIG. 10.
Figure 12:
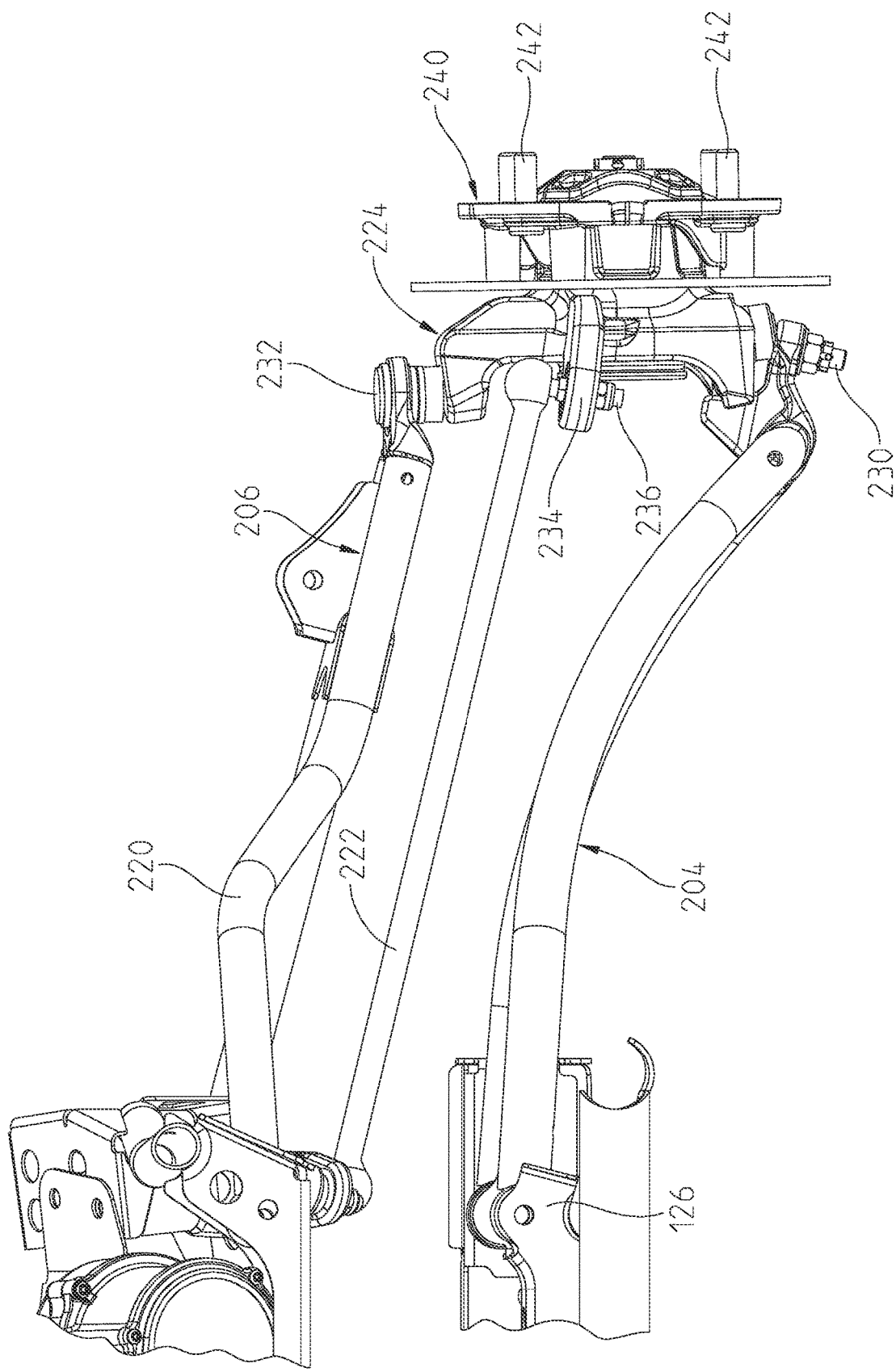
FIG. 12 is an enlarged rear view of the right-hand suspension system of FIG. 11.

With reference now to FIGS. 11 and 16, further features of the steering system will be described. As shown best in FIG. 11, the steering shaft 300 extends along a non-vertical axis 510 with respect to vertical axis 512 to provide an angular offset $\beta_1$, where $\beta_1$=approximately 8.5°, but could be in a range from 5°-12°, and more particularly from 7°-10°. This positions the center of the left inner ball joint 500 (FIG. 16) at a left vertical position 516. As shown in FIG. 11, vertical position 516 is offset from the vertical center line 520 and the vertical center 522 of the right inner ball joint 500 is laterally offset from vertical center line 520 as well. As shown, left inner ball joint 500 is offset from the vertical center line 520 by a distance of 526, whereas the right inner ball joint 500 is offset from the vertical center line 520 by a distance of 528, where distances 526 and 528 are equal, and are equal to 3.25", but could be in a range from 2"-5. Thus, the laterally offset steering motor in combination with the drag link 460 eliminates the bump steer that is introduced into the suspension.

Furthermore, with reference to FIGS. 16 and 19, each of the arm portions 360 and 428 of respected pitman arms 350 and 420 include portions skewed at 360a and 428a relative to a horizontal axis 530 such that portions 462a and 462b of drag link 460 form angles $\beta_2$ relative to horizontal axis 530, where $\beta_2$=15°, but could be in range from 10°-20°.

Figure 22:
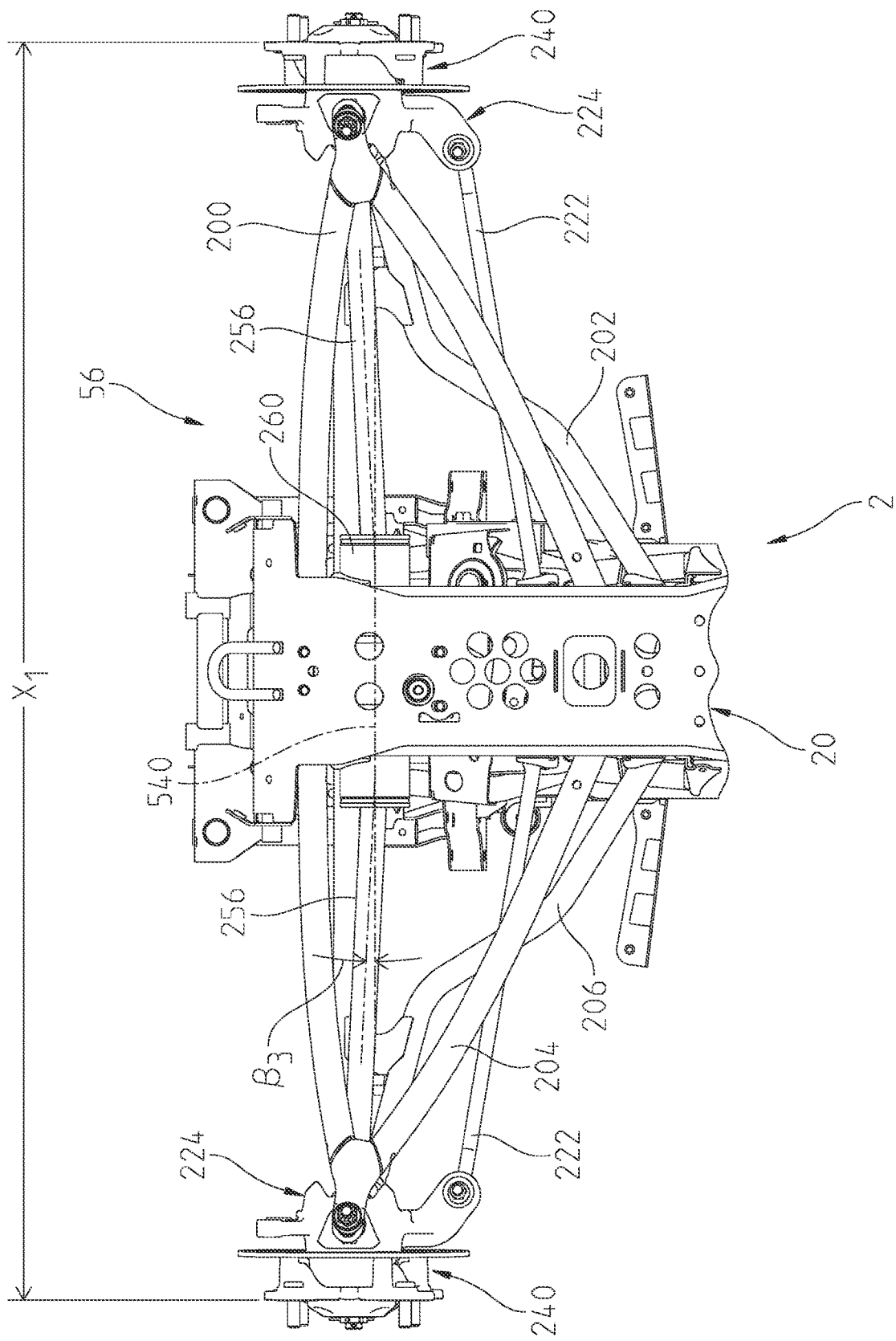
FIG. 22 is an underside view showing the suspension of a 55" wide ATV.
Figure 23:
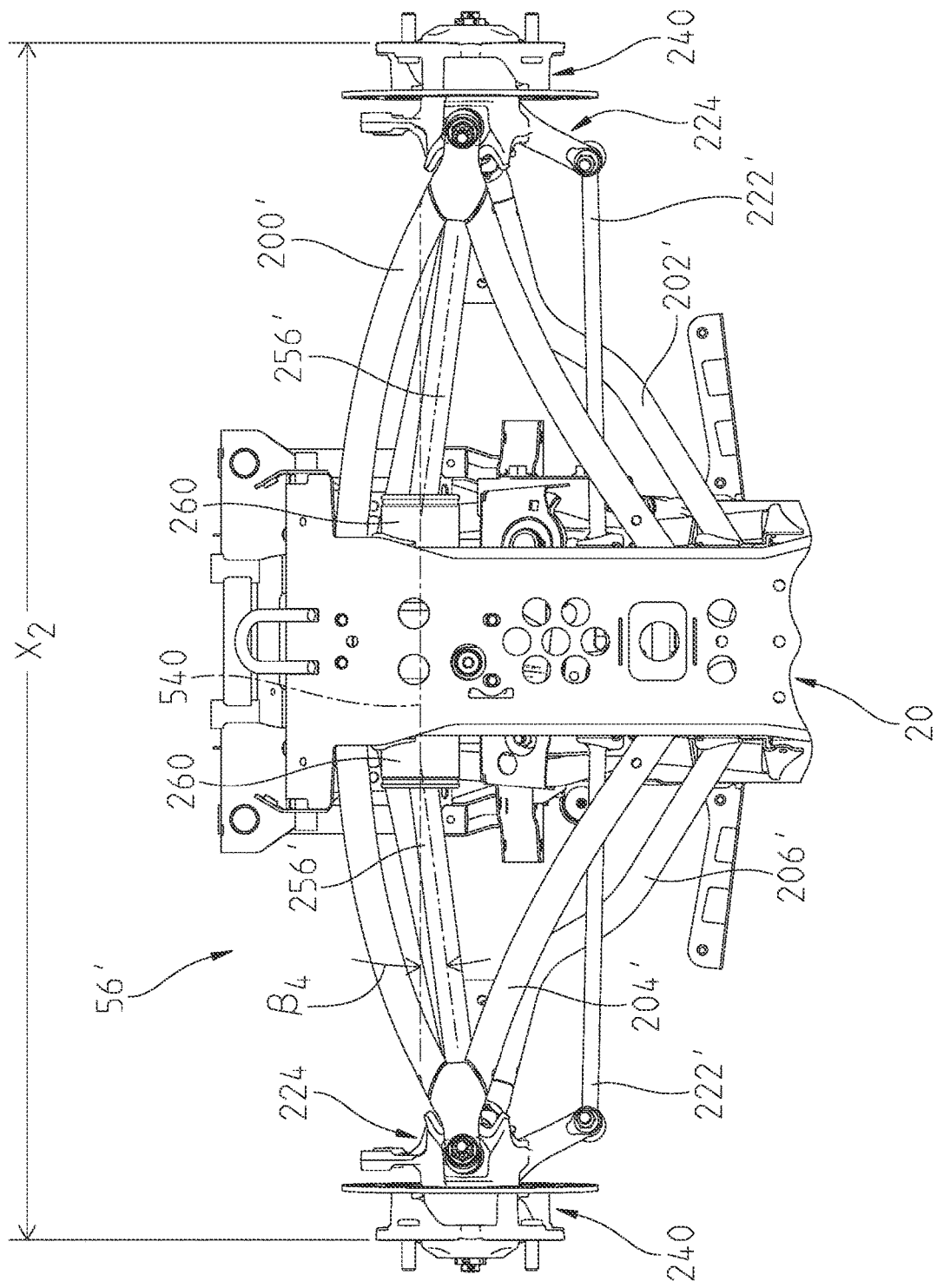
FIG. 23 shows a view similar to that of FIG. 22 showing the suspension of a 48" wide ATV.

With reference now to FIGS. 22 and 23, the front suspension of the 48" and 55" vehicles will be distinguished. With reference first to FIG. 22, ATV 2 is in the form of the 55" vehicle where a distance from outer faces of wheel hubs 240 is shown by a lateral distance $X_1$, where $X_1$=49". In this way, the distance $X_1$ plus the width dimensions of the tires would approximate the 55" width vehicle. It should also be understood that the suspension as described with respect to FIGS. 10-16, depict the 55" vehicle such that the upper and lower A-arms 200, 202; 204, 206 relate to the 55" vehicle. The half shafts 256 are also of a different length to accommodate the wider vehicle. As shown in FIG. 22, the wheel hubs 240 are positioned further forward relative to the frame 20 such that the half shafts 256 sweep forward relative to a horizontal center line 540 through the couplings 260. As shown, the half shafts 256 are swept forward by an angle $\beta_3$, where $\beta_3$=2.8°, but could be in a range from 0°-5°.

With reference now to FIG. 23, the front suspension for the 48" vehicle is shown at 56', where the front suspension 56' includes left A-arms 200' and 202' and right A-arms 204' and 206'. The half shafts 256' are also of a different length to accommodate the lateral difference between the couplings 260 and the hubs 240. As shown, the lateral distance between front faces of the hubs 240 is $X_2$, such that the distance $X_2$ plus the width of the wheels equates to the 48" vehicle. As shown, $X_2$=42". As also shown in FIG. 23, the half shafts 256' are swept rearwardly relative to the lateral center line 540 such that an angle $\beta_4$ is defined which reduces the wheel base of the vehicle relative to the 55" vehicle described in FIG. 22. As shown, the steering system 36 of the 48" and 55" vehicle are identical with the exception that the steering arms 22' of the 48" vehicle are somewhat shorter to accommodate the width difference of the vehicles. As also shown, $\beta_4$=7.4°, but could be in a range from but could be in a range from 5°-10°.

Figure 24:
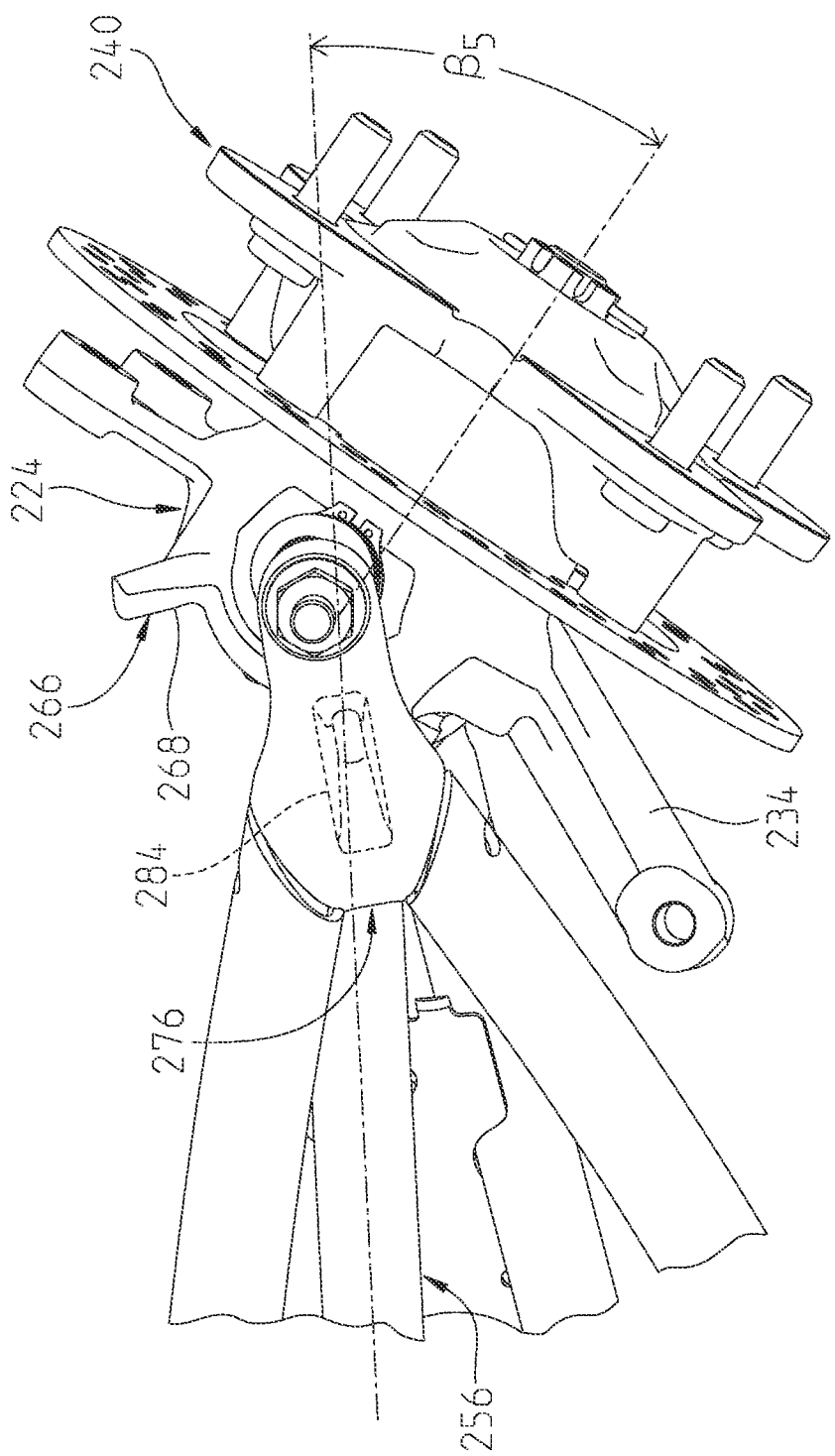
FIG. 24 shows a bottom view of the left side suspension of a 55" wide ATV.
Figure 25:
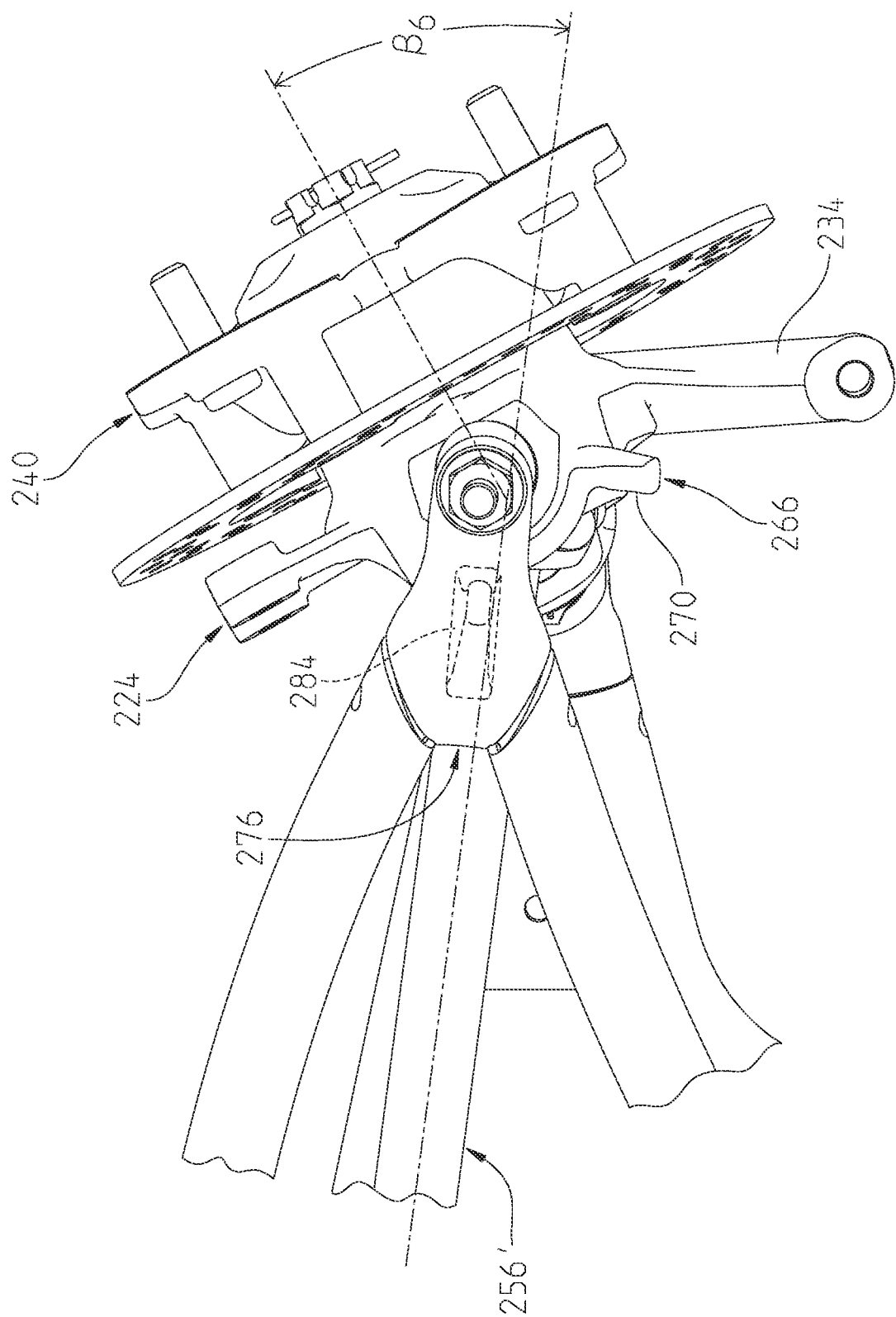
FIG. 25 shows a bottom view of the left side suspension of a 48" wide ATV.
Figure 26:
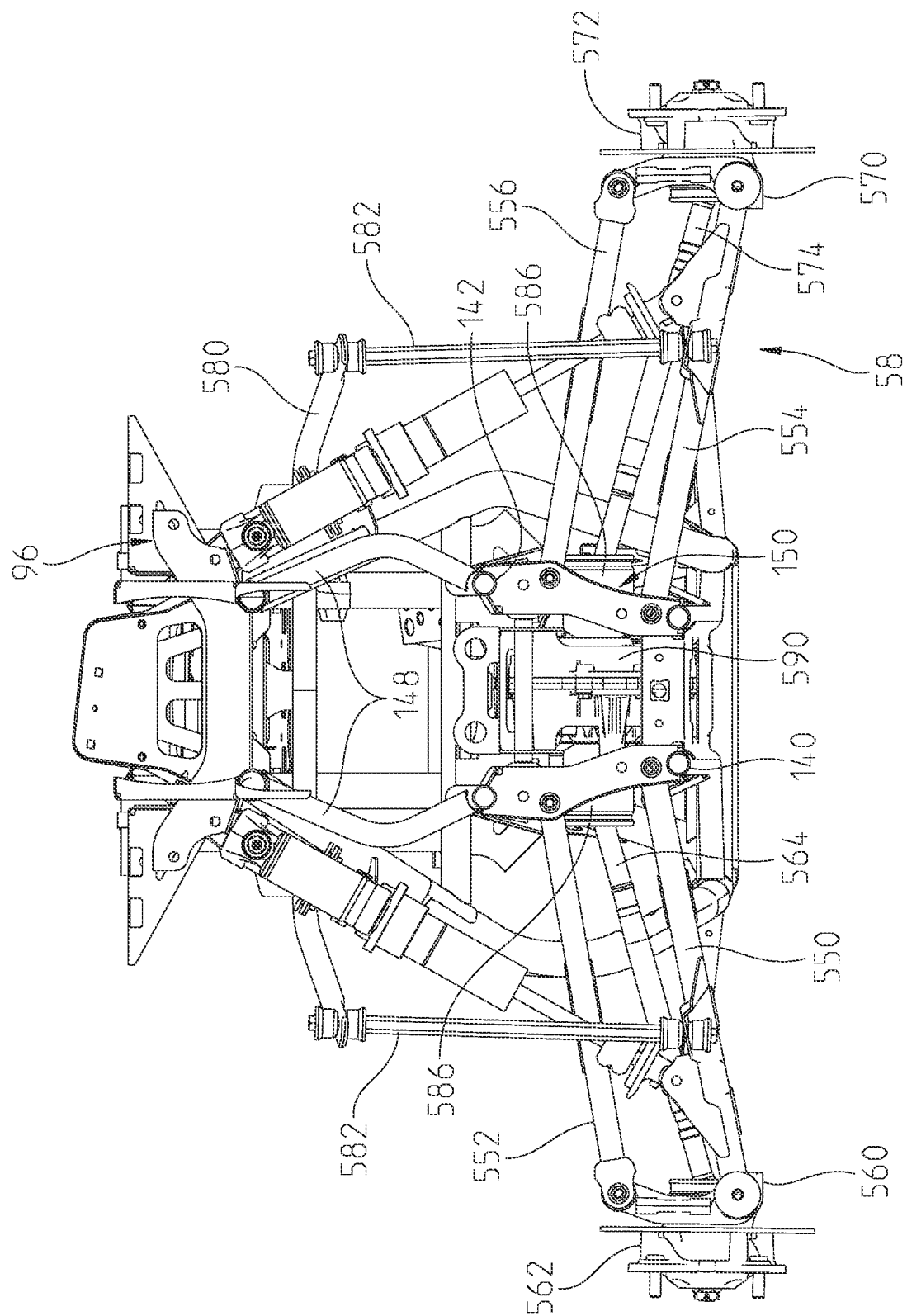
FIG. 26 shows a rear view of the rear suspension of a 55" wide ATV.
Figure 27:
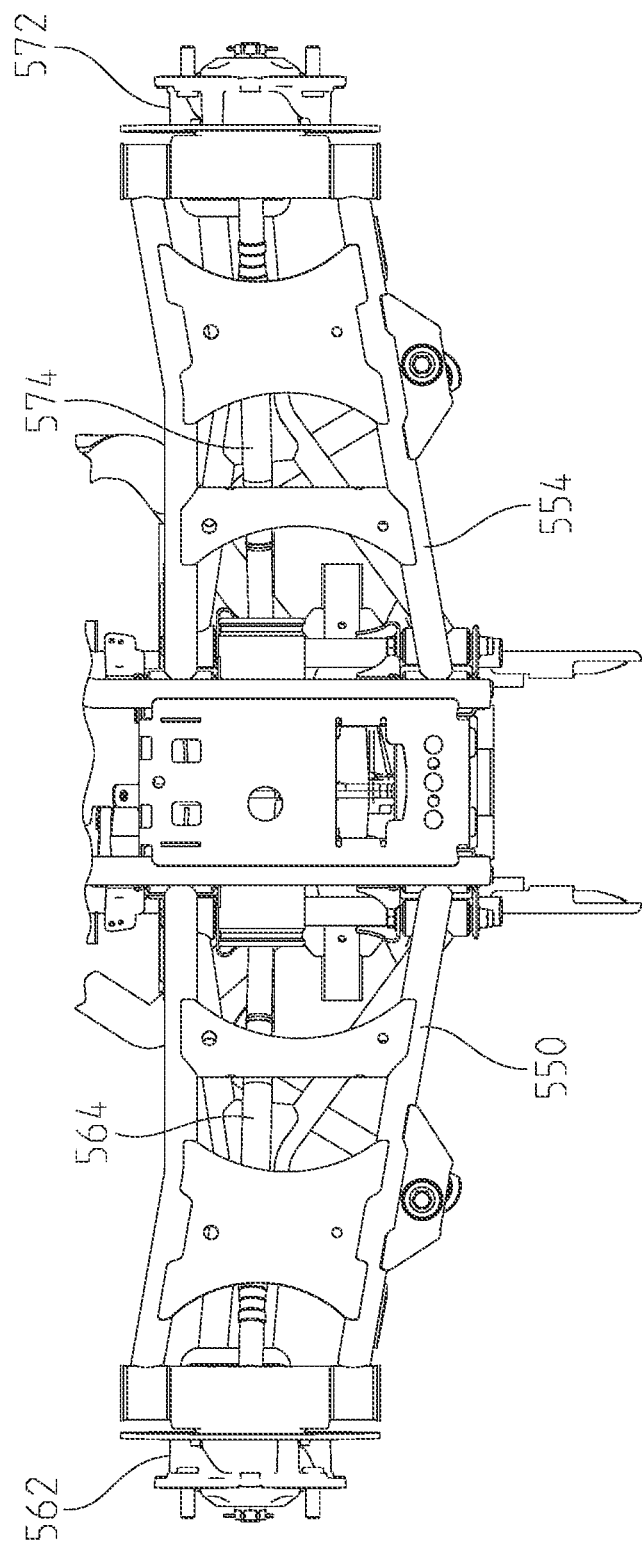
FIG. 27 shows a bottom view of the suspension of FIG. 24.

With reference now to FIGS. 24 and 25, the front suspension of the 48" and 55" vehicles will be described. With reference first to FIG. 24, the 55 inch vehicle is shown where the front left wheel is turned to the maximum left position, to a rotation of $\beta_5$=35°. Due to the fact that the half shafts 256 sweep forward on the 55" vehicle (FIG. 22) the first contact between the CV joint 250 (FIG. 13) and the half shaft 256, would be at the rearward side of the CV joint 250. Thus the upstanding post 284 on the 55" vehicle contacts the rear contact surface 270 to form the extreme position for the 55" vehicle.

With reference now to FIG. 25, the 48 inch vehicle is shown where the front left wheel is turned to the maximum right position, to a rotation of $\beta_6$=35°. Due to the fact that the half shafts 256' sweep rearward on the 48" vehicle (FIG. 23) the first contact between the CV joint 250 (FIG. 13) and the half shaft 256', would be at the forward side of the CV joint 250. Thus the upstanding post 284 on the 48" vehicle contacts the front contact surface 268 to form the extreme position for the 48" vehicle.

It should also be understood that the knuckles 224, hubs 240 and the couplings 276 are identical for the 48" and 55" vehicles and that the stops 268, 270 are defined for providing the extreme position for both vehicles.

With reference now to FIGS. 26-31, the rear suspension 58 of the ATV 2 will be described. With reference first to FIGS. 24 and 25, the suspension of the 55" vehicle will be described. As shown, the suspension 58 is comprised of a left lower A-arm 550, a left upper A-arm 552, a lower right A-arm 554 and a right upper A-arm 556. The left A-arms 550, 552 are coupled to a knuckle 560 which retains a left rear wheel hub 562. Wheel hub 562 is driven by a rear left half shaft 564. The right A-arms 554 and 556 are coupled to a right rear knuckle 570 and a right rear wheel hub 572 where wheel hub 572 is driven by a right rear half shaft 574. A torsion bar 580 couples the lower A-arms 550, 554 by way of vertical posts 582. As shown, half shafts 564, 574 are driven by couplings 586 of a final drive 590.

Figure 28:
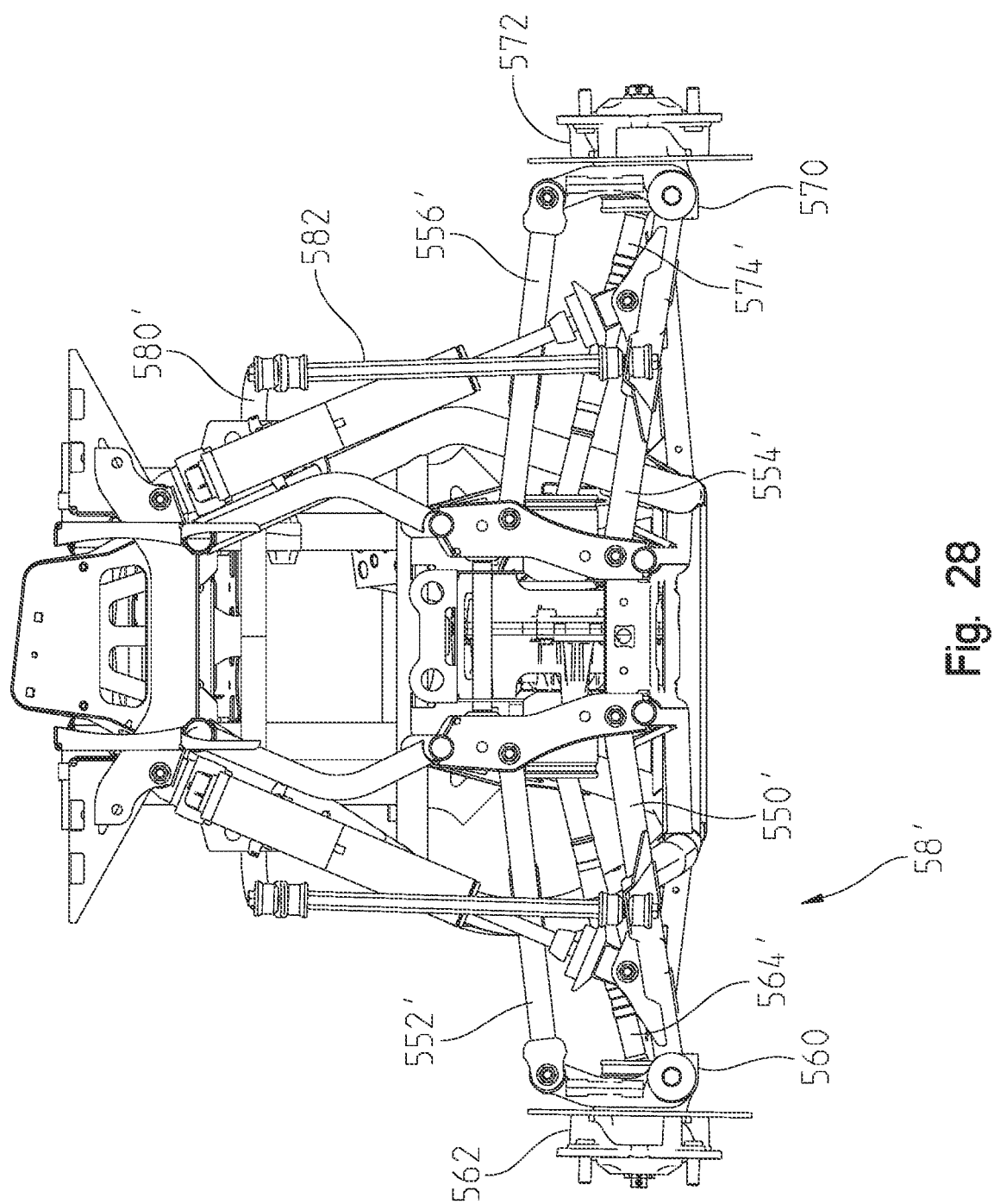
FIG. 28 shows a rear view of the 48" rear suspension.
Figure 29:
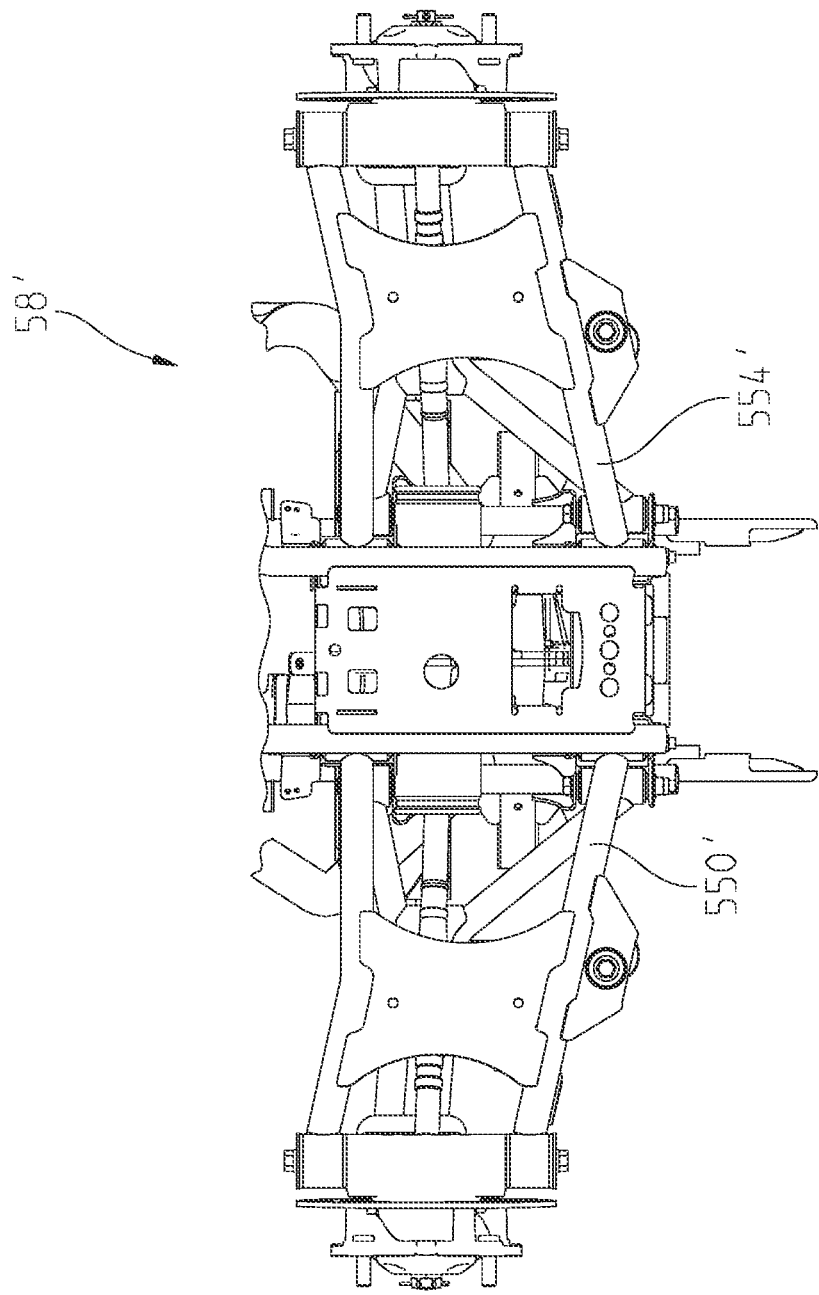
FIG. 29 shows a bottom view of the suspension of FIG. 26.
Figure 30:
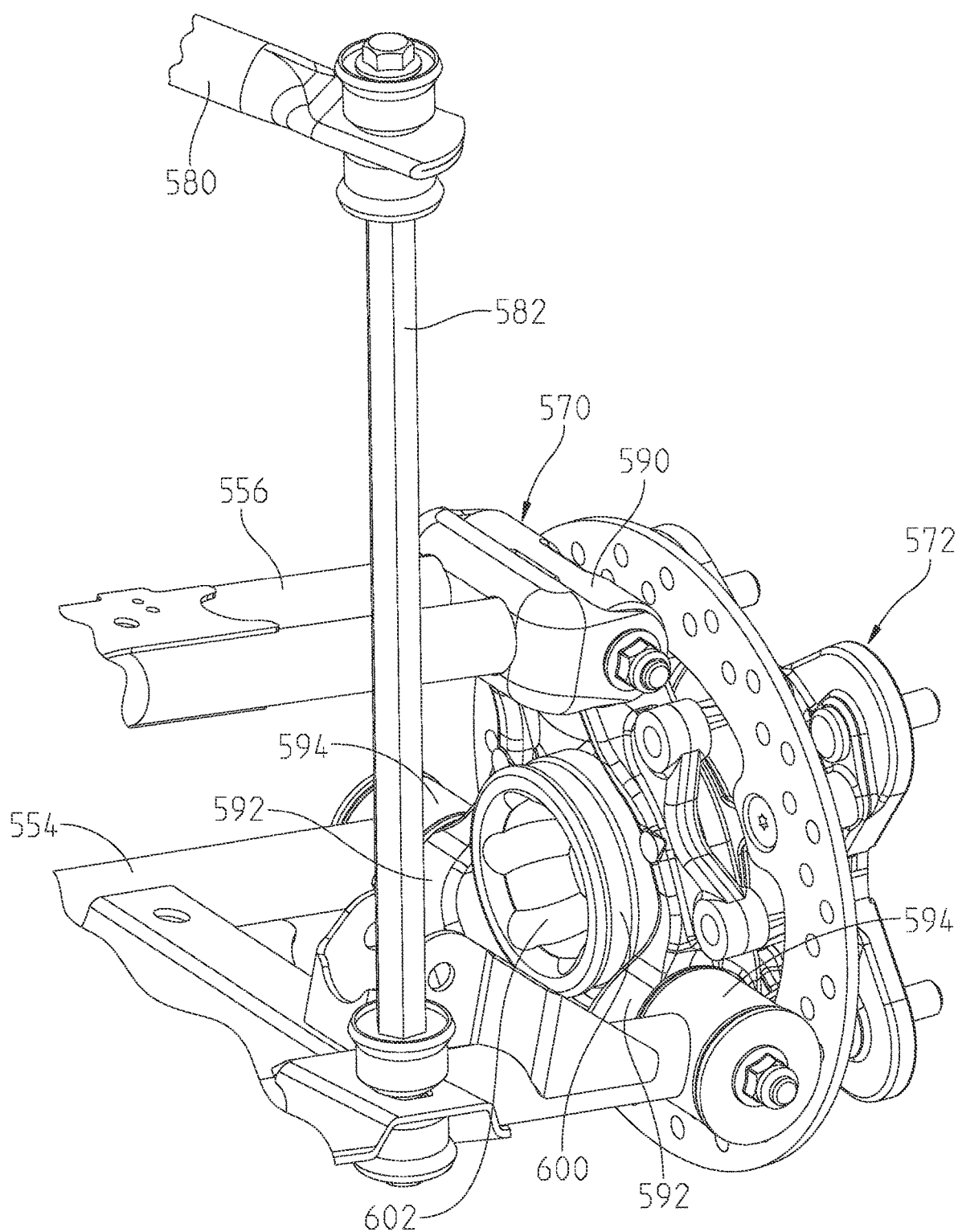
FIG. 30 shows a right rear perspective view of the right rear wheel hub.

With reference now to FIGS. 28 and 29, the rear suspension 58' for the 48" vehicle will be described. As with the front suspension, the majority of the components of the vehicle remain the same, but the left A-arms 550', 552' and half shaft 564' are replaced to compensate for the vehicle width. Similarly, the right-hand side suspension is also changed with lower A-arm 554', upper A-arm 556' and half shaft 574' having the reduced dimensions like the left-hand side. The torsion bar 580' is also different to accommodate the width of the vehicle.

With reference now to FIG. 28, the coupling between the A-arms and the knuckle will be described. As shown in FIG. 28, the right rear suspension is shown where A-arms 554 and 556 are coupled to knuckle 570. This is also the same knuckle and wheel hub used on the 48" vehicle and mirror images of the left-hand side wheel hub. The knuckle 570 includes a single elongate coupling 590 at the upper end thereof for coupling to upper A-arm 556 and includes two lower couplings at 592 for attachment of A-arm couplings 594. Wheel hub 572 includes a constant velocity joint 600 extending through the knuckle 570 which includes a drive profile 602 for matching with a constant velocity joint on half shaft 574. As shown in FIG. 28, the coupling points 592 are raised relative to the constant velocity coupling 600 such that the top of the coupling points 594 are higher than the inner geometry 602.

Figure 31:
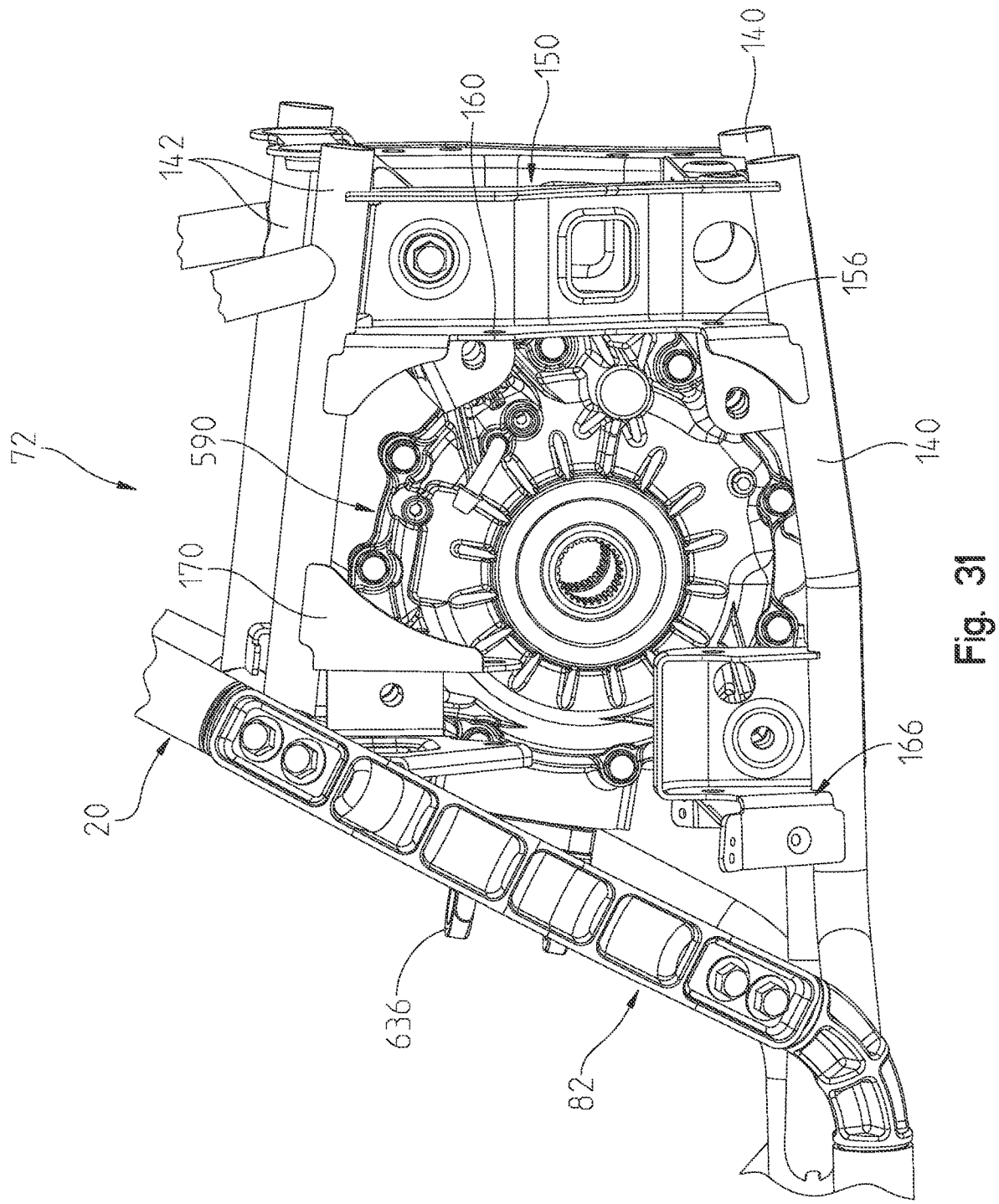
FIG. 31 shows a left rear perspective view of the mounting of the rear final drive and the frame of the ATV.

With reference now to FIG. 31, the rear final drive 590 is shown mounted in the rear frame portion 72 positioned above frame tubes 140 and below frame tubes 142. Rear suspension mounts 150, 166 and 170 are shown in greater detail. Final drive 590 is shown positioned adjacent to forging 82 which may be removed to access the final drive 590.

With respect now to FIGS. 32-35, the exhaust system 52 will be described in greater detail. As shown, exhaust system 52 includes an exhaust pipe 610 coupled to engine 612 at a front end thereof, and extending rearwardly past continuously variable transmission (CVT) 614 to an elbow 616, and then to a front end of muffler 620. As shown, muffler is centered in the vehicle frame 20 above tube 146, intermediate tubes 80c and below tubes 90. As shown best in FIG. 32, muffler 620 includes a muffler mounting post 630, having post portions 632 extending into apertures 174 (FIG. 35) of muffler mount 172. The muffler 620 is centrally mounted because with the extended travel of suspension the muffler 620 cannot be packaged in the wheel well at full rebound/jounce.

Figure 32:
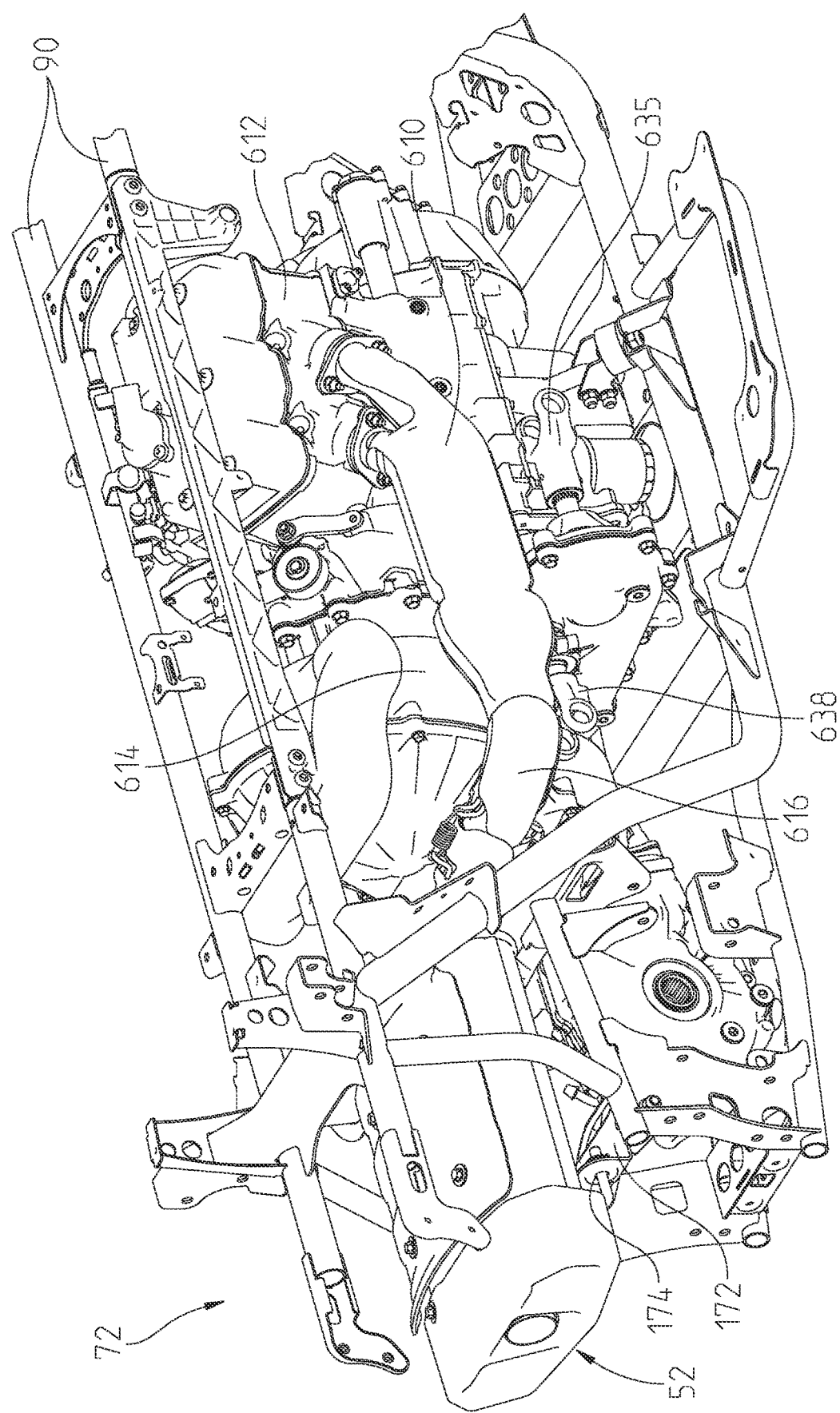
FIG. 32 shows a right rear perspective view showing the engine mounting together with the exhaust routing for the ATV frame.
Figure 33:
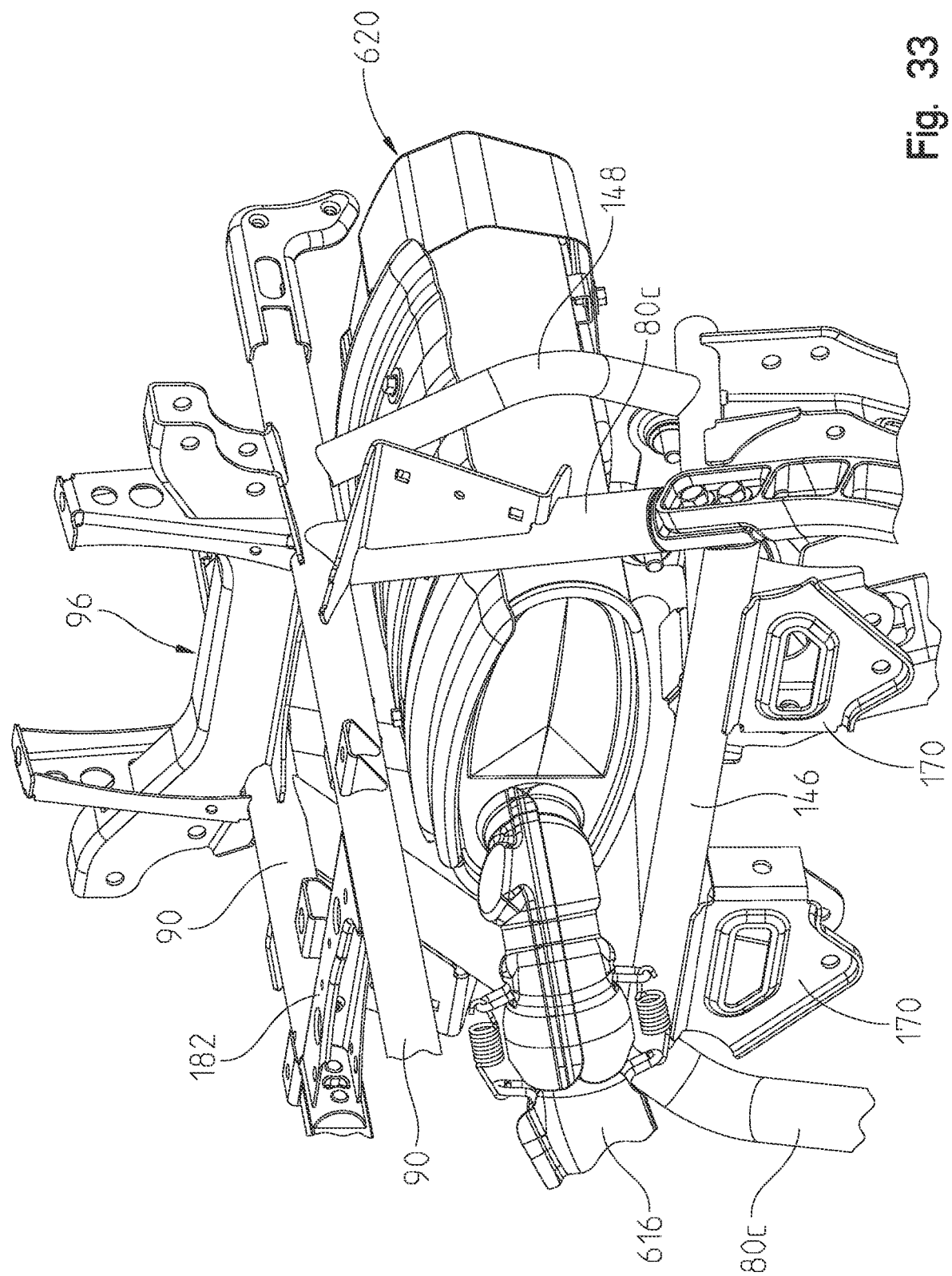
FIG. 33 shows a front left perspective view of the ATV muffler of FIG. 32.
Figure 34:
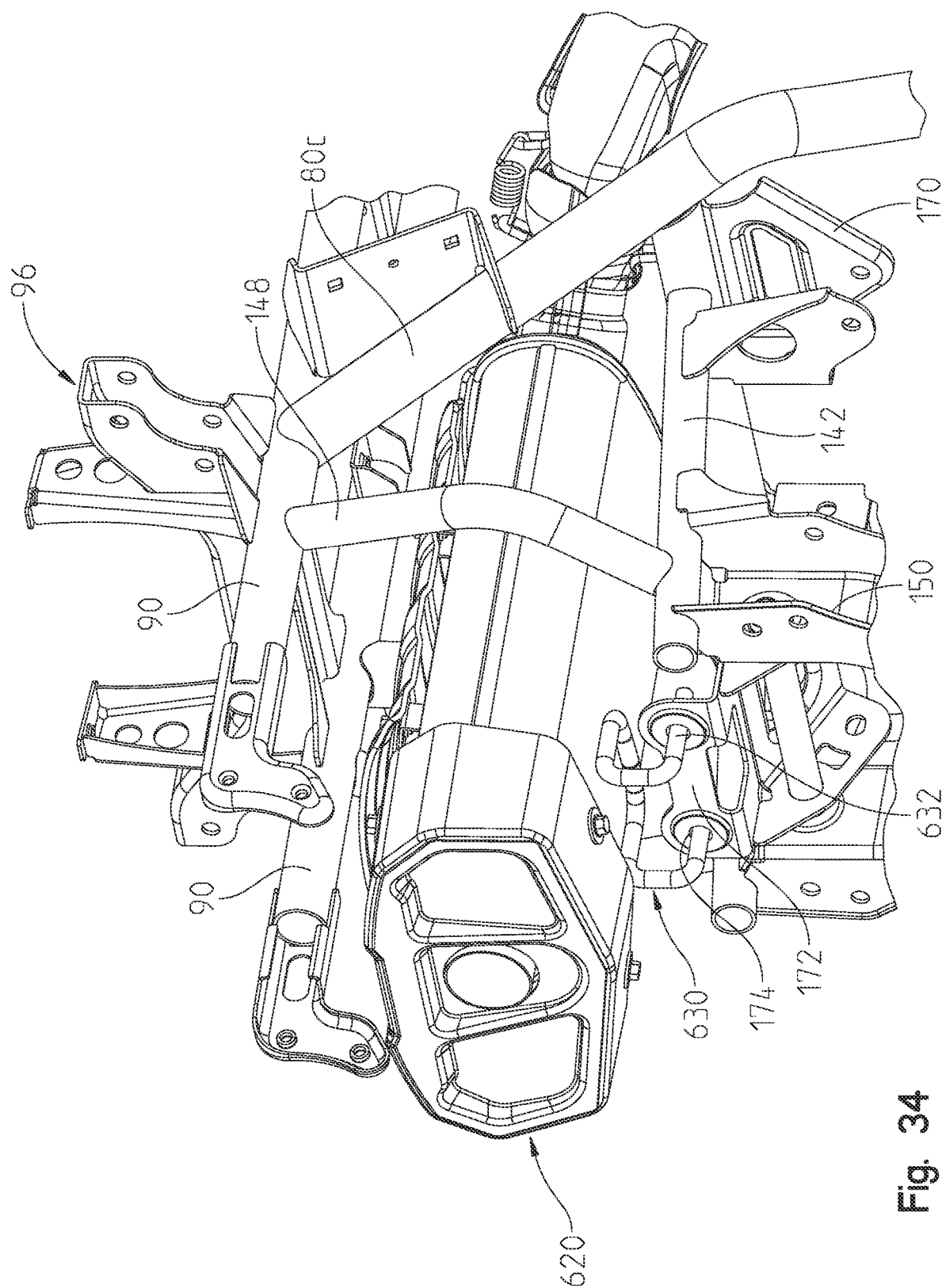
FIG. 34 shows a right rear view of the muffler of FIG. 31.
Figure 35:
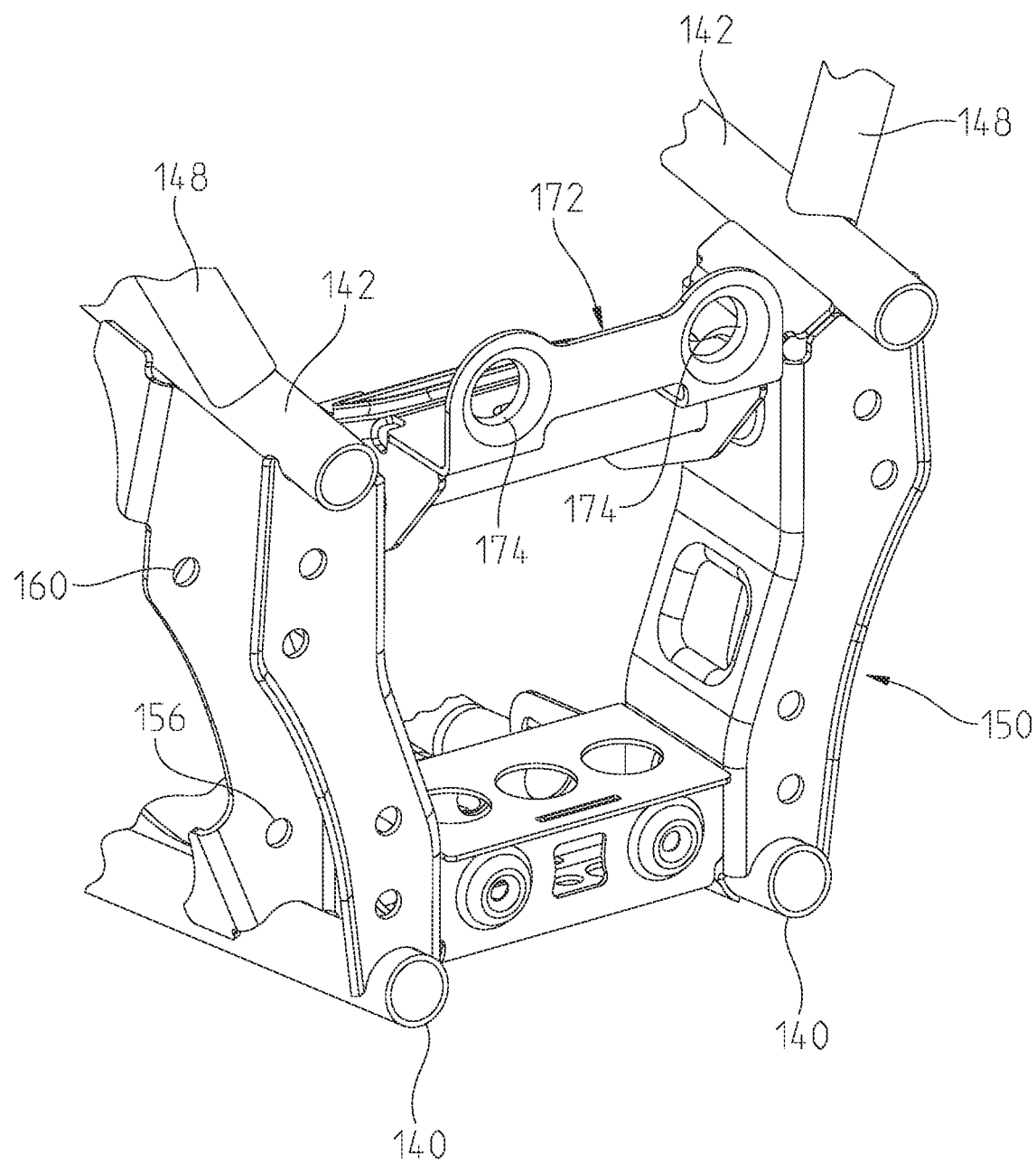
FIG. 35 shows a rear left perspective view of the hitch mount on the ATV.

It should be understood that the vehicle 2 includes front and rear drive shafts coupled between U-joint 634 of front drive 190 (FIG. 15) and output U-joint 635 (FIG. 32); and between U-joint 636 of rear drive 590 (FIG. 31) and output U-joint 638 (FIG. 32). The drive shafts are similar to those described in U.S. Pat. No. 9,873,316, the subject matter of which is incorporated herein by reference.

Figure 36:
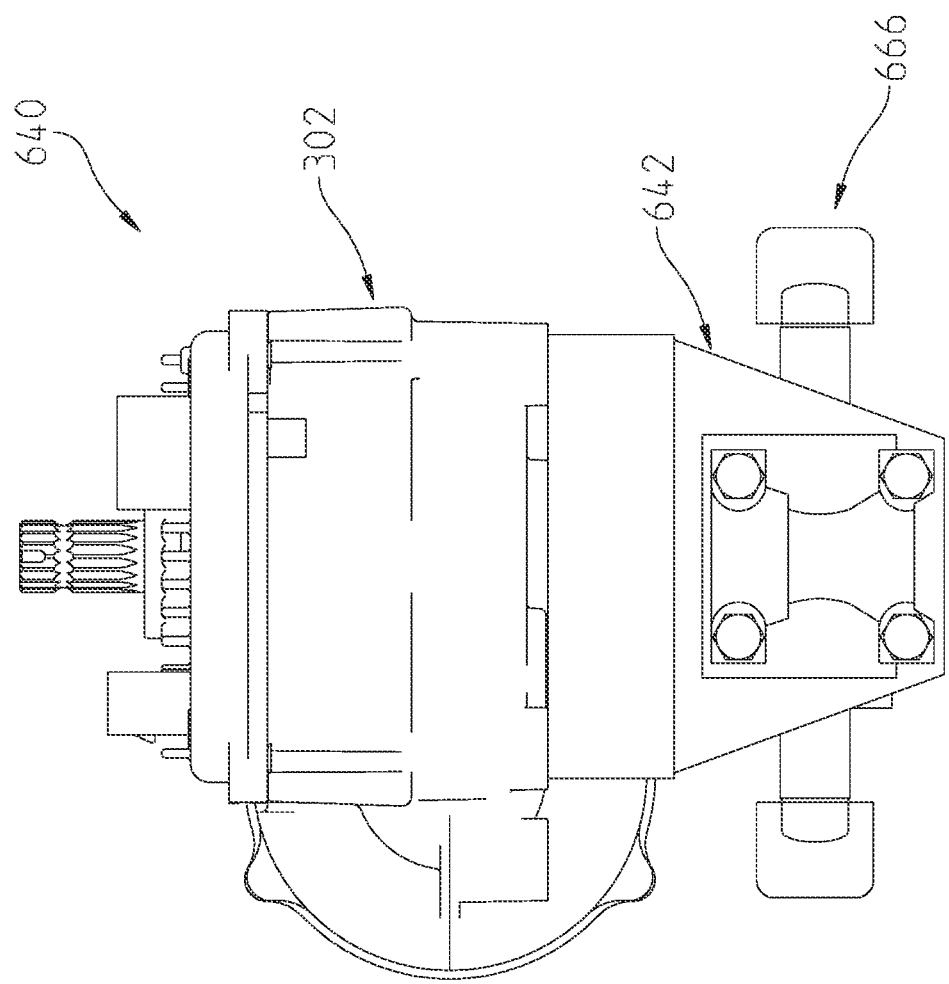
FIG. 36 is a front view of an alternate rack and pinion steering system.
Figure 37:
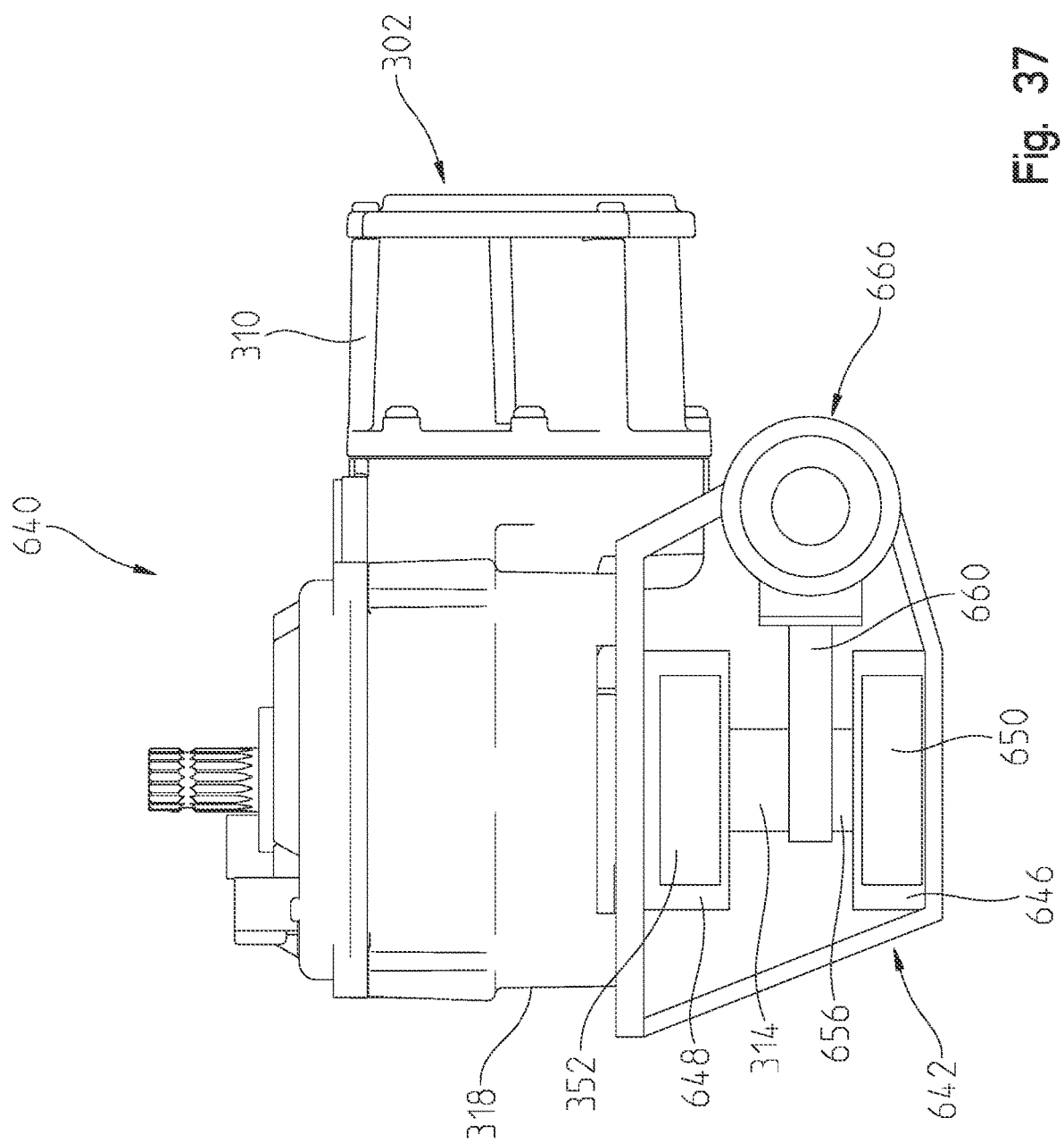
FIG. 37 is a left hand side view of the rack and pinion steering system of FIG. 36.
Figure 38:
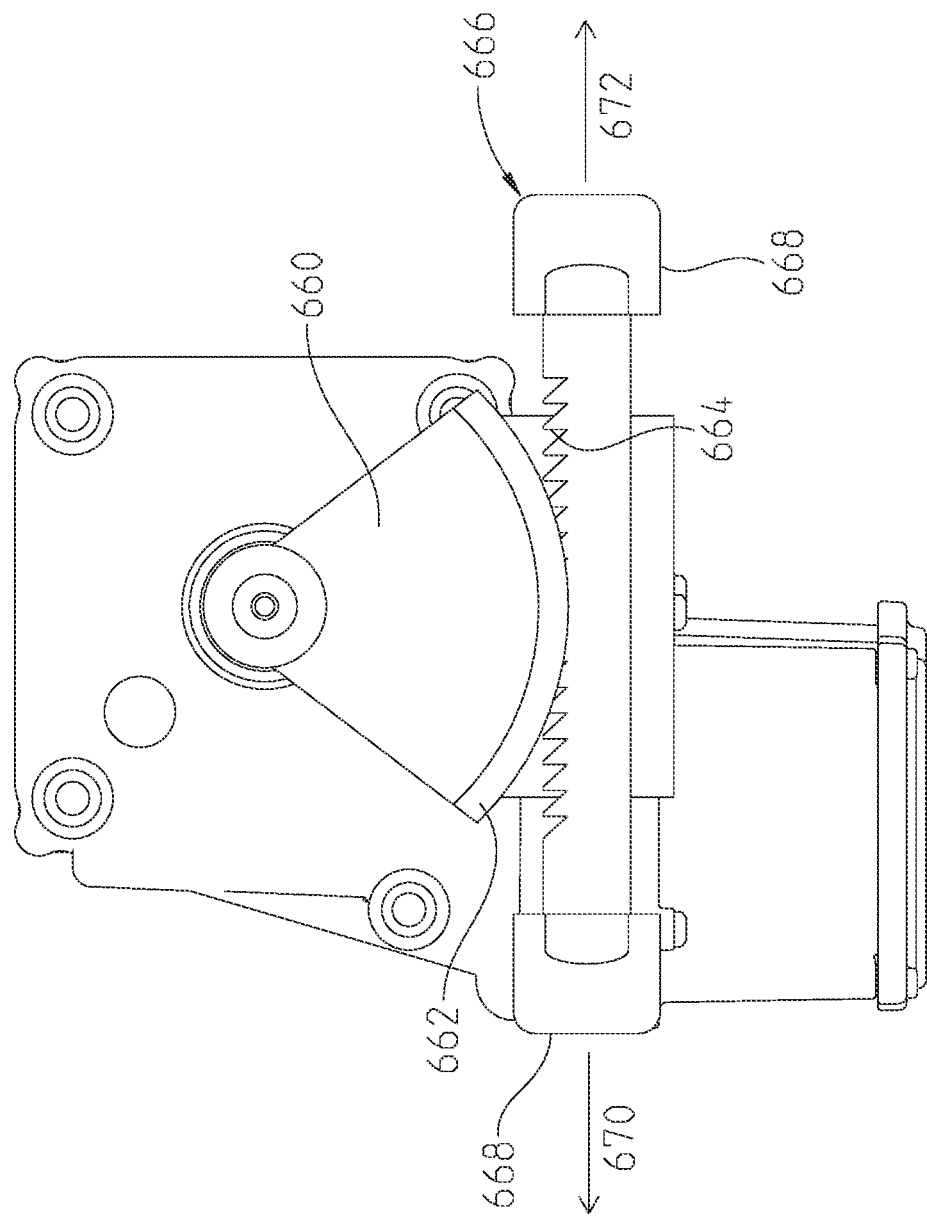
FIG. 38 is a bottom view of the rack and pinion steering system of FIG. 36.

With reference now to FIGS. 36-38, an alternate steering system is shown as a rack and pinion system 640 which is an alternative to the steering system shown in FIG. 18. Rack and pinion system 640 utilizes the power steering motor 302 as disclosed in the embodiment of FIG. 18, but couples to it a rack and pinion subassembly 642. As shown, subassembly 642 includes a housing 644 having bearing covers 646 and 648 housing bearings 650, 652. Bearings 650 and 652 support a stub shaft 656 which includes a splined internal shaft which couples to splined drive shaft 314 of power steering motor 310. A pinion 660 is coupled to stub shaft 656, and as best shown in FIG. 38, pinion 660 has an arcuate shape at 662 having gear teeth which mesh with teeth 664 of a rack 666. The rack includes couplers 668 which couple to steering arms 222 (FIG. 18) as opposed to the utilization of pitman arms 350, 420. Thus, as shown in FIG. 38, when pinion 660 rotates in a clockwise direction, rack 666 moves linearly in the direction of arrow 670 and when pinion 660 rotates in a counterclockwise direction, rack 666 moves linearly in the direction of arrow 672.

Figure 39:
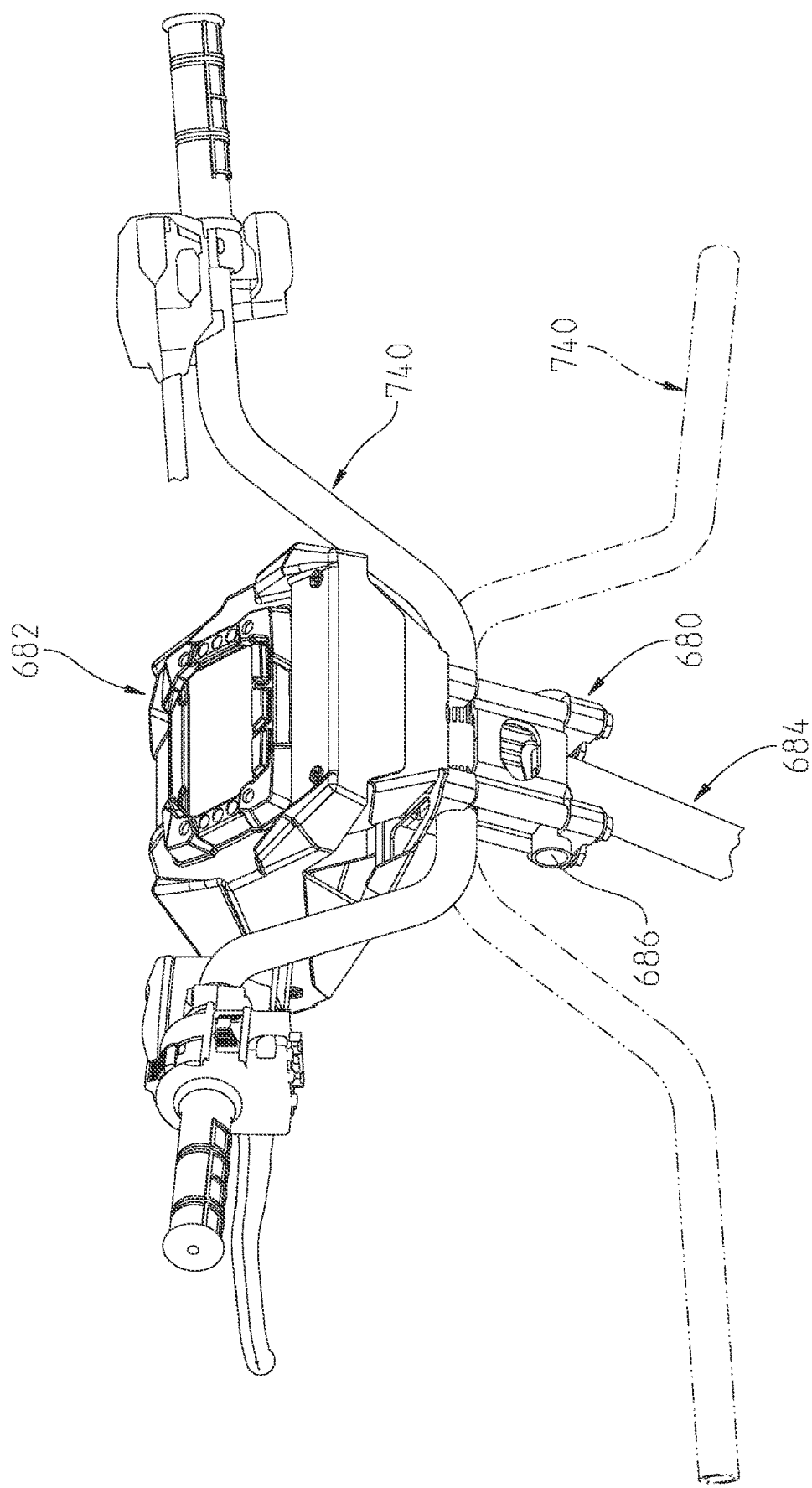
FIG. 39 is a left rear view of a riser block assembly usable with the handle bars.
Figure 40:
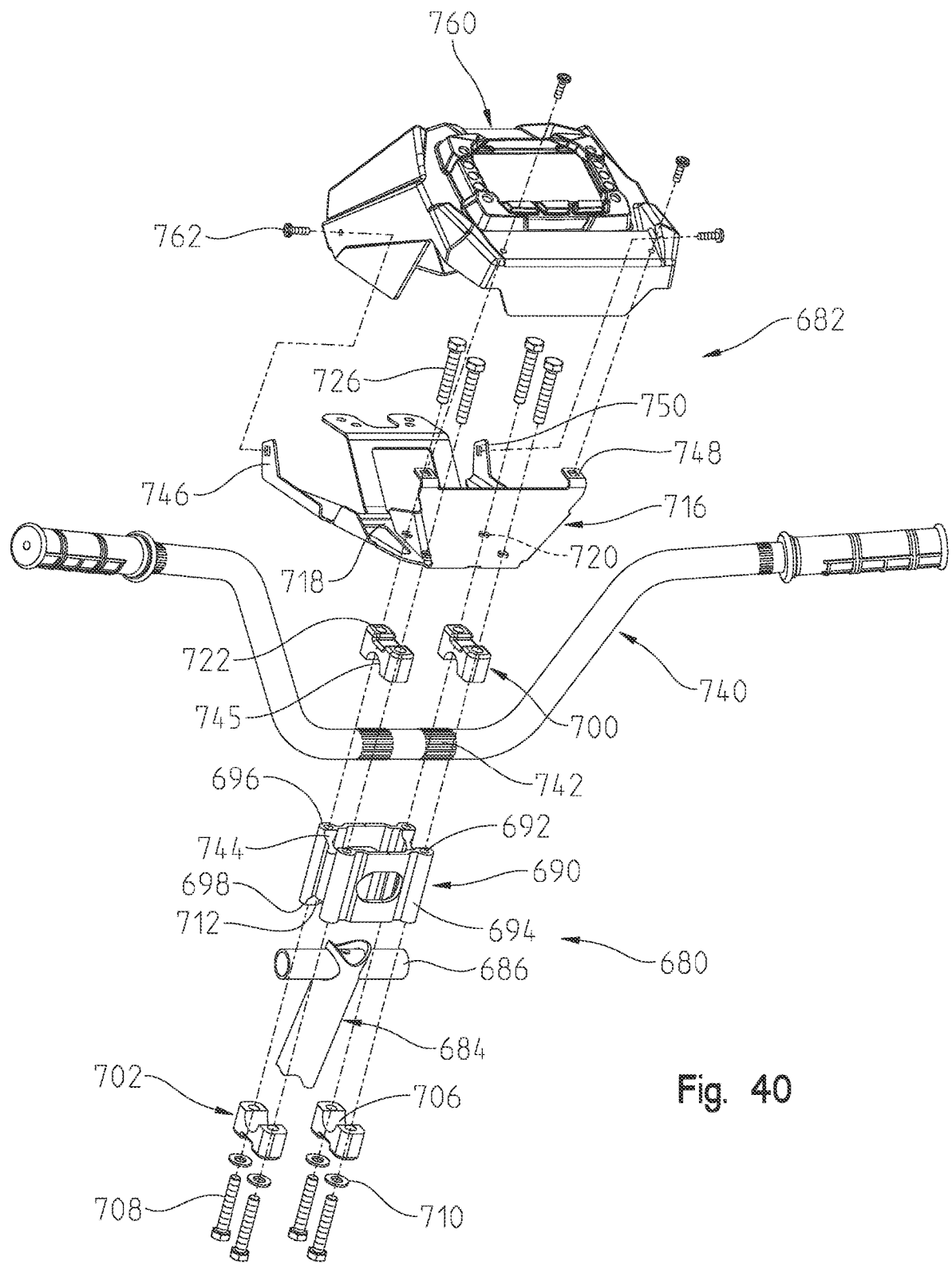
FIG. 40 is an exploded view of the assembly of FIG. 39.

With reference now to FIGS. 39 and 40, a steering riser block assembly 680 and an adjustable instrument cluster 682 will be described herein. As shown, riser block assembly 680 is coupled to an alternate steering arm 684 having a T-shaped post at 686. Riser block assembly 680 includes the main body portion 690, which in the disclosed embodiment is an aluminum block extruded in the direction of apertures 692 in post 694. Block 690 includes an upper surface 696 and a lower surface 698 which receives upper clamps 700 and lower clamps 702 respectively. Lower clamps 702 include an arcuate opening at 706 for placement against T-shaped post 686 whereby fasteners 708, 710 may be utilized to attach clamps 702 to bottom surface 698 trapping T-shaped post 686 therebetween. Lower end of main body portion 690 includes an arcuate opening at 712 to receive the T-shaped post 686. It should be appreciated that a lower end of aperture 692 is threaded, to receive threads on fasteners 708.

As shown best in FIG. 40, instrument cluster 682 includes a bracket 716 including a lower plate portion 718 having apertures 720. Apertures 720 align with apertures 722 of upper clamps 700. Thus, fasteners 726 may be received through apertures 720 of bracket 716, through apertures 722 of clamps 700 into the upper end of apertures 692. It should be appreciated that the upper ends of apertures 692 are also threaded to receive threads on fasteners 726. Thus, when bracket 716 is coupled to riser block 690, handlebar 740 is coupled therebetween and upper clamps 700 and riser block 690 grips a knurled surface 742 to retain the position of the handlebars 740. Upper end on main housing 690 includes an arcuate opening 744 and clamp 700 includes an arcuate opening 745 to grip knurled surface 742. Bracket 716 includes a plurality of bracket arms 746, 748, 750 which allows coupling of upper housing 760 of pod 682 by way of fasteners 762 to bracket 716.

Thus, given the geometry of the riser block 690, the riser block 690 may rotate towards and away from the rider on T-shaped post 686 which moves handlebars 740 towards or away from the rider to accommodate the ergonomic feel for different sized riders. This also adjusts the pod 682 to accommodate different sized riders. Furthermore, the riser block 690 allows the handlebars 740 to be rotated downwardly in a stored or shipped position as shown in the phantom lines of FIG. 39.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An all-terrain vehicle (ATV), comprising:
a frame;
ground engaging members supporting the frame, including front and rear ground engaging members;
front right and left suspensions, at least one of the right and left suspensions including an upper arm and a lower arm;
front wheel steering mechanisms including right and left knuckles pivotally coupled to the respective front right and left suspensions;
a power steering unit coupled to the frame, the power steering unit including an output shaft which is coupled to the right and left knuckles for steering;
a first stop member positioned on each of the front right and left suspension, the first stop member defined on the lower arm; and
a second stop member positioned on each of the right and left knuckles and configured to receive a portion of the first stop member therein,
wherein the first and second stop members cooperate to provide extreme rotational positions for the power steering unit, wherein the extreme rotational positions are defined by the knuckle.

2. The all-terrain vehicle of claim 1, wherein the first stop member includes an upstanding post.

3. The all-terrain vehicle of claim 2, wherein the upstanding post has a shark fin geometry.

4. The all-terrain vehicle of claim 1, wherein the first stop member is configured to contact the second stop member at a 45-degree angle.

5. The all-terrain vehicle of claim 1, wherein the second stop member defines an arcuate slot.

6. The all-terrain vehicle of claim 1, wherein the knuckle defines a pin and the lower arm defines an opening, wherein the pin is configured to be received within the opening to couple the lower arm to the knuckle.

7. The all-terrain vehicle of claim 6, wherein the lower arm is rotatable about the pin and the lower arm is configured to rotate between the extreme rotational positions.

8. A suspension structure of an all-terrain vehicle comprising:
a shock absorber;
an upper arm and a lower arm operatively coupled to the shock absorber;
a knuckle coupled between the upper arm and the lower arm;
a stopper defined by the knuckle and configured to regulate a displacement angle between the lower arm and the knuckle, the stopper defining an arcuate slot; and a projection defined by the lower arm and configured to abut surfaces of the stopper during rotation.

9. The suspension structure of claim 8, wherein the projection defines a top and a base opposite the top, wherein a width of the projection at the top is less than a width of the projection at the base.

10. The suspension structure of claim 9, wherein the top of the projection is configured to abut the surfaces of the stopper during rotation.

11. The suspension structure of claim 8, wherein the stopper includes a first end and a second end opposite the first end, and the surfaces of the stopper include a first extreme contact surface at the first end and a second extreme contact surface at the second end.

12. An all-terrain vehicle comprising:
a frame;
ground engaging members supporting the frame, including front and rear ground engaging members;
a front suspension including an upper arm and a lower arm;
a front wheel steering mechanism including a knuckle pivotably coupled to the front suspension;
a power steering unit coupled to the frame and configured for steering, the power steering unit including an output shaft which is coupled to the knuckle;
a projection member defined by the lower arm; and
a stopper defined by the knuckle and configured to regulate a displacement angle between the lower arm and the knuckle,
wherein the stopper defines an arcuate slot, and
wherein the projection is configured to abut surfaces of the stopper during rotation of the power steering unit.

13. The all-terrain vehicle of claim 12, wherein the projection defines a top and a base opposite the top, wherein a width of the projection at the top is less than a width of the projection at the base.

14. The all-terrain vehicle of claim 12, wherein the knuckle is operatively coupled to a wheel hub of one of the front ground engaging members.

15. The all-terrain vehicle of claim 12, further including a steering arm coupled to the knuckle and positioned between the upper arm and the lower arm.

16. The all-terrain vehicle of claim 15, wherein the knuckle defines a top end, a bottom end opposite the top end, and a length therebetween, and wherein the knuckle includes an extension defined along the length and the steering arm is coupled to the extension.

17. The all-terrain vehicle of claim 15, wherein the upper arm has a first end, a second end, and a length therebetween, and the upper arm defines an upwardly directed bend along a portion of the length configured to provide clearance to the steering arm.

18. The all-terrain vehicle of claim 12, wherein the lower arm has a first end, a second end, and a length therebetween, wherein the lower arm is curved along the length.

19. A suspension structure of an all-terrain vehicle comprising:
a shock absorber;
an upper arm and a lower arm operatively coupled to the shock absorber;
a knuckle coupled between the upper arm and the lower arm;
a stopper defined by the knuckle and configured to regulate a displacement angle between the lower arm and the knuckle, wherein the stopper includes a first end and a second end opposite the first end, and the surfaces of the stopper include a first extreme contact surface at the first end and a second extreme contact surface at the second end; and
a projection defined by the lower arm and configured to abut surfaces of the stopper during rotation.

* * * * *